US011315295B2

(12) United States Patent
Ohta et al.

(10) Patent No.: US 11,315,295 B2
(45) Date of Patent: Apr. 26, 2022

(54) COMFORT LEVEL DISPLAY APPARATUS THAT GENERATES CORRELATION INFORMATION BETWEEN USER COMFORT LEVELS AND TEMPERATURE CHANGES

(71) Applicant: MITSUBISHI ELECTRIC CORPORATION, Tokyo (JP)

(72) Inventors: Yoshihiro Ohta, Tokyo (JP); Natsumi Tamura, Tokyo (JP); Kenji Sato, Tokyo (JP); Satoko Tomita, Tokyo (JP); Kazuyuki Nagahiro, Tokyo (JP); Kazuo Tomisawa, Tokyo (JP); Takayoshi Iida, Tokyo (JP); Hiroyuki Yasuda, Tokyo (JP); Yoshinori Nakajima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 12 days.

(21) Appl. No.: 16/622,114

(22) PCT Filed: Jun. 28, 2018

(86) PCT No.: PCT/JP2018/024709
§ 371 (c)(1),
(2) Date: Dec. 12, 2019

(87) PCT Pub. No.: WO2019/013014
PCT Pub. Date: Jan. 17, 2019

(65) Prior Publication Data
US 2020/0134891 A1    Apr. 30, 2020

(30) Foreign Application Priority Data

Jul. 12, 2017 (JP) .............................. JP2017-136079
May 15, 2018 (JP) .............................. JP2018-093490

(51) Int. Cl.
*G06T 11/20* (2006.01)
*F24F 11/64* (2018.01)
*F24F 11/52* (2018.01)

(52) U.S. Cl.
CPC ............ *G06T 11/206* (2013.01); *F24F 11/52* (2018.01); *F24F 11/64* (2018.01)

(58) Field of Classification Search
None
See application file for complete search history.

(56) References Cited

U.S. PATENT DOCUMENTS

| 8,090,477 B1* | 1/2012 | Steinberg .................. F24F 11/62 |
| | | 700/278 |
| 2011/0093126 A1* | 4/2011 | Toba ....................... G06Q 50/06 |
| | | 700/291 |

(Continued)

FOREIGN PATENT DOCUMENTS

| JP | 7-55226 A | 3/1995 |
| JP | 2011-89682 A | 5/2011 |

(Continued)

OTHER PUBLICATIONS

International Search Report (PCT/ISA/210) issued in PCT/JP2016/024709, dated Aug. 28, 2018.

(Continued)

*Primary Examiner* — Hilina K Demeter
(74) *Attorney, Agent, or Firm* — Birch, Stewart, Kolasch & Birch, LLP

(57) ABSTRACT

Perception of the relationship between a comfort level and environmental data is facilitated, and appropriate management of air-conditioning equipment is enabled. A comfort level display apparatus has a preference storage unit to store a preference of a user regarding an air-conditioned environment, an attribute storage unit to store an attribute of the user, an environmental data value acquisition unit to acquire (Continued)

an environmental data value representing a condition in an air-conditioned space, a comfort level value generation unit to generate a comfort level value indicating comfort of the user in the air-conditioned space, based on the preference of the user stored the preference storage unit, the attribute of the user stored in the attribute storage unit, and the environmental data value of the air-conditioned space acquired by the environmental data value acquisition unit, a display data generation unit to generate display data by synthesizing the comfort level value of the user generated by the comfort level value generation unit and the environmental data value of the air-conditioned space acquired by the environmental data value acquisition unit, and a display unit to display the display data.

24 Claims, 50 Drawing Sheets

(56) References Cited

U.S. PATENT DOCUMENTS

| | | | | |
|---|---|---|---|---|
| 2011/0313579 | A1* | 12/2011 | Ling | H04L 12/2814 |
| | | | | 700/291 |
| 2012/0130547 | A1* | 5/2012 | Fadell | F24F 11/0012 |
| | | | | 700/276 |
| 2012/0239221 | A1* | 9/2012 | Mighdoll | G05B 15/02 |
| | | | | 700/300 |
| 2012/0253527 | A1* | 10/2012 | Hietala | G05B 17/02 |
| | | | | 700/278 |
| 2013/0048263 | A1* | 2/2013 | Nouvel | F24F 11/30 |
| | | | | 165/237 |
| 2013/0268125 | A1* | 10/2013 | Matsuoka | F24F 11/30 |
| | | | | 700/276 |
| 2014/0176599 | A1* | 6/2014 | Watanabe | G06T 7/20 |
| | | | | 345/619 |
| 2014/0277765 | A1 | 9/2014 | Karimi et al. | |
| 2014/0358291 | A1* | 12/2014 | Wells | G05B 15/02 |
| | | | | 700/276 |
| 2016/0350621 | A1 | 12/2016 | Watanabe et al. | |
| 2017/0160626 | A1 | 6/2017 | Muramatsu | |
| 2019/0138859 | A1 | 5/2019 | Watanabe et al. | |
| 2019/0309975 | A1* | 10/2019 | Salem | F24F 11/56 |

FOREIGN PATENT DOCUMENTS

| | | | |
|---|---|---|---|
| JP | 2011-187030 | A | 9/2011 |
| JP | 2011-250027 | A | 12/2011 |
| JP | 2012-83105 | A | 4/2012 |
| JP | 2013-104632 | A | 5/2013 |
| JP | 2013-124809 | A | 6/2013 |
| JP | 2013124809 | A * | 6/2013 |
| JP | 2014-123277 | A | 7/2014 |
| JP | 2014-206779 | A | 10/2014 |
| JP | 2015-132443 | A | 7/2015 |
| JP | 2015-197241 | A | 11/2015 |
| JP | 2016-169925 | A | 9/2016 |
| WO | WO 2013/073372 | A1 | 5/2013 |
| WO | WO 2016/103560 | A1 | 6/2016 |

OTHER PUBLICATIONS

Extended European Search Report, dated May 4, 2020, for European Application No. 18831406.6.
Office Action dated Oct. 12, 2021 in corresponding Japanese Application No. 2018-093490.
Office Action dated Jun. 8, 2021 in corresponding Japanese Application No. 2018-093490.
Office Action dated Apr. 28, 2021 in corresponding Australian Application No. 2018299309.

* cited by examiner

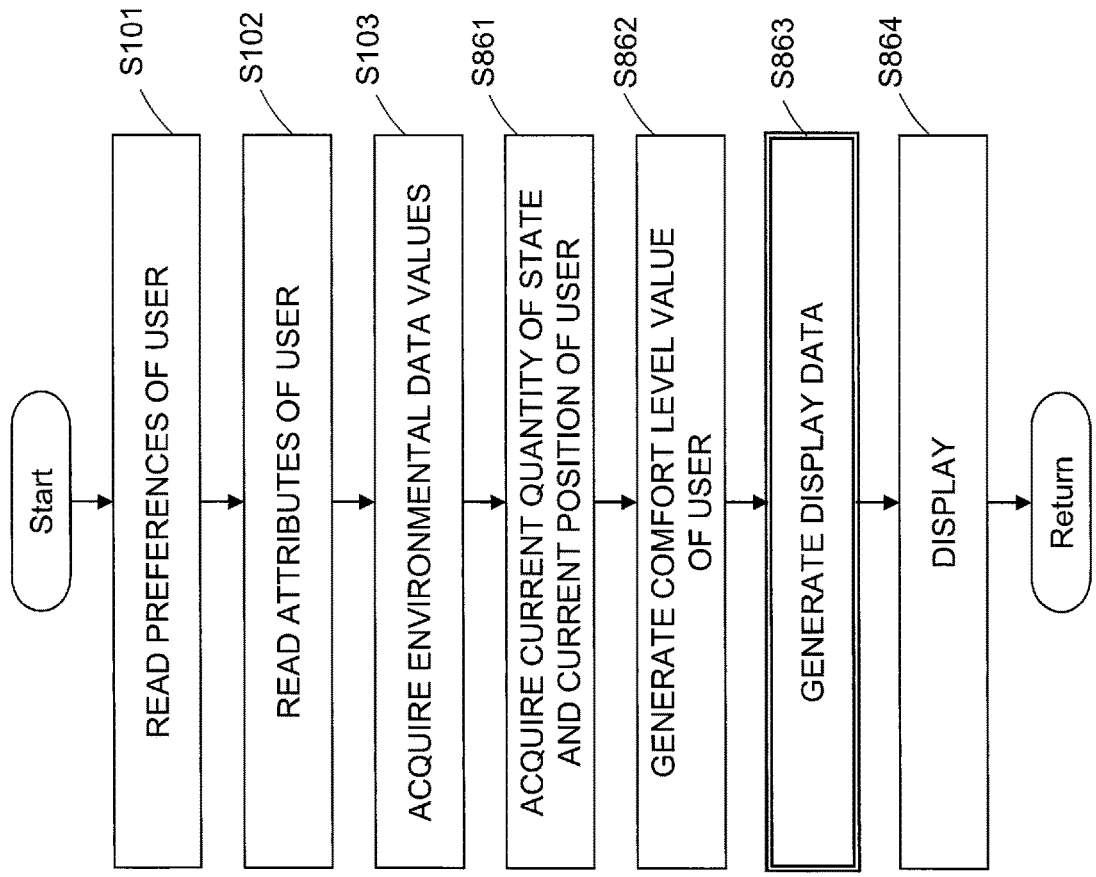

COMFORT LEVEL DISPLAY APPARATUS THAT GENERATES CORRELATION INFORMATION BETWEEN USER COMFORT LEVELS AND TEMPERATURE CHANGES

TECHNICAL FIELD

The present invention relates to configurations of a comfort level display apparatus that displays environmental data and user comfort levels in an air-conditioned space.

BACKGROUND ART

In recent years, the temperature in a structure such as a building or a house is controlled by an air-conditioning system so that users in the structure can spend time comfortably. However, temperatures at which people feel uncomfortable, such as "hot" or "cold" or temperatures at which people feel comfortable vary with individuals. For this reason, in a space where many people are present and can move freely, such as a store, it is often unclear what level of comfort an air-conditioning system in use is providing to a plurality of store users.

Therefore, a method has been proposed in which comfort level evaluation data is received from mobile terminals of a plurality of users, and received pieces of evaluation data are averaged, so as to display a distribution of comfort levels in that air-conditioned space on a display and monitor the comfort levels (for example, see Patent Literature 1).

A system has also been proposed that calculates comfort levels in each area in an office based on temperature, humidity, carbon dioxide concentration and so on, and displays the layout of the office over which a distribution of comfort levels is superimposed on a display (for example, see Patent Literature 2).

CITATION LIST

Patent Literature

Patent Literature 1: JP 2013-104632 A
Patent Literature 2: JP 2011-89682 A

SUMMARY OF INVENTION

Technical Problem

Human comfort varies depending on environmental data such as temperature, humidity, air velocity, and radiation temperature, states of individuals such as clothing amount and activity amount, and personal preferences such as sensitive to heat and sensitive to cold. In the conventional technologies described in Patent Literature 1 and Patent Literature 2, only the comfort levels are displayed on the display. For this reason, the relationship between the comfort levels and the environmental data cannot be perceived, and it is difficult to determine how to change the environmental data in order to improve the comfort levels.

Accordingly, it is an object of the present invention to facilitate perception of the relationship between comfort levels and environmental data and to enable appropriate management of air-conditioning equipment.

Solution to Problem

A comfort level display apparatus of the present invention is characterized in that the comfort level display apparatus includes a preference storage unit to store a preference of a user regarding an air-conditioned environment; an attribute storage unit to store an attribute of the user; an environmental data value acquisition unit to acquire an environmental data value representing a condition in an air-conditioned space; a comfort level value generation unit to generate a comfort level value indicating comfort of the user in the air-conditioned space, based on the preference of the user stored in the preference storage unit, the attribute of the user stored in the attribute storage unit, and the environmental data value of the air-conditioned space acquired by the environmental data value acquisition unit; a display data generation unit to generate display data by synthesizing the comfort level value of the user generated by the comfort level value generation unit and the environmental data value of the air-conditioned space acquired by the environmental data value acquisition unit; and a display unit to display the display data.

As described above, the present invention displays the comfort level values and the environmental data values superimposed over each other, so that an air-conditioning manager can easily perceive the relationship between the comfort levels and the environmental data. Therefore, the prevent invention allows the air-conditioning manager to appropriately adjust air-conditioning equipment.

The comfort level display apparatus of the present invention may further include a basic statistic calculation unit to calculate a comfort-level-value basic statistic that is representative of comfort level values of the user generated by the comfort level value generation unit, and an environmental-data-value basic statistic that is representative of environmental data values of the air-conditioned space acquired by the environmental data value acquisition unit. The display data generation unit may generate display integrated data by synthesizing a comfort level value of the user, an environmental data value of the air-conditioned space, and one or a plurality of statistics of the comfort-level-value basic statistic and the environmental-data-value basic statistic, and the display unit may display the display integrated data. Here, the comfort-level-value basic statistic calculated by the basic statistic calculation unit may include groups (1) to (5) described below:

(1) a temporal average value or a spatial average value of the comfort level values of the user, (2) a temporal median value or a spatial median value of the comfort level values of the user, (3) a temporal maximum value or a spatial maximum value of the comfort level values of the user, (4) a temporal minimum value or a spatial minimum value of the comfort level values of the user, and (5) a temporal mode value or a spatial mode value of the comfort level values of the user; and the environmental-data-value basic statistic calculated by the basic statistic calculation unit may include groups (6) to (10) described below:

(6) a temporal average value or a spatial average value of the environmental data values of the air-conditioned space, (7) a temporal median value or a spatial median value of the environmental data values of the air-conditioned space, (8) a temporal maximum value or a spatial maximum value of the environmental data values of the air-conditioned space, (9) a temporal minimum value or a spatial minimum value of the environmental data values of the air-conditioned space, and

(10) a temporal mode value or a spatial mode value of the environmental data values of the air-conditioned space.

In the comfort level display apparatus of the present invention, the display data generation unit may generate the display integrated data by synthesizing a comfort level value of the user, an environmental data value of the air-conditioned space, and one or a plurality of statistics of the comfort-level-value basic statistic of the group (1) and the environmental-data-value basic statistic of the group (6), or synthesizing a comfort level value of the user, an environmental data value of the air-conditioned space, and one or a plurality of statistics of the comfort-level-value basic statistic of the group (2) and the environmental-data-value basic statistic of the group (7), or synthesizing a comfort level value of the user, an environmental data value of the air-conditioned space, and one or a plurality of statistics of the comfort-level-value basic statistic of the group (3) and the environmental-data-value basic statistic of the group (8), or synthesizing a comfort level value of the user, an environmental data value of the air-conditioned space, and one or a plurality of statistics of the comfort-level-value basic statistic of the group (4) and the environmental-data-value basic statistic of the group (9), or synthesizing a comfort level value of the user, an environmental data value of the air-conditioned space, and one or a plurality of statistics of the comfort-level-value basic statistic of the group (5) and the environmental-data-value basic statistic of the group (10).

As described above, the comfort-level-value basic statistics and the environmental-data-value basic statistics are displayed superimposed over each other, so that the air-conditioning manager can perceive the trend in the relationship between the comfort levels and the environmental data, and can easily determine the necessity of replacement, additional installation and so on of the air-conditioning equipment. The comfort-level-value basic statistics and the environmental-data-value basic statistics are displayed superimposed over each other, so that the air-conditioning manager can perceive the trend in the spatial relationship between the comfort levels and the environmental data, and can easily determine the necessity of replacement of the air-conditioning equipment, additional installation of building facilities such as a partition and so on in a particular area in the air-conditioned space. By using, as the comfort-level-value basic statistics and the environmental-data-value basic statistics, the average values, median values, maximum values, minimum values, and mode values which are indices representative of data groups of comfort level values and environmental data values, the data groups can be comprehensively perceived.

The comfort level display apparatus of the present invention may further include a basic statistic calculation unit to calculate a comfort-level-value basic statistic that is representative of comfort level values of the user generated by the comfort level value generation unit, and an environmental-data-value basic statistic that is representative of environmental data values of the air-conditioned space acquired by the environmental data value acquisition unit. The display data generation unit may generate statistic display data by synthesizing one statistic of the comfort-level-value basic statistic and one statistic of the environmental-data-value basic statistic, and the display unit may display the statistic display data.

In the comfort level display apparatus of the present invention, the display data generation unit may generate the statistic display data by synthesizing one of two values included in the comfort-level-value basic statistic of the group (1) and one of two values included in the environmental-data-value basic statistic of the group (6), or synthesizing one of two values included in the comfort-level-value basic statistic of the group (2) and one of two values included in the environmental-data-value basic statistic of the group (7), or synthesizing one of two values included in the comfort-level-value basic statistic of the group (3) and one of two values included in the environmental-data-value basic statistic of the group (8), or synthesizing one of two values included in the comfort-level-value basic statistic of the group (4) and one of two values included in the environmental-data-value basic statistic of the group (9), or synthesizing one of two values included in the comfort-level-value basic statistic of the group (5) and one of two values included in the environmental-data-value basic statistic of the group (10).

As described above, the comfort-level-value basic statistics and the environmental-data-value basic statistics are displayed, so that the air-conditioning manager can perceive the trend in the relationship between the comfort levels and the environmental data, and can easily determine the necessity of replacement, additional installation and so on of the air-conditioning equipment. By using, as the comfort-level-value basic statistics and the environmental-data-value basic statistics, the average values, median values, maximum values, minimum values, and mode values which are indices representative of data groups of comfort level values and environmental data values, the data groups can be comprehensively perceived.

Furthermore, according to the comfort level display apparatus of the present invention, the air-conditioned space may be composed of a plurality of areas. The comfort level display apparatus of the present invention may include an area information storage unit to store configuration information of each area in the air-conditioned space; an area environmental data value acquisition unit to refer to the configuration information of each area stored in the area information storage unit, and acquire an area environmental data value representing a condition of the air-conditioned space in each area, for each area; an area comfort level value generation unit to generate an area comfort level value indicating comfort of the user in one of the areas, based on the preference of the user stored in the preference storage unit, the attribute of the user stored in the attribute storage unit, and the area environmental data value acquired by the area environmental data value acquisition unit; and an area display data generation unit to generate area display data by synthesizing the area comfort level value of the user generated by the area comfort level value generation unit and the area environmental data value acquired by the area environmental data value acquisition unit. The display unit may display one or a plurality of pieces of the area display data. The comfort level display apparatus of the present invention may further include an area basic statistic calculation unit to calculate an area comfort-level-value basic statistic that is representative of area comfort level values of the user generated by the area comfort level value generation unit, and an area environmental-data-value basic statistic that is representative of area environmental data values of the air-conditioned space acquired by the area environmental data value acquisition unit. The area display data generation unit may generate area display integrated data by synthesizing an area comfort level value of the user, an area environmental data value, and one or a plurality of statistics of the area comfort-level-value basic statistic and the area environmental-data-value basic statistic. The display unit may display one or a plurality of pieces of the area display integrated data.

In the comfort level display apparatus of the present invention, the area comfort-level-value basic statistic calculated by the area basic statistic calculation unit may include groups (1) to (5) described below:

(1) a temporal average value or a spatial average value of the area comfort level values of the user, (2) a temporal median value or a spatial median value of the area comfort level values of the user, (3) a temporal maximum value or a spatial maximum value of the area comfort level values of the user, (4) a temporal minimum value or a spatial minimum value of the area comfort level values of the user, and (5) a temporal mode value or a spatial mode value of the area comfort level values of the user; and the area environmental-data-value basic statistic calculated by the area basic statistic calculation unit may include groups (6) to (10) described below:

(6) a temporal average value or a spatial average value of the area environmental data values, (7) a temporal median value or a spatial median value of the area environmental data values, (8) a temporal maximum value or a spatial maximum value of the area environmental data values, (9) a temporal minimum value or a spatial minimum value of the area environmental data values, and

(10) a temporal mode value or a spatial mode value of the area environmental data values.

As described above, by synthesizing the area comfort level values of the users and the area environmental data values in each area and displaying synthesized data, the trend in the relationship between the comfort levels and the environmental data can be perceived for each area, and the necessity of replacement, additional installation and the like of the air-conditioning equipment can be easily determined for each area. The area comfort-level-value basic statistics and the area environmental-data-value basic statistics are displayed superimposed over each other, so that the air-conditioning manager can perceive the trend in the spatial relationship between the comfort levels and the environmental data, and can easily determine the necessity of replacement of the air-conditioning equipment, additional installation of building facilities such as a partition and so on in a particular area in the air-conditioned space. By using, as the area comfort-level-value basic statistics and the area environmental-data-value basic statistics, the average values, median values, maximum values, minimum values, and mode values which are indices representative of data groups of comfort level values and environmental data values, the data groups can be comprehensively perceived.

The comfort level display apparatus of the present invention may further include an area basic statistic calculation unit to calculate an area comfort-level-value basic statistic that is representative of area comfort level values of the user generated by the area comfort level value generation unit, and an area environmental-data-value basic statistic that is representative of area environmental data values of the air-conditioned space acquired by the area environmental data value acquisition unit. The area display data generation unit may generate area statistic display data by synthesizing one statistic of the area comfort-level-value basic statistic and one statistic of the area environmental-data-value basic statistic. The display unit may display one or a plurality of pieces of the area statistic display data.

In the comfort level display apparatus of the present invention, the area display data generation unit may generate the area statistic display data by synthesizing one of two values included in the area comfort-level-value basic statistic of the group (1) and one of two values included in the area environmental-data-value basic statistic of the group (6), or synthesizing one of two values included in the area comfort-level-value basic statistic of the group (2) and one of two values included in the area environmental-data-value basic statistic of the group (7), or synthesizing one of two values included in the area comfort-level-value basic statistic of the group (3) and one of two values included in the area environmental-data-value basic statistic of the group (8), or synthesizing one of two values included in the area comfort-level-value basic statistic of the group (4) and one of two values included in the area environmental-data-value basic statistic of the group (9), or synthesizing one of two values included in the area comfort-level-value basic statistic of the group (5) and one of two values included in the area environmental-data-value basic statistic of the group (10).

As described above, the area comfort-level-value basic statistics and the area environmental-data-value basic statistics are displayed, so that the air-conditioning manager can perceive the trend in the relationship between the comfort levels and the environmental data for each area, and can easily determine the necessity of replacement, additional installation and the like of the air-conditioning equipment for each area. By using, as the area comfort-level-value basic statistics and the area environmental-data-value basic statistics, the average values, median values, maximum values, minimum values, and mode values which are indices representative of data groups of comfort level values and environmental data values, the data groups can be comprehensively perceived.

The comfort level display apparatus of the present invention may further include an area information input unit to input the configuration information of the area of the air-conditioned space to the area information storage unit.

This allows the configuration information of the area to be easily changed.

The comfort level display apparatus of the present invention may further include an electric power information acquisition unit to acquire a data value of electric power used for a device in the air-conditioned space. The display data generation unit may generate the display data by synthesizing the comfort level value of the user generated by the comfort level value generation unit, the environmental data value of the air-conditioned space acquired by the environmental data value acquisition unit, and the data value of electric power acquired by the electric power information acquisition unit.

This allows the air-conditioning manager to perceive the relationship among electric power consumption, the comfort levels, and the environmental data values.

The comfort level display apparatus of the present invention may further include an area basic statistic calculation unit to calculate an area comfort-level-value basic statistic that is representative of area comfort level values of the user generated by the area comfort level value generation unit; and an area comfort level evaluation unit to compare, for evaluation, the area comfort-level-value basic statistic calculated by the area basic statistic calculation unit with a predetermined threshold value, and output an area comfort level evaluation. The area display data generation unit may generate the area display data by synthesizing an area comfort level value of the user generated by the area comfort level value generation unit, an area environmental data value acquired by the area environmental data value acquisition unit, and the area comfort level evaluation output by the area comfort level evaluation unit.

This allows an area with low comfort to be easily displayed distinguishably among a plurality of areas. It is also possible to use area comfort level evaluations to display an area with low comfort among the plurality of areas, so that the area with low comfort can be distinguishably displayed more easily.

The comfort level display apparatus of the present invention may further include a biological information storage unit to store biological information of the user, and a user state acquisition unit to acquire a current quantity of state of the user and a current position of the user. The comfort level value generation unit may generate a comfort level value indicating comfort of the user in the air-conditioned space, based on the preference of the user stored in the preference storage unit, the attribute of the user stored in the attribute storage unit, the environmental data value of the air-conditioned space acquired by the environmental data value acquisition unit, the biological information of the user stored in the biological information storage unit, and the current quantity of state of the user and the current position of the user acquired by the user state acquisition unit.

This makes it possible to display comfort accurately even when the user is in a state different from the regular state, such as after walking.

The comfort level display apparatus of the present invention may further include an interpolation unit to perform interpolation of comfort level values of the user of discrete values generated by the comfort level value generation unit, so as to calculate continuous values in terms of time or space, and perform interpolation of environmental data values of the air-conditioned space of discrete values acquired by the environmental data value acquisition unit, so as to calculate continuous values in terms of time or space. The display data generation unit may generate continuous display data by synthesizing the continuous values, in terms of one of time and space, of the comfort level values of the user, and the continuous values, in terms of one of time and space, of the environmental data values of the air-conditioned space, and the display unit may display the continuous display data.

The comfort level values and the environmental data values are displayed as continuous lines, thereby making display easy to see and allowing the air-conditioning manager to perceive the relationship between the comfort levels and the environmental data more easily.

The comfort level display apparatus of the present invention may further include an anomaly detection unit to detect an anomaly and output anomaly data when the comfort level value of the user is not within a comfort limit range. The display data generation unit may generate anomaly display data by synthesizing the anomaly data output by the anomaly detection unit, the comfort level value of the user, and the environmental data value of the air-conditioned space, and the display unit may display the anomaly display data.

The comfort level display apparatus of the present invention may further include an anomaly detection unit to detect an anomaly and output anomaly data when the comfort level value of the user is not within a comfort limit range. The display data generation unit may generate anomaly identification display data by synthesizing the comfort level value of the user and the environmental data value of the air-conditioned space, the anomaly identification display data allowing the comfort level value of the user in which an anomaly is detected by the anomaly detection unit to be distinguished from other user comfort level values, and the display unit may display the anomaly identification display data.

This allows the air-conditioning manager to promptly notice presence of an uncomfortable person and to promptly adjust the air-conditioning equipment.

In the comfort level display apparatus of the present invention, the preference storage unit stores a preference of a type-specific reference user regarding an air-conditioned environment. The attribute storage unit may store an attribute of the type-specific reference user, and for each zone in the air-conditioned space, a comfort level value of the type-specific reference user may be generated, based on the preference of the type-specific reference user stored in the preference storage unit, the attribute of the type-specific reference user stored in the attribute storage unit, and the environmental data value of the air-conditioned space acquired by the environmental data value acquisition unit. The comfort level display apparatus of the present invention may further include a type-specific recommended zone generation unit to designate a zone in which the comfort level value of the type-specific reference user is within a predetermined range as a type-specific recommended zone. The display data generation unit may generate type-specific recommended zone display data by synthesizing the comfort level value of the user generated by comfort level value generation unit, the type-specific recommended zone, and the environmental data value of the air-conditioned space, and the display unit may display the type-specific recommended zone display data.

As described above, a recommended zone is displayed for each type, such as a sensitive-to-heat type and a sensitive-to-cold type, so that users looking at the display can be prompted to move to their preferred places. For example, in a case where the users may sit in any place, as in a free-address office, if the individual users sit at their preferred places, the overall comfort level and productivity can be improved.

The comfort level display apparatus of the present invention may further include a movement destination display unit to display the type-specific recommended zone by projection mapping or augmented reality.

By displaying the type-specific recommended zone by projection mapping or augmented reality, movement of users are facilitated and the overall comfort level and productivity can be improved.

The comfort level display apparatus of the present invention may further include a user-specific recommended zone generation unit to, for each zone in the air-conditioned space, generate a comfort level value of the user, based on the preference of the user stored in the preference storage unit, the attribute of the user stored in the attribute storage unit, and the environmental data value of the air-conditioned space acquired by the environmental data value acquisition unit, and designate a zone in which the comfort level value of the user is within a predetermined range as a user-specific recommended zone. The display data generation unit may generate user-specific recommended zone display data by synthesizing the comfort level value of the user generated by comfort level value generation unit, the user-specific recommended zone, and the environmental data value of the air-conditioned space. The display unit may display the user-specific recommended zone display data.

As described above, the user is automatically recommended to move to a specific place in the air-conditioned space, taking into account the preferences and attributes of the user. Therefore, the user can easily move to a comfortable position without checking display on a display or the like.

The comfort level display apparatus of the present invention may further include a user state acquisition unit to acquire a current quantity of state of the user and a current position of the user. The comfort level value generation unit may generate a current comfort level value indicating current comfort of the user, based on the preference of the user stored in the preference storage unit, the attribute of the user stored in the attribute storage unit, the environmental data value of the air-conditioned space acquired by the environmental data value acquisition unit, and the current quantity of state of the user and the current position of the user acquired by the user state acquisition unit. The comfort level display apparatus of the present invention may further include a recommended action generation unit to, when the current comfort level value is not within a predetermined range, change a quantity of state of the user from the current quantity of state, and repeatedly generate a comfort level value of the user, based on the preference of the user, the attribute of the user, the environmental data value of the air-conditioned space, and the current position of the user, until the comfort level value of the user falls within the predetermined range, so as to determine a changed quantity of state of the user that enables the comfort level value of the user to fall within the predetermined range, and generate a recommended action for the user based on a difference between the current quantity of state of the user and the changed quantity of state. The display data generation unit may generate recommended action display data by synthesizing the current comfort level value of the user generated by the comfort level value generation unit, the environmental data value of the air-conditioned space, and the recommended action generated by the recommended action generation unit. The display unit may display the recommended action display data.

As described above, an action that will improve comfort of the user is recommended based on the current position and current quantity of state of the user, so that the comfort level and productivity of the user can be improved.

A comfort level display apparatus of the present invention is characterized in that the comfort level display apparatus includes a preference storage unit to store a preference of a type-specific reference user regarding an air-conditioned environment; an attribute storage unit to store an attribute of the type-specific reference user; an environmental data value acquisition unit to acquire an environmental data value representing a condition in an air-conditioned space; a type-specific recommended zone generation unit to, for each zone in the air-conditioned space, generate a comfort level value of the type-specific reference user, based on the preference of the type-specific reference user stored in the preference storage unit, the attribute of the type-specific reference user stored in the attribute storage unit, and the environmental data value of the air-conditioned space acquired by the environmental data value acquisition unit, and designate a zone in which the comfort level value of the type-specific reference user is within a predetermined range as a type-specific recommended zone; a display data generation unit to generate type-specific recommended zone display data by synthesizing the type-specific recommended zone and the environmental data value of the air-conditioned space; and a display unit to display the type-specific recommended zone display data.

As described above, a recommended zone is displayed for each type, such as a sensitive-to-heat type and a sensitive-to-cold type, so that users looking at the display can be prompted to move to their preferred places.

A comfort level display apparatus of the present invention is characterized in that the comfort level display apparatus includes a preference storage unit to store a preference of a user regarding an air-conditioned environment; an attribute storage unit to store an attribute of the user; an environmental data value acquisition unit to acquire an environmental data value representing a condition in an air-conditioned space; a user-specific recommended zone generation unit to, for each zone in the air-conditioned space, generate a comfort level value of the user, based on the preference of the user stored in the preference storage unit, the attribute of the user stored in the attribute storage unit, and the environmental data value of the air-conditioned space acquired by the environmental data value acquisition unit, and designate a zone in which the comfort level value of the user is within a predetermined range as a user-specific recommended zone; a display data generation unit to generate user-specific recommended zone display data by synthesizing the user-specific recommended zone and the environmental data value of the air-conditioned space; and a display unit to display the user-specific recommended zone display data.

As described above, the user is automatically recommended to move to a specific place in the air-conditioned space, so that the user can easily move to a comfortable position without checking display on a display or the like.

Advantageous Effects of Invention

The present invention facilitates perception of the relationship between comfort levels and environmental data and enables appropriate management of air-conditioning equipment.

BRIEF DESCRIPTION OF DRAWINGS

FIG. 50 is a flowchart illustrating operation of the comfort level display apparatus illustrated in FIG. 49.

DESCRIPTION OF EMBODIMENTS

Embodiments will be described hereinafter with reference to the drawings.

Embodiment 1

Figure 1:
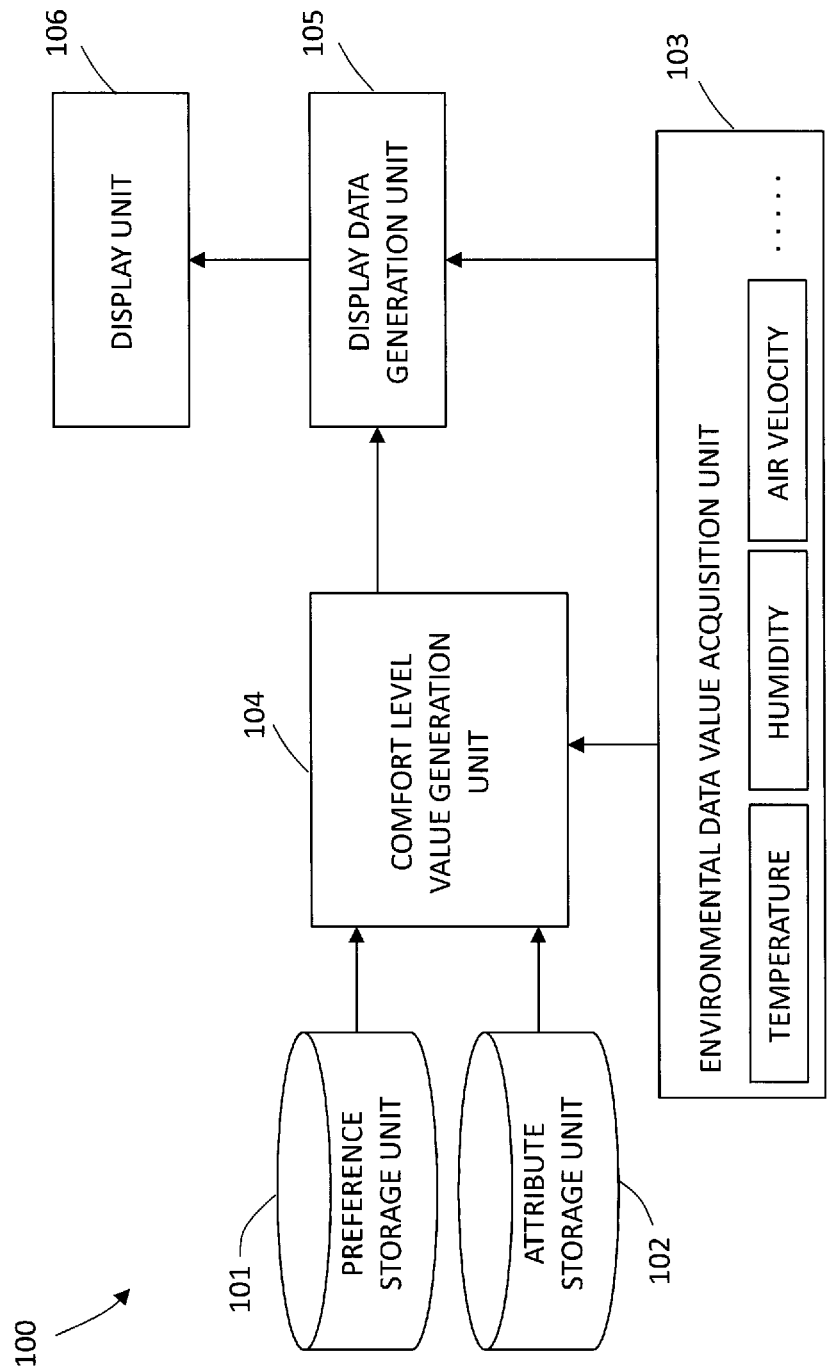
FIG. 1 is a functional block diagram illustrating a configuration of a comfort level display apparatus in Embodiment 1.

As illustrated in FIG. 1, a comfort level display apparatus 100 of Embodiment 1 includes a preference storage unit 101, an attribute storage unit 102, an environmental data value acquisition unit 103, a comfort level value generation unit 104, a display data generation unit 105, and a display unit 106. The comfort level display apparatus 100 can be realized by a general-purpose computer 10 illustrated in FIG. 2.

Figure 2:
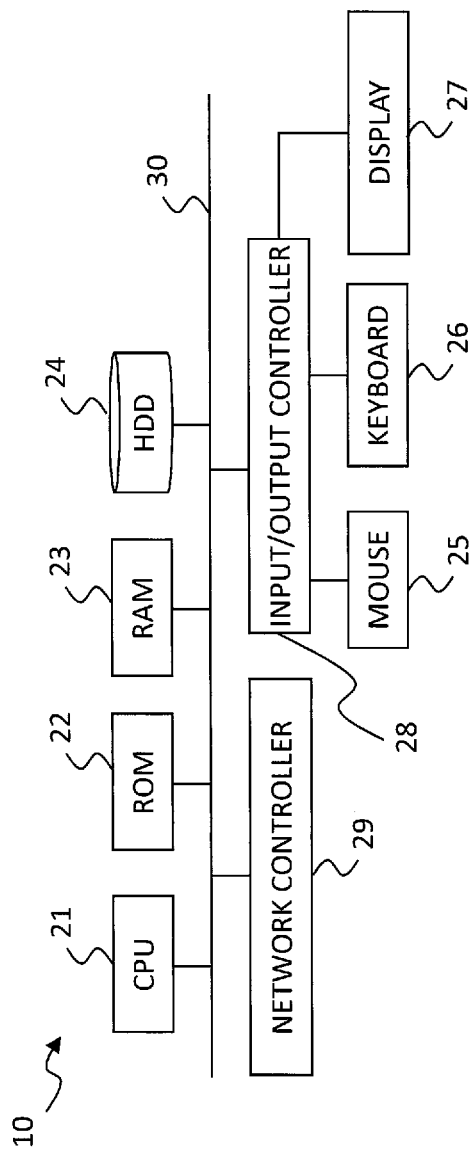
FIG. 2 is a hardware configuration diagram of a computer that forms the comfort level display apparatus illustrated in FIG. 1.

As illustrated in FIG. 2, the general-purpose computer 10 includes a CPU 21 that performs information processing, a ROM 22 and a RAM 23 that temporarily store data during information processing, a hard disk drive (HDD) 24 that stores programs, user data and the like, a mouse 25 and a keyboard 26 provided as input means, and a display 27 provided as a display device. The CPU 21, the ROM 22, the RAM 23, and the HDD 24 are connected through a data bus 30. The mouse 25, the keyboard 26, and the display 27 are connected to the data bus 30 via an input/output controller 28. A network controller 29 provided as communication means is also connected to the data bus 30.

The environmental data value acquisition unit 103, the comfort level value generation unit 104, and the display data generation unit 105 of the comfort level display apparatus 100 are realized by cooperative operation of the hardware of the general-purpose computer 10 illustrated in FIG. 2 and programs operating on the CPU 21. The preference storage unit 101 and the attribute storage unit 102 are realized by the HDD 24 of the general-purpose computer 10 illustrated in FIG. 2. The display unit 106 is realized by the display 27. The preference storage unit 101 and the attribute storage unit 102 may be realized by the RAM 23. The preference storage unit 101 and the attribute storage unit 102 may be realized by use of external storage means via a network.

The preference storage unit 101 stores preferences of users regarding an air-conditioned environment. The preferences regarding the air-conditioned environment include, for example, "sensitive to heat" and "sensitive to cold" as preferences regarding temperature, "cold constitution" which is a preference related to temperature and air velocity, and "dry skin" which is a preference related to humidity.

Figure 3:
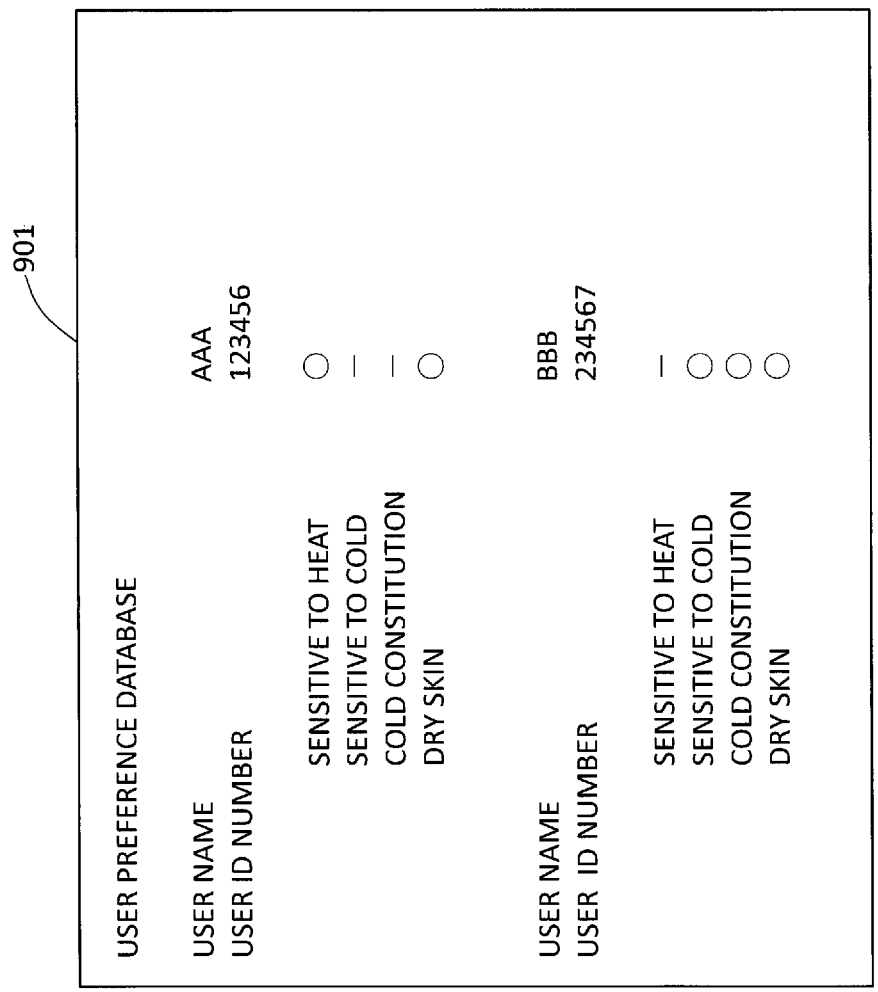
FIG. 3 is a diagram illustrating a database configuration of a user preference database stored in a preference storage unit of the comfort level display apparatus illustrated in FIG. 1.

The preference storage unit 101 stores a user preference database 901 as illustrated in FIG. 3. In the user preference database 901, a user name and a user ID number are linked with data as to whether or not the user falls under each of items "sensitive to heat", "sensitive to cold", "cold constitution", and "dry skin", as illustrated in FIG. 3. In FIG. 3, "○" denotes that the user falls under the corresponding item, and "-" denotes that the user does not fall under the corresponding item.

Note that "cold constitution", "dry skin" and the like may be considered not as preferences of a user, but as dependent on characteristics of a human body. However, unlike objective information such as attribute information to be described later, "cold constitution", "dry skin" and the like are considered as subjective information of the user concerned. Therefore, this embodiment assumes that "cold constitution", "dry skin" and the like are treated as preference information instead of attribute information.

Figure 4:
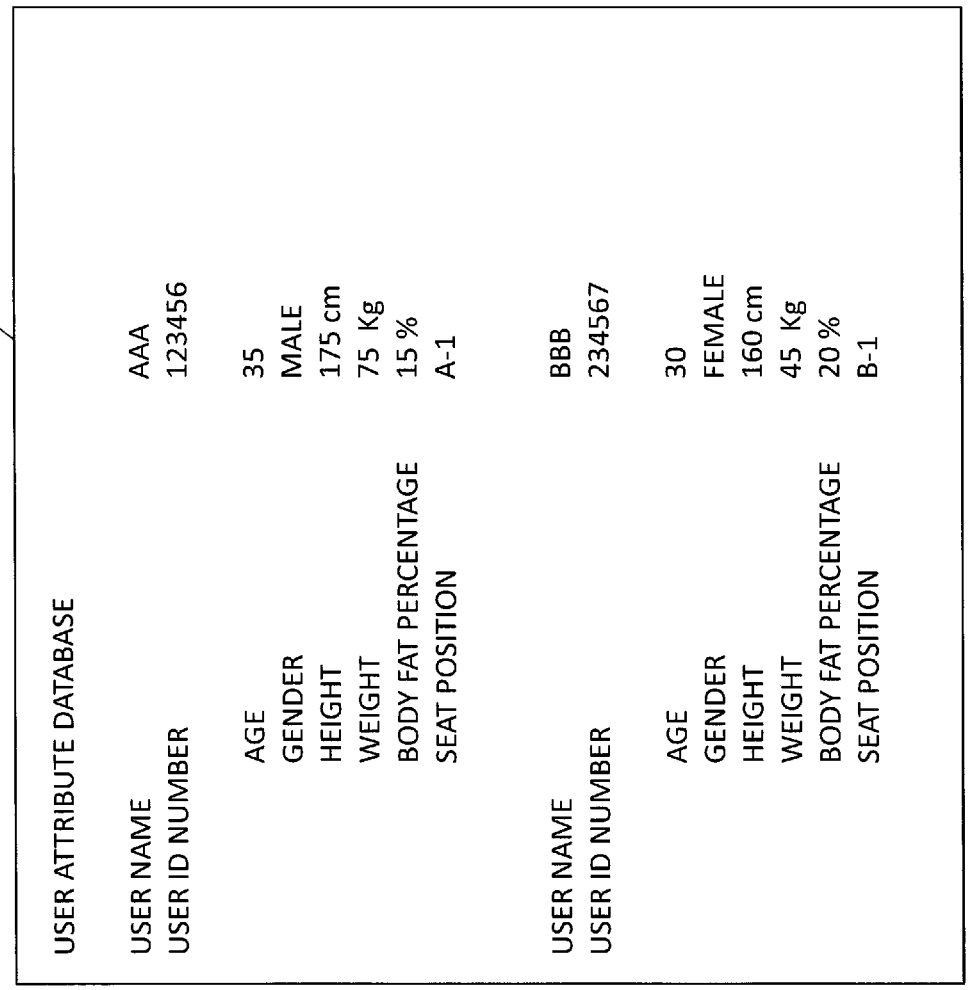
FIG. 4 is a diagram illustrating a database configuration of a user attribute database stored in an attribute storage unit of the comfort level display apparatus illustrated in FIG. 1.
Figure 7:
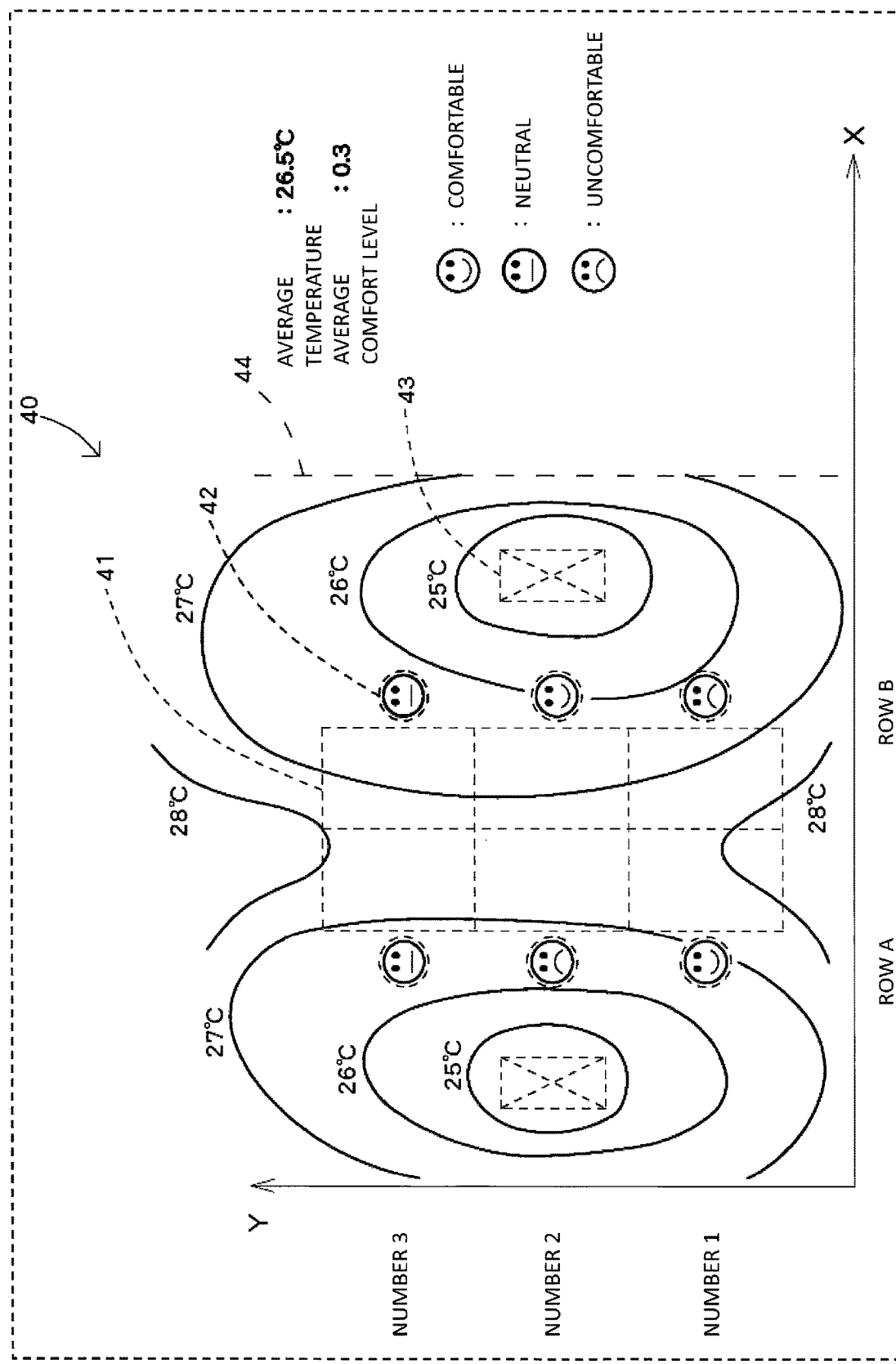
FIG. 7 is an example of display by the comfort level display apparatus illustrated in FIG. 1 (an example of display of distributions of temperature and comfort levels in an air-conditioned space)

The attribute storage unit 102 stores attributes of users. The attributes of a user include, for example, the age, gender, height, weight, body fat percentage, and seat position of the user. The attribute storage unit 102 stores a user attribute database 902. In the user attribute database 902, a user name and a user ID number are linked with attribute information such as the age, gender, height, weight, body fat percentage, and seat position of the user, as illustrated in FIG. 4. When office desks 41 and chairs 42 are placed in two rows each having three places in an air-conditioned space 40 as illustrated in FIG. 7, each seat position is displayed as a combination of a row name and a place number where each office desk 41 and each chair 42 are placed. For example, "A-1" denotes the seat position of row A-number 1.

The environmental data value acquisition unit 103 acquires environmental data values that indicate conditions in the air-conditioned space 40 illustrated in FIG. 7. The environmental data values include, for example, values of temperature, humidity, air velocity and the like in the air-conditioned space 40. The environmental data value acquisition unit 103 acquires each environmental data value by various types of sensors including a temperature sensor, a humidity sensor, and an air velocity sensor.

The comfort level value generation unit 104 generates a comfort level value that indicates comfort of a user in the air-conditioned space 40, based on preferences of the user stored in the preference storage unit 101, attributes of the user stored in the attribute storage unit 102, and environmental data values of the air-conditioned space 40 acquired by the environmental data value acquisition unit 103.

The comfort level value generation unit 104 generates a comfort level value by the following formula (1), using PMV which is an index to indicate comfort.

$$\text{Comfort level value} = \alpha \times PMV + \beta \times F - \gamma \times R - \delta \qquad (1)$$

A comfort level value of 0 indicates feeling neutral, +1 indicates slightly warm, +2 indicates warm, and +3 indicates hot, as in the case of PMV. Inversely, a comfort level value of −1 indicates feeling slightly cool, −2 indicates cool, and −3 indicates cold.

PMV is a comfort index to express whether a person feels warm or feels cold with a "numerical value based on a seven-point rating scale". PMV is calculated by a theoretical formula (formula (2) below) taking into account a total of six factors including four physical factors of temperature, humidity, air velocity, and radiation temperature and two human-side factors of clothing amount and activity amount, as factors that affect thermal comfort of a human body. For the four physical factors, values acquired by the environmental data value acquisition unit 103 are used. For the clothing amount and the activity amount, a standard clothing amount and activity amount during office work are used. Note that for the clothing amount, the temperature of skin and the temperature of clothing may be measured by a thermographic camera, and a value estimated based on a difference between these temperatures may be used. For the activity amount, a value obtained by analyzing an image of a monitoring camera or the like may be used.

$$PMV = (0.303 e^{-0.036M} + 0.028L) \times L \qquad (2)$$

Here, L is the thermal load (W/m²) and M is the metabolic rate (W/m²) of the human body.

In PMV, 0 indicates feeling neutral, +1 indicates slightly warm, +2 indicates warm, and +3 indicates hot. Inversely, in PMV, −1 indicates feeling slightly cool, −2 indicates cool, and −3 indicates cold. The range of PMV values recommended by ISO is −0.5<PMV<0.5.

In the formula (1), F is an influence level of preference information, R is an influence level of attribute information, and α, β, γ, and δ are coefficients which are changed according to characteristics of the user. In summer, for example, they are set such as α=1.23, β=−0.045, γ=−0.49, and δ=1.05. The influence level F of preference information and the influence level R of attribute information are calculated as indicated in the following formulas (3) and (4), respectively:

$$F = a \times F_1 + b \times F_2 + \qquad (3)$$

$$R = p \times R_1 + q \times R_2 + \qquad (4)$$

where $F_1, F_2, \ldots$ are numerical values that indicate levels of user preference elements, such as "sensitive to heat", "sensitive to cold", "cold constitution", and "dry skin". The influence level F of preference information is calculated based on one or a plurality of elements included in the preference information. $R_1, R_2, \ldots$ are numerical values that indicate levels of user attribute elements, such as "age", "gender", "height", "weight", "body fat percentage", and "seat position". The influence level R of attribute information is calculated based on one or a plurality of elements included in the attribute information. Note that a, b, ..., p, q, ... are coefficients.

Note that as the index to indicate comfort, Standard new Effective Temperature (SET*) or the like may be used in place of PMV. Based on air temperature, humidity, air current, radiant heat, and clothing amount, SET* expresses comfort by an air temperature at which sensation would be the same as when the relative humidity is 50% with no air current. Comfort level values may be generated based on wet-bulb globe temperature WBGT, effective temperature ET, new effective temperature ET*, OUT_SET*, operative temperature OT, humid operative temperature HOT, standard humid operative temperature SHOT, corrected humid operative temperature HOTV, corrected new effective temperature ETV, universal effective temperature ETU, heat stress index HSI, temperature-humidity index THI, temperature sensation index TSI, PET, ETFe, UTCI, mean radiant temperature MRT, $t^*_{mrt}$, OUT_MRT, wind chill index WCI, corrected effective temperature CET and the like.

The wet-bulb globe temperature WBGT is an empirical formula created to prevent heat strokes. The wet-bulb globe temperature WBGT takes into account air current and radiation, in addition to air temperature and humidity. The wet-bulb globe temperature WBGT is calculated by the following formula (5):

$$\text{WBGT (outdoor)} = 0.7Tw + 0.2Tg + 0.1T \quad (5)$$

where T: dry-bulb temperature (° C.), Tw: natural wet-bulb temperature (° C.), and Tg: globe temperature (° C.).

The effective temperature ET is an air temperature at a relative humidity of 100% with no wind that gives the same thermal sensation as in the actual environment. The new effective temperature ET* is an index based on a thermal equilibrium formula that can comprehensively evaluate air temperature, humidity, air current, radiation, clothing amount, and metabolism. The new effective temperature ET* is a temperature that takes into account, using a two-node model, the function of adjusting body temperature through sweating. The new effective temperature ET* assumes that the relative humidity in the standard environment is 50%. The new standard effective temperature SET* assumes, as the standard environment, an air velocity of 0.135 m/s and a metabolic rate M (met), in addition to the relative humidity of 50%. The new standard effective temperature SET* gives the standard clothing amount expressed by the following formula (6), and allows comparison of thermal environments under different conditions.

$$Icl \cdot s = 1.33/(M+0.74) - 0.095 \quad (6)$$

The operative temperature OT is an index that takes into account only air temperature and radiation. The operative temperature OT is a weighted average value of a dry-bulb temperature T and a mean radiant temperature Tr. The operative temperature OT is calculated by the following formula (7):

$$OT = (h_c \times T + h_r \ast Tr)/(h_c + h_r) \quad (7)$$

where T: dry-bulb temperature (° C.), Tr: mean radiant temperature (° C.), $h_c$: convective heat transfer rate (W/° C. m$^2$), and $h_r$: radiant heat transfer rate (W/° C. m$^2$).

The humid operative temperature HOT is an index that allows evaluation of the influence of humidity on the operative temperature OT. The humid operative temperature HOT expresses an air temperature at a relative humidity of 100% at which the amount of heat loss from the human body in the actual thermal environment is equal to the amount of heat loss due to transpiration from the skin.

The standard humid operative temperature SHOT uses a standard air velocity (0.1 m/s) to incorporate the influence of air current into the humid operative temperature HOT. The standard humid operative temperature SHOT is based on the environment with a standard clothing amount (0.6 clo) and a standard relative humidity (100%).

The corrected humid operative temperature HOTV is an index that can express temperature conversion values of the influence of air current, radiation, and humidity by thermal velocity field (TVF), effective radiation field (ERF), and reduced-effective humid field (RHF). The corrected humid operative temperature HOTV is calculated by the following formula (8). Note that the corrected humid operative temperature HOTV does not include the influence of solar radiation and conduction.

$$HOTV = T + (TVF/K_{tv}) + (ERF/K_{tv}) + (RHF/K_{tv}) \quad (8)$$

Here, T: dry-bulb temperature (° C.) and $K_{tv}$: humid universal heat transfer rate of the human body (W/° C. m$^2$).

The corrected new effective temperature ETV is an index such that the HOTV based on a relative humidity of 100% is converted into one based on a relative humidity of 50%. The corrected new effective temperature ETV is defined using the effective humid field (EHF) in place of the reduced-effective humid field (RHF). Note that the corrected new effective temperature ETV does not include the influence of solar radiation and conduction. The corrected new effective temperature ETV is expressed by the following formula (9):

$$ETV = T + (TVF/h_v) + (ERF/h_v) + (EHF/h_v) \quad (9)$$

where T: dry-bulb temperature (° C.), $h_o$: reference convective heat conductance rate (W/° C. m$^2$), $h_r$: radiant heat transfer rate (W/° C. m$^2$), $h_v = h_o \times Fclo + h_r \times Fcl$, Fclo: reference clothing conductance efficiency (ND), and Fcl: clothing conductance efficiency (ND).

The universal effective temperature ETU is an index that incorporates the influence of solar radiation and conduction, and can be applied to both an outdoor thermal environment and a non-uniform thermal environment. The universal effective temperature ETU is expressed by the following formula (10):

$$ETU = t_{ao} + (\Sigma NUATFi/h_u) + (\Sigma TVFi/h_u) + (\Sigma ERFLi/h_u) + \\ (\Sigma TVFri/h_u) + (\Sigma ERFSi/h_u) + (\Sigma EHFi/h_u) + \\ (\Sigma TVFei/h_u) + (\Sigma SECFj/h_u) \quad (10)$$

where $t_{ao}$: representative air temperature (° C.), NUATFi: non-uniform air temperature field representing the influence of a difference between the representative air temperature and the air temperature around a portion i (W/m$^2$), TVFi: thermal velocity field representing the influence of air velocity on the human body (W/m$^2$), ERFLi: long-wavelength effective radiation field representing the influence of long-wavelength radiation on the human body (W/m$^2$), TVFri: field representing an effective temperature change due to long-wave radiation caused by a difference between an environmental condition for evaluation and a reference condition (W/m$^2$), ERFSi: short-wavelength effective radiation field representing the influence of short-wave radiation (solar radiation) on the human body (W/m$^2$), FHFi: effective humidity field representing the influence of humidity on the human body (W/m$^2$), TVFei: field representing an effective change in water vapor pressure due to evaporation caused by a difference between the environmental condition for evaluation and the reference condition (W/m$^2$), SECFj: standard effective conduction field representing the influence of conduction at a contact surface on the human body based on a representative member (W/m$^2$), $h_u = h_v \times f_n + h_{do} \times f_d$, $h_v = h_{co} \times Fcleo + h_r \times Fcle$, $h_{do}$: heat conductance of the representative member (W/m$^2$), $f_n$: ratio of non-contact area to the total human body skin area (ND), $f_d$: ratio of contact area to the total human body skin area (ND), $h_{co}$: convective heat transfer rate under the reference condition (W/Km$^2$), $h_r$: radiant heat transfer rate (W/m$^2$), Fcleo: effective heat transfer efficiency under the reference condition (ND), and Fcle: effective heat transfer efficiency of clothing (ND).

The heat stress index HSI is an index that focuses on the evaporation of moisture from the human body. The heat stress index HSI is obtained by a thermal equilibrium formula for the human body assuming a skin temperature of 35° C. The heat stress index HSI is expressed by the following formula (11):

$$\text{HSI } (\%) = (E/E \max) \times 100 \quad (11)$$

where E: evaporation emission amount necessary for the human body to maintain thermal equilibrium (W/m$^2$) and E max: maximum possible evaporation heat dissipation amount when the human body is completely wet (W/m$^2$).

The temperature-humidity index THI is a subjective empirical index that can comprehensively evaluate air temperature and humidity. When the temperature-humidity index THI is 70, 10% of people feel uncomfortable in the current environment. When the temperature-humidity index THI is 75, 50% of people feel uncomfortable in the current environment. When the temperature-humidity index THI is 80, 100% of people feel uncomfortable in the current environment. The temperature-humidity index THI is calculated by the following formula (12a) or formula (12b):

$$\text{THI} = 0.72(Tv + Tw) + 40.6 \quad (12a)$$

$$\text{THI} = 0.81T + 0.01RH(0.99T - 14.3) + 46.3 \quad (12b)$$

where T: dry-bulb temperature (° C.), Tv: wet-bulb temperature (° C.), and RH: relative humidity (%).

The temperature sensation index TSI is an index proposed as a simple index that is not based on human body heat balance analysis and does not require the use of a numerical program. The temperature sensation index TSI takes into account the influence of outdoor radiation and wind. The temperature sensation index TSI is calculated by the following formula (13):

$$\text{TSI} = a1(\sqrt{U} + a2) \times (Tb - To) + a3 \quad (13)$$

where U: air velocity (m/s); To: operative temperature (° C.); Tb: reference temperature (36.8° C.); and a1, a2, a3: dimensionless constants.

PET is an index developed from PMV and is widely used in Europe. PET comprehensively represents the influence of air temperature, radiation, air velocity, and humidity based on heat balance of the human body.

ETFe is an index that takes into account a difference in posture and the surface temperature of a substance in contact, in addition to air temperature, air velocity, humidity, outdoor long-wavelength radiation, and solar radiation. In ETFe, the heat transfer rate by which each effective field is divided is a function of air velocity. In ETFe, the amount of change in temperature due to solar radiation, which should be independent of the air velocity, is affected by the air velocity. ETFe is calculated by the following formula (14):

$$\text{EFTe} = T + (\text{TVF}_{hta}/h_{fL}) + (\text{ERF}_{htaL}/h_{fL}) + (\text{ECF}_{hta}/h_{fL}) + (\text{EHF}_{ETFe}/h_{fL}) + (\text{ERF}_{htaS}/h_{fL}) \quad (14)$$

where T: dry-bulb temperature (° C.), $\text{TVF}_{hta}$: thermal velocity field of convective heat transport (W/m$^2$), $\text{ERF}_{htaL}$: long-wavelength effective radiation field taking into account long-wavelength radiation in outdoor space (W/m$^2$), $\text{ECF}_{hta}$: effective conduction field representing the influence of conduction at a contact surface on the human body (W/m$^2$), $\text{EHF}_{ETFe}$: effective humidity field representing the influence of humidity (W/m$^2$), $\text{ERF}_{htaS}$: short-wavelength effective radiation field in outdoor space representing the influence of solar radiation amount (W/m$^2$), and $h_{fL}$: radiant heat transfer rate taking into account long-wavelength radiation outdoors (W/m$^2$ k).

UTCI is an index proposed by the International Society of Biometeorology. UTCI is expressed by integrating the influence of air temperature, radiation, air velocity, and humidity, based on heat balance calculation by a UTCI-Fiala MN model. In UTCI, the standard conditions are prescribed as 2.3 MET (4 km/h walking), air velocity 0.5 m/s (observation altitude 10 m), mean radiant temperature equivalent to air temperature, and relative humidity 50% (20 hpa if the air temperature exceeds 29° C.).

The mean radiant temperature MRT is used as a radiation parameter for calculating a sensation index. The mean radiant temperature MRT is an indication of a mean temperature on surrounding surfaces obtained by averaging radiant temperatures received from all surrounding directions. The mean radiant temperature MRT is calculated by the following formula (15):

$$t_r = \Sigma(t_i \times \Phi_i) \quad (15)$$

where $t_i$: surface temperature on a surface i (° C.) and $\Phi_i$: shape factor of the surface i (ND).

The mean radiant temperature $t^*_{mrt}$ is one type of mean radiant temperature that takes into account solar radiation. The mean radiant temperature $t^*_{mrt}$ is calculated by the following formula (16):

$$t^*_{mrt} = [t_{mrt}^4 + f_p \times a_k \times (I^*/\varepsilon_p \cdot \sigma)]^{0.25} - 273.2 \quad (16)$$

where $t_{mrt}$: mean radiant temperature not including direct solar radiation, $f_p$: human body projected area rate (ND), $a_k$: absorption rate for short-wavelength radiation (ND), $I^*$: normal surface direct solar radiation amount (W/m$^2$), $\varepsilon_p$: emissivity of clothed human body (=0.97 (ND)), and σ: Stefan-Boltzmann constant (5.67×10$^{-8}$ (W/m$^2$K$^4$)).

OUT_MRT is one type of mean radiant temperature that takes into account solar radiation. OUT_SET* is an index that takes into account solar radiation by using OUT_MRT as an input term of MRT.

The wind chill index WCI is an index used to prevent frostbite and hypothermia in winter. The wind chill index WCI is calculated from a function formula of air temperature and air velocity, as indicated in the following formula (17):

$$\text{WCI} = (33 - T) \times (10.45 + 10U^{0.5} - U) \quad (17)$$

where T: dry-bulb temperature (° C.) and U: air velocity (m/s).

The corrected effective temperature CET is a corrected index such that the radiation effect of surrounding walls is added to the effective temperature ET. A globe thermometer is used for the corrected effective temperature CET, instead of a dry-bulb thermometer used for the effective temperature ET.

The display data generation unit 105 synthesizes the comfort level values generated by the comfort level value generation unit 104 and the environmental data values acquired by the environmental data value acquisition unit 103 so that the display unit 106 can display these two pieces of data superimposed over each other. Then, the display data generation unit 105 outputs data obtained by synthesis to the display unit 106 as display data.

The display unit 106 displays the display data input from the display data generation unit 105. The display unit 106 is, for example, the display 27 illustrated in FIG. 2.

Operation of the comfort level display apparatus 100 of this embodiment configured as described above and display by the display unit 106 will be described with reference to FIGS. 5 to 7.

Figure 5:
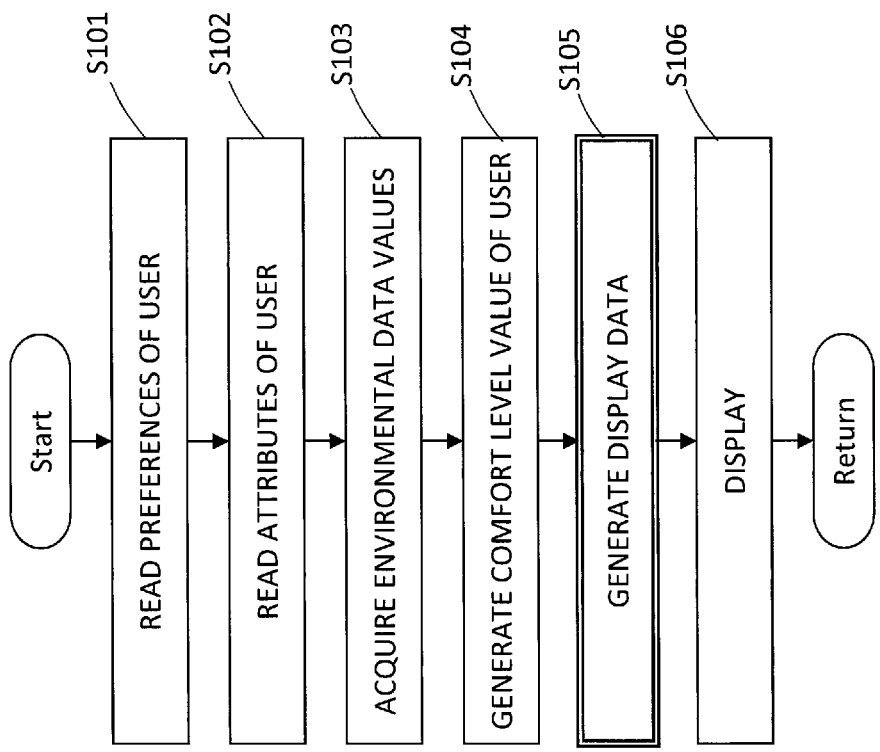
FIG. 5 is a flowchart illustrating operation of the comfort level display apparatus illustrated in FIG. 1.

As indicated in steps S101 and S102 of FIG. 5, the comfort level value generation unit 104 reads preference data of a user from the preference storage unit 101 and reads attribute data of the user from the attribute storage unit 102. As indicated in step S103 of FIG. 5, the comfort level value generation unit 104 acquires environmental data values from the environmental data value acquisition unit 103. Then, as indicated in step S104 of FIG. 5, the comfort level value generation unit 104 generates a comfort level value of the user, using the formulas (1) to (4) described above. As indicated in step S105 of FIG. 5, the display data generation unit 105 generates display data by synthesizing the comfort level value generated by the comfort level value generation unit 104 and the environmental data values acquired from the environmental data value acquisition unit 103, and outputs the generated display data to the display unit 106. As indicated in step S106 of FIG. 5, the display unit 106 displays the input display data.

Figure 6:
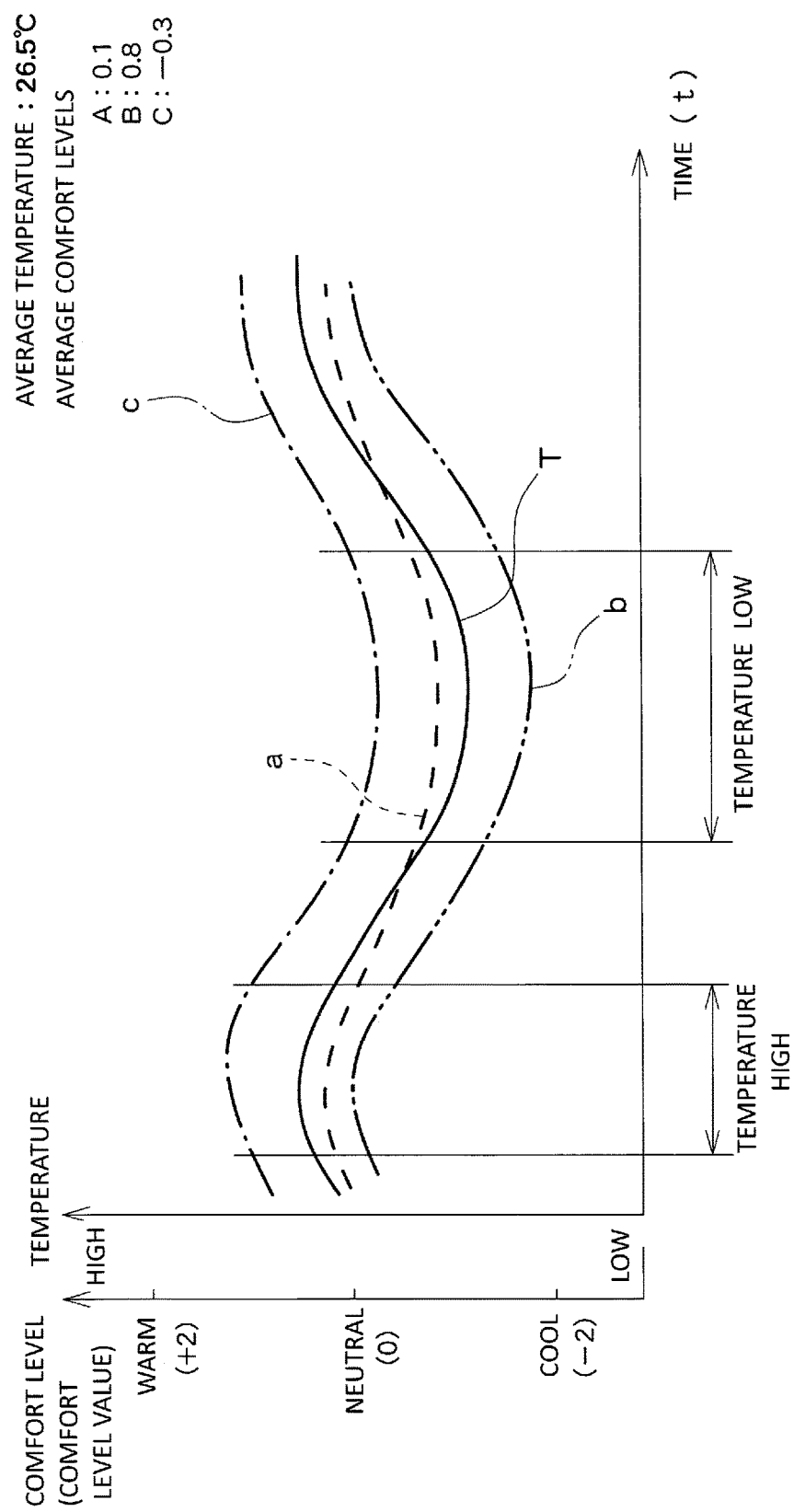
FIG. 6 is an example of display by the comfort level display apparatus illustrated in FIG. 1 (an example of display of changes over time in temperature and comfort levels)

FIG. 6 illustrates an example of display by the display unit 106. FIG. 6 is a diagram illustrating changes in temperature and changes over time in the comfort levels of users at a specific position in the air-conditioned space 40 as represented on an XY plane in FIG. 7. In the air-conditioned space 40, the office desks 41 and the chairs 42 are placed on the floor and vents 43 of air conditioning equipment are placed on the ceiling, as illustrated in FIG. 7. The air-conditioned space 40 is partitioned with a partition 44. The office desks 41 and the chairs 42 are arranged in two rows of row A and row B each having three places from number 1 to number 3. A seat position is denoted as [row name-place number]. Point [A-1] illustrated in FIG. 6 denotes the seat position of row A-number 1. In FIG. 6, a solid line T is displayed. The solid line T indicates changes over time in temperature at the seat position of row A-number 1 in the air-conditioned space 40 illustrated in FIG. 7. In FIG. 6, a dashed line a, a dash-dot-dot-dash line b, and a dash-dot-dash line c are also displayed. The dashed line a indicates the comfort level of a standard user A, the dash-dot-dot-dash line b indicates the comfort level of a sensitive-to-cold user B, and the dash-dot-dash line c indicates the comfort level of a sensitive-to-heat user C, in the seat position of row A-number 1 in the air-conditioned space 40 illustrated in FIG. 7. The standard user A is a user who is neither "sensitive to heat" nor "sensitive to cold" and has neither "cold constitution" nor "dry skin" and whose "age", "height", "weight", "body fat percentage" and the like are the average values of that company. The sensitive-to-cold user B is a female user who is "sensitive to cold" and has a "cold constitution" and whose "weight" and "body fat percentage" are smaller than the standard ones of that company. The sensitive-to-heat user C is a male user who is "sensitive to heat" and whose "weight" and "body fat percentage" are greater than the standard ones of that company.

Note that the temperature represented by the solid line T and the comfort level values of the users A, B, and C represented by the dotted line a, the dash-dot-dot-dash line b, and the dash-dot-dash line c are discrete values over time. In FIG. 6, however, interpolation is performed on the discrete values so as to be displayed as smooth lines. This interpolation will be described later as Embodiment 4.

As illustrated in FIG. 6, during a time period when the temperature is relatively high, the sensitive-to-heat user C represented by the dash-dot-dash line c feels warm and not very comfortable, and the comfort level value is approximately +1. On the other hand, even at the same temperature, the sensitive-to-cold user B represented by the dash-dot-dot-dash line b feels neither hot nor cold and finds the situation comfortable, and the comfort level value is approximately 0. The comfort level experienced by the standard user A is approximately 0.2, which is between the comfort levels of the user B and the user C.

Conversely, during a time period when the temperature is relatively low, the sensitive-to-heat user C represented by the dash-dot-dash line c feels neither hot nor cold and finds the situation comfortable, and the comfort level value is approximately 0. On the other hand, even at the same temperature, the sensitive-to-cold user B represented by the dash-dot-dot-dash line b feels cool and not very comfortable, and the comfort level value is approximately −1. The comfort level experienced by the standard user A is approximately −0.5, which is between the comfort levels of the user B and the user C.

A manager of the air-conditioning equipment (air-conditioning manager) can perceive the correlation between changes in the comfort level values of the users A, B, and C and the temperature from the display of FIG. 6. Then, for example, when the sensitive-to-heat user C is sitting in the seat position A-1, the air-conditioning manager can adjust the setting temperature of the air-conditioning equipment so that the temperature in the seat position A-1 becomes slightly lower. On the other hand, when the sensitive-to-cold user B is sitting in the seat position A-1, the air-conditioning manager can adjust the setting temperature of the air-conditioning equipment so that the temperature in the seat position A-1 becomes slightly higher.

As illustrated in FIG. 7, the comfort level display apparatus 100 can display on the display unit 106 a temperature distribution at a certain time in the air-conditioned space 40 as represented on the XY plane, over which marks representing the comfort levels of users sitting in individual seat positions at that time are superimposed. As described above, the office desks 41 and the chairs 42 are placed on the floor and the vents 43 of the air-conditioning equipment are placed on the ceiling, in the air-conditioned space 40 illustrated in FIG. 7. The air-conditioned space 40 is partitioned with the partition 44. A facial mark indicating the comfort level of the user is displayed at the center of each chair 42. In FIG. 7, a smiling face mark indicates that the user is feeling comfortable. The smiling face mark corresponds to the comfort level value of the user in that seat position in the range of −0.5 to +0.5. A frowning face mark with both corners of the mouth down indicates that the user in that seat position is feeling warm or cool. In other words, the frowning face mark indicates that the user is feeling uncomfortable. The frowning face mark corresponds to the comfort level value exceeding +1.5 or the comfort level value smaller than −1.5. A normal face mark indicates that the user is feeling slightly warm or slightly cool, which is between the above two cases. In other words, the normal face mark indicates that the user is in a neutral state between comfortable and uncomfortable and is feeling neither comfortable nor uncomfortable. The normal face mark corresponds to the comfort level value between 0.5 and 1.5 and between −0.5 and −1.5. With such display, the air-conditioning manager can easily recognize the temperature distribution in the air-conditioned space 40 and sensation experienced by each user at a certain time.

Based on the display illustrated in FIG. 7, the air-conditioning manager can easily determine the position in the air-conditioned space 40 for which the setting temperature needs to be adjusted. For example, when the user in the seat position A-2 is displayed with a frowning face and this user is "sensitive to heat", the air-conditioning manager can adjust the setting of the air-conditioning equipment so as to increase the amount of cold air to the vicinity of the seat position A-2 in which this user is sitting. For example, the air-conditioning manager can make adjustments such as changing the direction of a louver or lowering the temperature setting so as to lower the temperature of cold air. On the other hand, for example, when the user in the seat position A-2 is "sensitive to cold" and has a "cold constitution", the air-conditioning manager can adjust the setting of the air-conditioning equipment so as to decrease the amount of cold air to the vicinity of the seat position A-2 in which this user is sitting. For example, the air-conditioning manager can make adjustments such as changing the direction of a louver or raising the temperature setting so as to raise the temperature of cold air.

As described above, the comfort level display apparatus 100 of this embodiment displays the comfort level values and the environmental data values superimposed over each other on the display unit 106, so that the air-conditioning manager can easily perceive the relationship between the comfort levels and the environmental data. Therefore, the comfort level display apparatus 100 of this embodiment allows the air-conditioning manager to appropriately adjust the air-conditioning equipment.

Embodiments 2 and 3

Next, a comfort level display apparatus 200 of Embodiment 2 will be described with reference to FIGS. 8 and 9. A comfort level display apparatus 250 of Embodiment 3 will be described with reference to FIGS. 10 and 11. Then, examples of display by the comfort level display apparatuses 200 and 250 will be described with reference to FIGS. 12 to 15.

Embodiment 2

Figure 8:
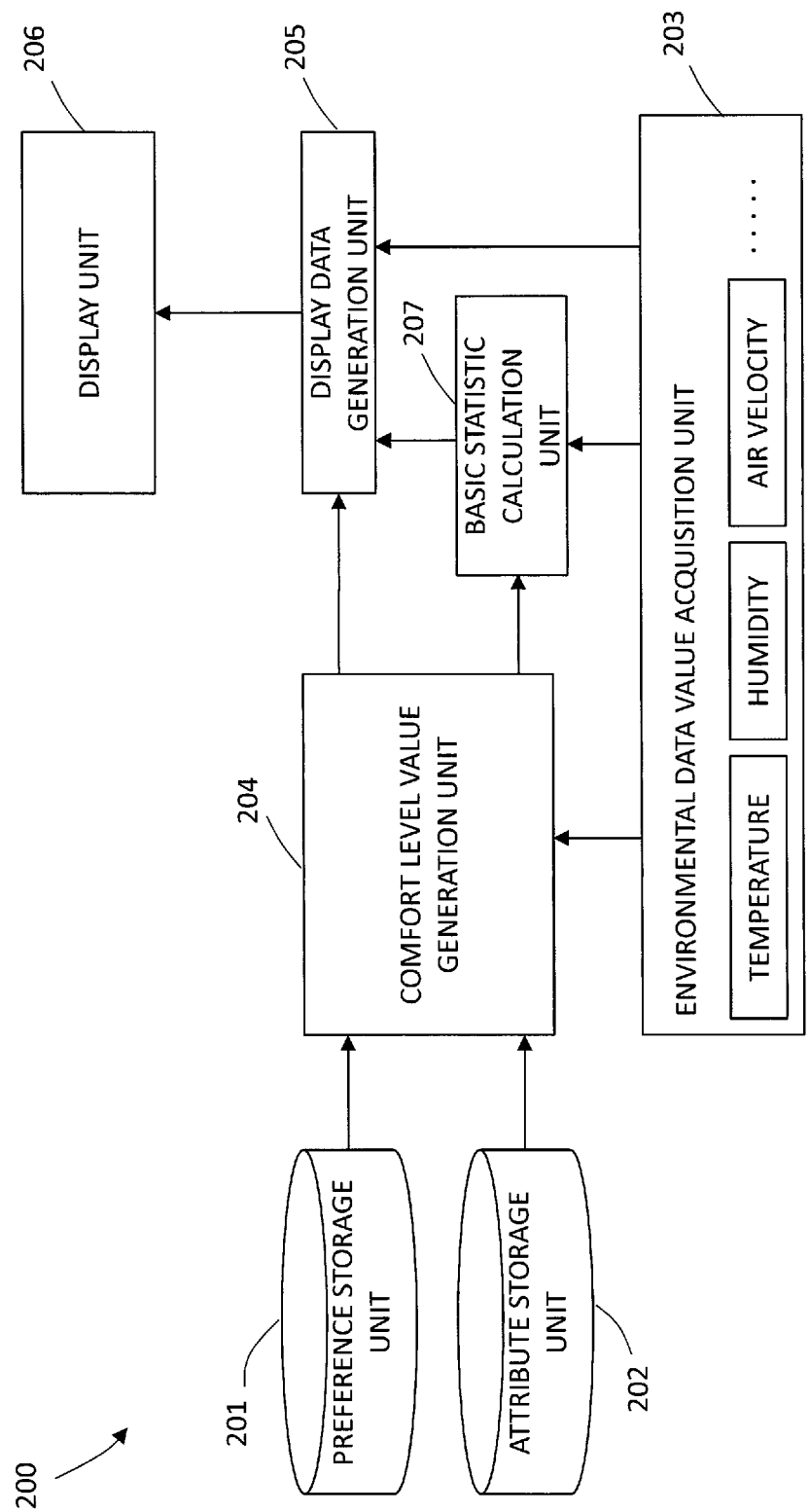
FIG. 8 is a functional block diagram illustrating a configuration of a comfort level display apparatus in Embodiment 2.

As illustrated in FIG. 8, the comfort level display apparatus 200 of Embodiment 2 is such that a basic statistic calculation unit 207 is added to the comfort level display apparatus 100 described with reference to FIG. 1. A preference storage unit 201, an attribute storage unit 202, an environmental data value acquisition unit 203, a comfort level value generation unit 204, and a display unit 206 that constitute the comfort level display apparatus 200 are substantially the same as the preference storage unit 101, the attribute storage unit 102, the environmental data value acquisition unit 103, the comfort level value generation unit 104, and the display unit 106 of the comfort level display apparatus 100 described with reference to FIG. 1, and thus description will be omitted.

The basic statistic calculation unit 207 calculates comfort-level-value basic statistics and environmental-data-value basic statistics. The comfort-level-value basic statistics are basic statistics that are representative of user comfort level values generated by the comfort level value generation unit 204. The comfort-level-value basic statistics include groups (1) to (5) below.

(1) Temporal average values or spatial average values of user comfort level values (2) Temporal median values or spatial median values of user comfort level values (3) Temporal maximum values or spatial maximum values of user comfort level values (4) Temporal minimum values or spatial minimum values of user comfort level values (5) Temporal mode values or spatial mode values of user comfort level values The environmental-data-value basic statistics are basic statistics that are representative of environmental data of the air-conditioned space 40 acquired by the environmental data value acquisition unit 203. The environmental-data-value basic statistics include groups (6) to (10) below.

(6) Temporal average values or spatial average values of environmental data values of the air-conditioned space (7) Temporal median values or spatial median values of environmental data values of the air-conditioned space (8) Temporal maximum values or spatial maximum values of environmental data values of the air-conditioned space (9) Temporal minimum values or spatial minimum values of environmental data values of the air-conditioned space

(10) Temporal mode values or spatial mode values of environmental data values of the air-conditioned space The temporal average value is the average value in a predetermined period such as one day, one week, or one month, for example. The spatial average value is the average value of user comfort levels in a block, or the average value of environmental data values in the block. For example, the air-conditioned space 40 as represented by XY of FIG. 7 is divided into several blocks. Then, the average value of user comfort levels in each obtained block or the average value of environmental data values in each obtained block is the spatial average value. That is, the spatial average value is the average value in a predetermined space.

Similarly, the temporal median value and the spatial median value are the median value in a predetermined period and the median value in a predetermined space, respectively. The temporal maximum value and the spatial maximum value are the maximum value in a predetermined period and the maximum value in a predetermined space, respectively. The temporal minimum value and the spatial minimum value are the minimum value in a predetermined period and the minimum value in a predetermined space, respectively. The temporal mode value and the spatial mode value are the mode value in a predetermined period and the mode value in a predetermined space, respectively.

As is well known, the average value is a numerical value obtained by adding values of all pieces of data and dividing the sum by the number of the pieces of data. The average value is often used as an index that represents the center of a data distribution. When the data is close to a normal distribution, the average value indicates the center of the data distribution. However, when the distribution is biased, the average value may not necessarily indicate the center of the data distribution. The median value is a middle value when pieces of data are arranged in ascending order. The mode value is a value that appears most frequently in a data set. When the average value does not indicate the center of the data distribution, using the median value or the mode value may allow the center of the data distribution to be obtained more accurately. The maximum value and the minimum value are indices that indicate the width of spread of data values. The maximum value and the minimum value are indices used to find a singularity in data, for example.

A display data generation unit 205 generates display integrated data by synthesizing the user comfort level values generated by the comfort level value generation unit 204, the environmental data values of the air-conditioned space 40 acquired by the environmental data value acquisition unit 203, and one or a plurality of statistics of the comfort-level-value basic statistics representative of the user comfort level values and the environmental-data-value basic statistics representative of the environmental data values of the air-conditioned space 40 calculated by the basic statistic calculation unit 207. Then, the display data generation unit 205 outputs the generated display integrated data to the display unit 206. In more detail, the display data generation unit 205 synthesizes one or a plurality of values of the temporal average value, spatial average value, temporal median value, spatial median value, temporal maximum value, spatial maximum value, temporal minimum value, spatial minimum value, temporal mode value, and spatial mode value of the user comfort level values, and the temporal average value, spatial average value, temporal median value, spatial median value, temporal maximum value, spatial maximum value, temporal minimum value, spatial minimum value, temporal mode value, and spatial mode value of the environmental data values of the air-conditioned space 40 calculated by the basic statistic calculation unit 207 with the comfort level values and the environmental data values, and outputs the display integrated data obtained by synthesis to the display unit 206.

Operation of the comfort level display apparatus 200 will now be described with reference to FIG. 9. An example will be described below where the basic statistic calculation unit 207 calculates the temporal average value or spatial average value of the comfort level values generated by the comfort level value generation unit 204, and the temporal average value or spatial average value of the environmental data values acquired by the environmental data value acquisition unit 203. Steps that are the same as those in the operation of the comfort level display apparatus 100 described with reference to FIG. 5 will be denoted by the same reference sings as those in FIG. 5 and described briefly.

Figure 9:
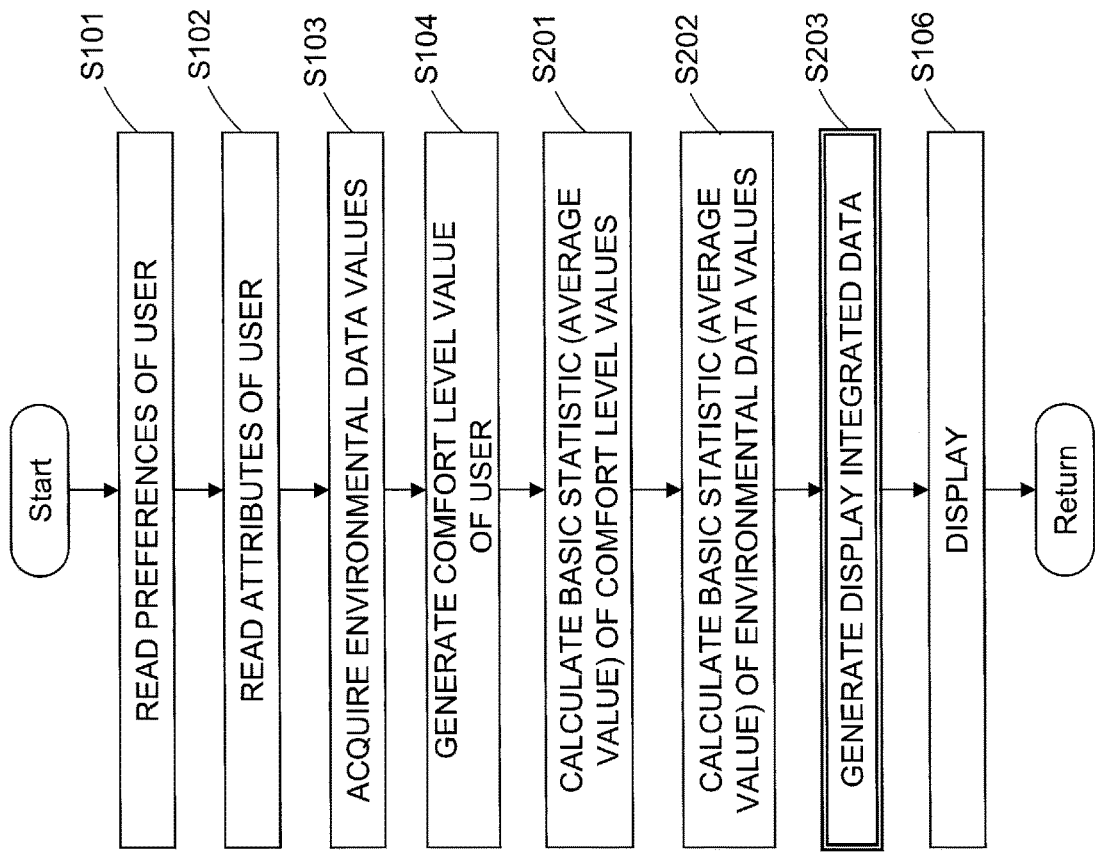
FIG. 9 is a flowchart illustrating operation of the comfort level display apparatus illustrated in FIG. 8.

As indicated in steps S101 to S103 of FIG. 9, the comfort level value generation unit 204 reads preferences of a user and attributes of the user and acquires environmental data values. As indicated in step S201 of FIG. 9, the basic statistic calculation unit 207 calculates the temporal average value or spatial average value of comfort level values which belongs to the group (1) of the comfort-level-value basic statistics. In step S202 of FIG. 9, the basic statistic calculation unit 207 calculates the temporal average value or spatial average value of the environmental data values of the air-conditioned space 40 which belongs to the group (6) of the environmental-data-value basic statistics.

As indicated in step S203 of FIG. 9, the display data generation unit 205 generates display integrated data by synthesizing the user comfort level values generated by the comfort level value generation unit 204, the environmental data values of the air-conditioned space 40 acquired by the environmental data value acquisition unit 203, and one or a plurality of values of the temporal average value or spatial average value of the user comfort level values and the temporal average value or spatial average value of the environmental data values of the air-conditioned space 40 calculated by the basic statistic calculation unit 207, and outputs the generated display integrated data to the display unit 206. Then, as indicated in step S106 of FIG. 9, the display unit 206 displays the display integrated data generated by the display data generation unit 205. An example of display by the display unit 206 will be described after the comfort level display apparatus 250 of Embodiment 3 is described.

The example where the basic statistic calculation unit 207 calculates the average values has been described above. When the median values are calculated and displayed, in step S201 of FIG. 9 the basic statistic calculation unit 207 calculates the temporal median value or spatial median value of the comfort level values which belongs to the group (2) of the comfort-level-value basic statistics, and in step S202 of FIG. 9 the basic statistic calculation unit 207 calculates the temporal median value or spatial median value of the environmental data values of the air-conditioned space 40 which belongs to the group (7) of the environmental-data-value basic statistics. Similarly, when the maximum values, minimum values, or mode values are calculated and displayed, the basic statistic calculation unit 207 calculates the maximum value, minimum value, or mode value of the comfort level values which belongs to the group (3), (4), or (5) of the comfort-level-value basic statistics, and calculates the maximum value, minimum value, or mode value of the environmental data values which belongs to the group (8), (9), or (10) of the environmental-data-value basic statistics in step S202 of FIG. 9. The rest of the operation is substantially the same as in the case of calculating the average values described above.

The display unit 206 may display different types of basic statistics of the comfort level values and the environmental data values in combination. For example, the basic statistic calculation unit 207 may calculate the temporal average value or spatial average value of the comfort level values and the temporal median value or spatial median value of the environmental data values of the air-conditioned space 40, and display these values on the display unit 206.

Embodiment 3

Figure 10:
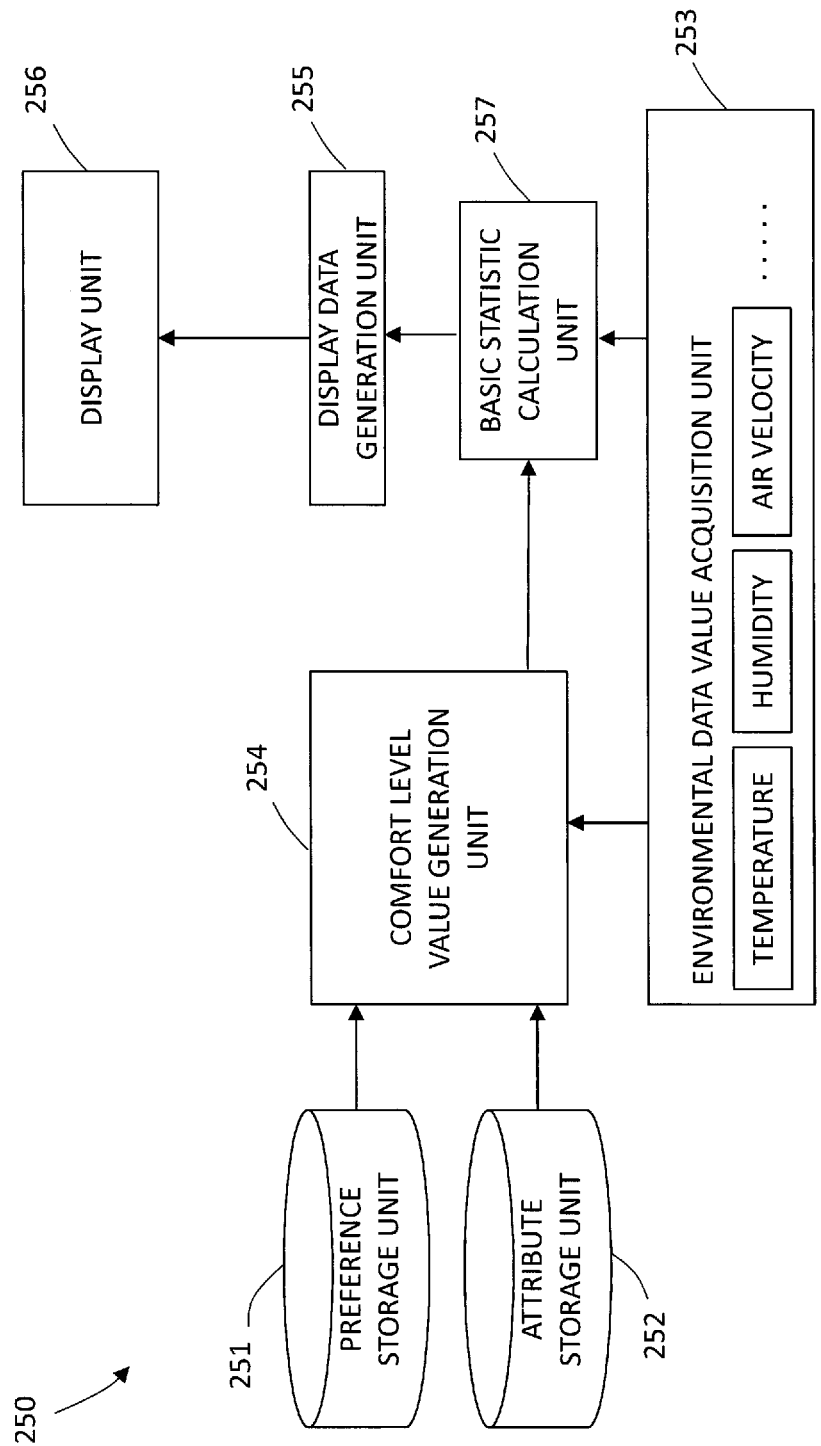
FIG. 10 is a functional block diagram illustrating a configuration of a comfort level display apparatus in Embodiment 3.
Figure 11:
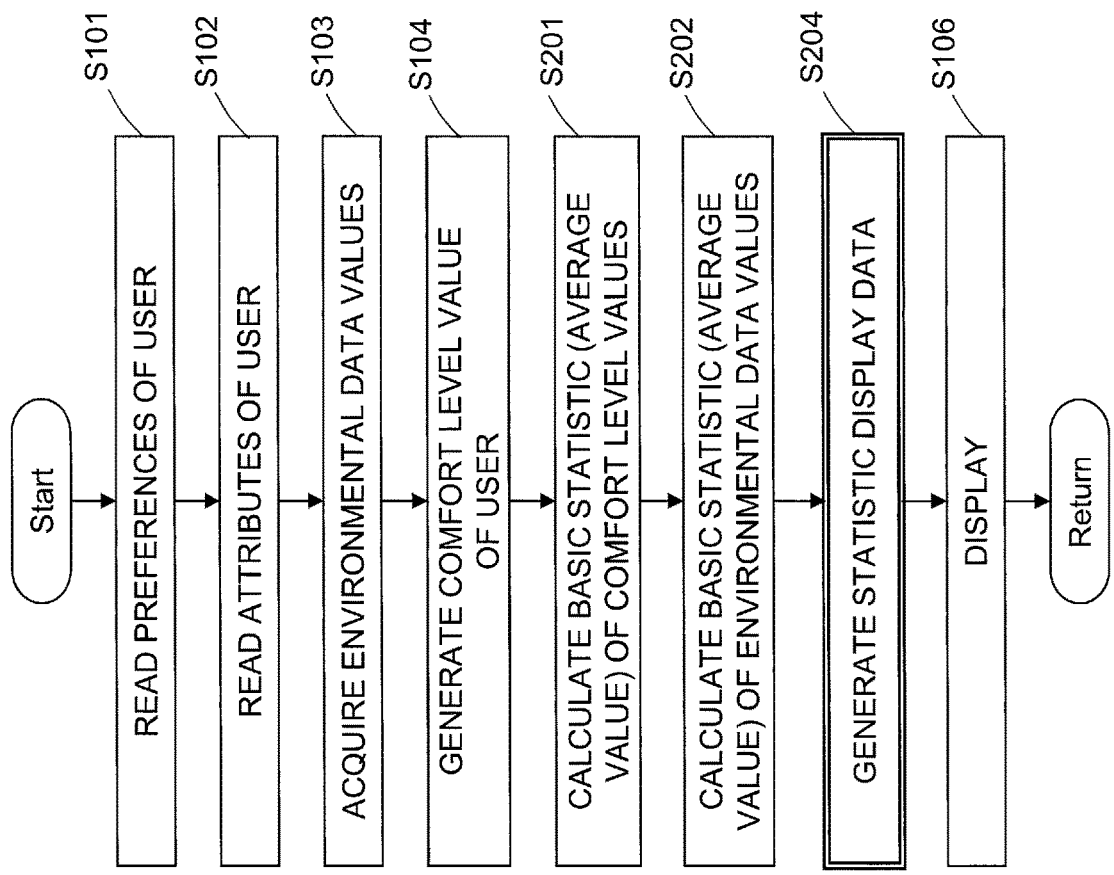
FIG. 11 is a flowchart illustrating operation of the comfort level display apparatus illustrated in FIG. 10.

As illustrated in FIGS. 10 and 11, a display data generation unit 255 of the comfort level display apparatus 250 of Embodiment 3 generates statistic display data by synthesizing one or a plurality of comfort-level-value basic statistics representative of user comfort level values and environmental-data-value basic statistics representative of environmental data values of the air-conditioned space 40 calculated by a basic statistic calculation unit 257, and outputs the statistic display data to a display unit 256. The display data generation unit 255 does not perform synthesis with the user comfort level values generated by a comfort level value generation unit 254 and the environmental data values acquired by an environmental data value acquisition unit 253. Therefore, the comfort level display apparatus 250 displays only the comfort-level-value basic statistics of the comfort levels and the environmental-data-value basic statistics of the environmental data on the display unit 256.

As described above, the comfort-level-value basic statistics and the environmental-data-value basic statistics include temporal average values, spatial average values, temporal median values, spatial median values, temporal maximum values, spatial maximum values, temporal minimum values, spatial minimum values, temporal mode values, and spatial mode values. An example will be described below where the basic statistic calculation unit 257 calculates the temporal average value or spatial average value of the comfort level values generated by the comfort level value generation unit 254, and the temporal average value or spatial average value of the environmental data values acquired by the environmental data value acquisition unit 253.

A preference storage unit 251, an attribute storage unit 252, the environmental data value acquisition unit 253, the comfort level value generation unit 254, and the display unit 256 that constitute the comfort level display apparatus 250 are the same as the preference storage unit 201, the attribute storage unit 202, the environmental data value acquisition unit 203, the comfort level value generation unit 204, and the display unit 206 of the comfort level display apparatus 200 described with reference to FIG. 8, and thus description will be omitted. Operation in steps S201 and S202 of FIG. 11 is the same as the operation in steps S201 and S202 indicated in FIG. 9 described above, and thus description will be omitted.

As indicated in FIG. 11, the comfort level display apparatus 250 generates statistic display data in step 204 of FIG. 11, in place of the display integrated data of step S203 of FIG. 9 (step S204). The display unit 256 displays the statistic display data (step S106).

<Examples of Display by the Comfort Level Display Apparatuses 200 and 250 of Embodiments 2 and 3>

Examples of display by the comfort level display apparatuses 200 and 250 of Embodiments 2 and 3 will now be described.

FIG. 6 is an example of display by the comfort level display apparatus 200 of Embodiment 2. As described above, FIG. 6 illustrates changes over time in temperature and the comfort levels of the users A, B, and C at the seat position A-1 of row A-number 1 which is a specific position in the air-conditioned space 40 as represented on the XY plane in FIG. 7. On the right side of FIG. 6, the average temperature in a predetermined period and numerical values of the average values of the comfort level values of the individual users in the predetermined period are displayed. FIG. 6 thus illustrates the changes over time in the comfort level values of the users A, B, and C generated by the comfort level value generation unit 204 (the dotted line a, the dash-dot-dot-dash line b, and the dash-dot-dash line c). FIG. 6 also illustrates the changes over time in the environmental data values of the air-conditioned space 40 acquired by the environmental data value acquisition unit 203 (the solid line T). FIG. 6 further illustrates the temporal average values of the comfort level values of the users A, B, and C and the temporal average value of temperatures, which are the environmental data values of the air-conditioned space 40, calculated by the basic statistic calculation unit 207. That is, FIG. 6 illustrates an example where display integrated data is output to the display unit 206 such that the display integrated data is obtained by synthesizing the changes over time in the comfort level values of the users A, B, and C (the dotted line a, the dash-dot-dot-dash line b, and the dash-dot-dash line c), the changes over time in the environmental data values of the air-conditioned space 40 (the solid line T), the temporal average values of the comfort level values of the users A, B, and C, and the temporal average value of temperatures, which are the environmental data values of the air-conditioned space 40. FIG. 6 is thus an example of display by the comfort level display apparatus 200 of Embodiment 2.

FIG. 7 is an example of display by the comfort level display apparatus 200 of Embodiment 2. FIG. 7 illustrates an example where a temperature distribution at a certain time in the air-conditioned space 40 as represented on the XY plane is displayed, over which marks indicating the comfort levels at that time of users sitting in individual seat positions are superimposed. On the right side of FIG. 7, the average temperature in a predetermined period and the average value of the comfort level values of all the users in the predetermined period are displayed. FIG. 7 thus illustrates the marks corresponding to the comfort level values of the individual users generated by the comfort level value generation unit 204. FIG. 7 also illustrates the temperature distribution in the air-conditioned space 40 acquired by the environmental data value acquisition unit 203. That is, FIG. 7 illustrates an example where display integrated data is output to the display unit 206 such that the display integrated data is obtained by synthesizing the spatial average value of the comfort level values of all the users and the spatial average value of temperatures in the air-conditioned space 40 calculated by the basic statistic calculation unit 207. FIG. 7 is thus an example of display by the comfort level display apparatus 200 of Embodiment 2.

Figure 12:
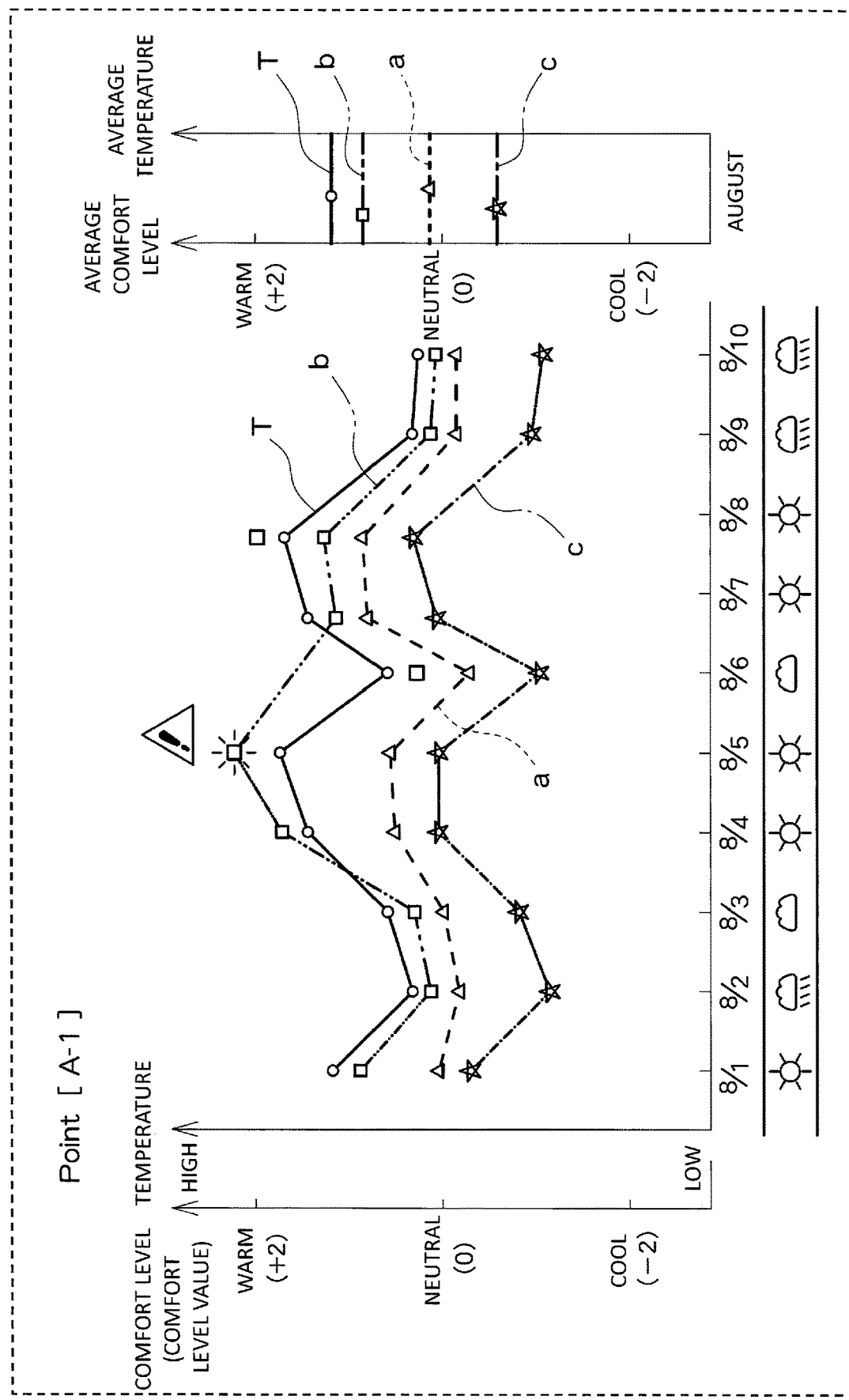
FIG. 12 is an example of display by the comfort level display apparatus illustrated in FIG. 10 (an example of display of changes in daily average temperatures and average comfort levels on specific days and monthly average comfort levels)

FIG. 12 is an example of display by the comfort level display apparatus 250 of Embodiment 3. Similarly to FIG. 6, FIG. 12 illustrates changes on a daily basis in temperature and the comfort levels of the users A, B, and C at the seat position A-1 of row A-number 1 which is a specific position in the air-conditioned space 40 as represented on the XY plane in FIG. 7. In FIG. 12, a solid line T with circular plot points indicates the changes in temperature. A dotted line a with triangular plot points indicates the changes in the comfort level value of a standard user A. A dash-dot-dot-dash line b with square plot points indicates the changes in the comfort level value of a user B who is "sensitive to cold". A dash-dot-dash line c with star-shaped plot points indicates the changes in the comfort level value of a user C who is "sensitive to heat". As with the examples described above, the standard user A is a user who is neither "sensitive to heat" nor "sensitive to cold" and has neither "cold constitution" nor "dry skin" and whose "age", "height", "weight", "body fat percentage" and the like are the average values of that company. The sensitive-to-cold user B is a female user who is "sensitive to cold" and has a "cold constitution" and whose "weight" and "body fat percentage" are smaller than the standard ones of that company. The sensitive-to-heat user C is a male user who is "sensitive to heat" and whose "weight" and "body fat percentage" are greater than the standard ones of that company.

In FIG. 12, the horizontal axis indicates days from August 1 to August 10. Each plot point indicates the average value on a corresponding day. For example, a circular plot point indicates the daily average temperature on a corresponding day. A triangular plot point, a square plot point, and a star-shaped plot point indicate the daily average values of the comfort level values of the users A, B, and C, respectively, on a corresponding day. Therefore, FIG. 12 is an example of display where statistic display data is output to the display unit 256 such that the statistic display data is obtained by synthesizing the daily average values of the comfort level values of the individual users and the daily average values of temperatures, which are environmental data values of the air-conditioned space 40, calculated by the basic statistic calculation unit 257. On the right side of FIG.

12, the monthly average temperature in August and the monthly average comfort level values in August of the users A, B, and C at the seat position A-1 are displayed.

In the example of display illustrated in FIG. 12, a weather bar indicating the weather of each day is provided under a date bar. In FIG. 12, changes on a daily basis in temperature and the comfort levels of the users A, B, and C at the seat position A-1 of row A-number 1 are displayed. In FIG. 12, changes on a daily basis in weather which is one of environmental data values are also displayed. In FIG. 12, a representative weather condition of each day is indicated with a mark such as sunny, cloudy, or rainy, as the weather.

FIG. 12 thus illustrates an example of display by the comfort level display apparatus 250 such that only the average values of the comfort levels and the average values of the environmental data are displayed on the display unit 256. Note that the display data generation unit 205 of the comfort level display apparatus 200 may generate statistic display data by synthesizing only the average values of the comfort levels and the average values of the environmental data, and display the generated statistic display data on the display unit 206.

Figure 13:
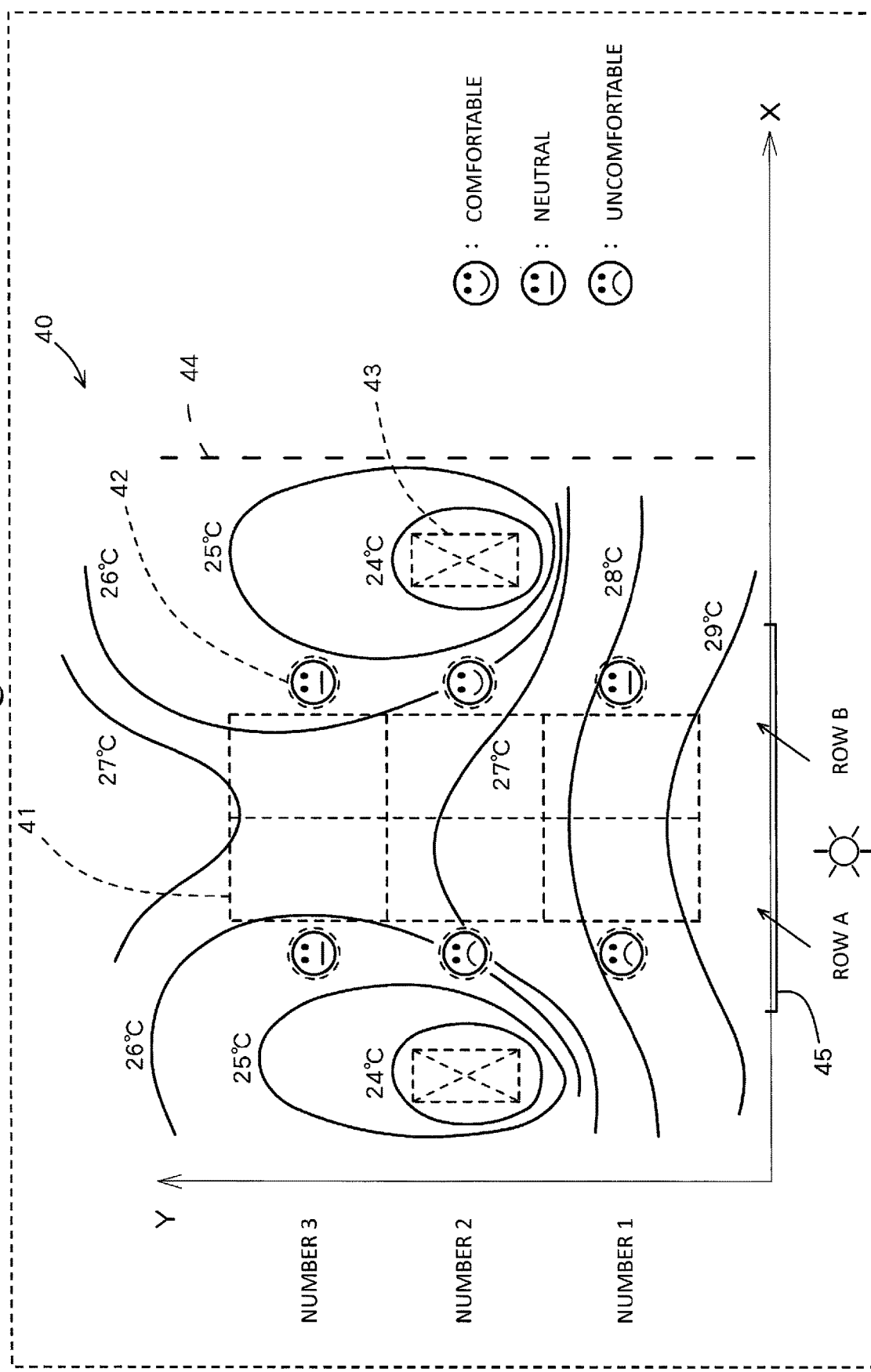
FIG. 13 is an example of display which is displayed by clicking on a date in the display illustrated in FIG. 12, and in which distributions of temperature and comfort levels in an air-conditioned space on that day are displayed.
Figure 14:
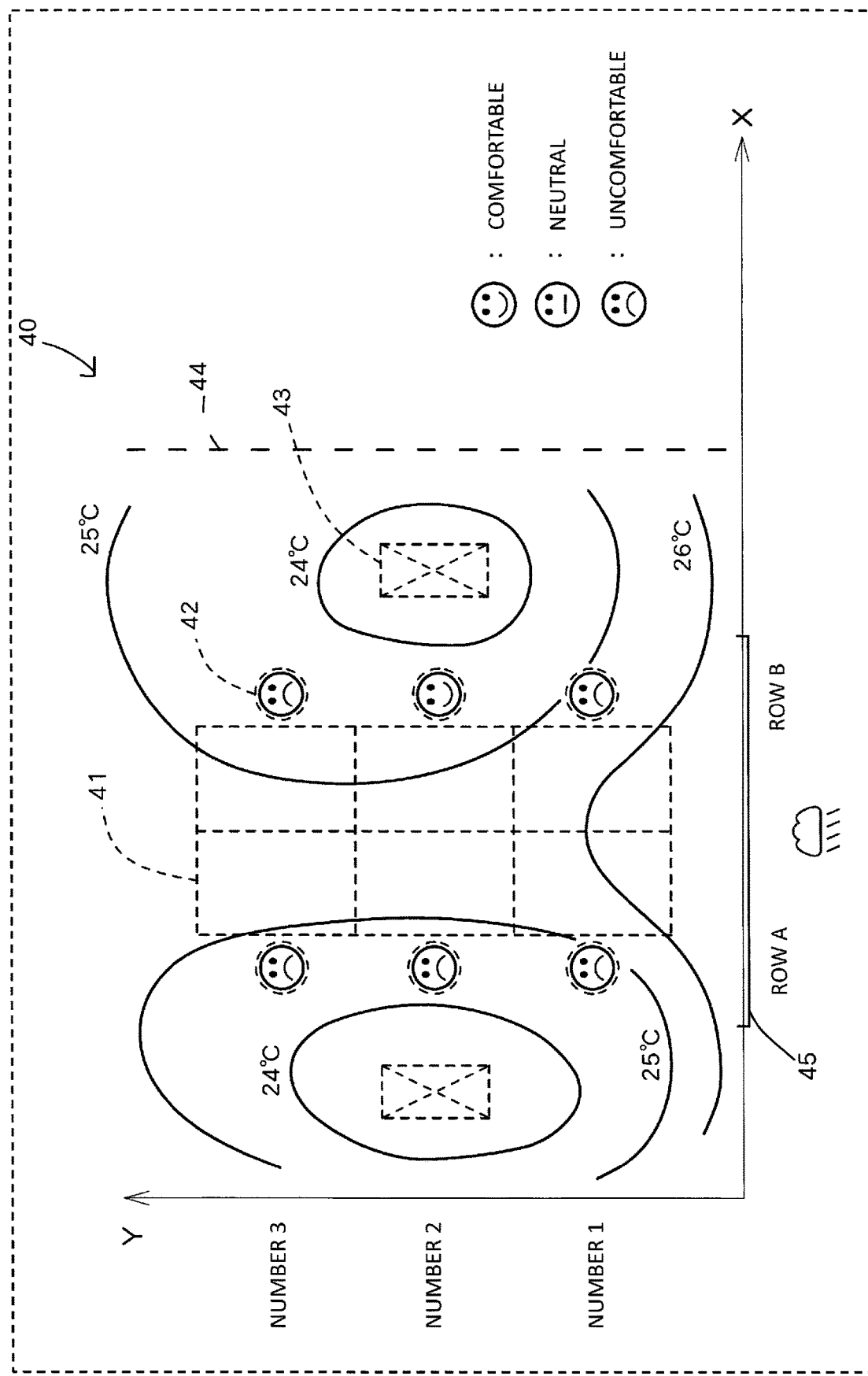
FIG. 14 is another example of display which is displayed by clicking on a date in the display illustrated in FIG. 12, and in which distributions of temperature and comfort levels in an air-conditioned space on that day are displayed.

When only the average values of the comfort levels and the average values of the environmental data are displayed as in FIG. 12, there may be a case where the air-conditioning manager wishes to perceive the temperature distribution in the air-conditioned space 40 and the comfort level values of the individual users on a specific day or at a specific time, for example. Accordingly, it may be arranged that clicking on a date portion on the date bar illustrated in FIG. 12 causes the temperature distribution in the air-conditioned space 40 and the marks corresponding to the comfort level values of the individual users on that day to be displayed, as illustrated in FIG. 13. In FIG. 13, a smiling face mark indicates that the user is feeling comfortable, as in FIG. 7. The smiling face mark corresponds to the comfort level value in the range of −0.5 to +0.5. A frowning face mark indicates that the user is feeling uncomfortable. The frowning face mark corresponds to the comfort level value exceeding +1.5 or the comfort level value smaller than −1.5. A normal face mark indicates that the user is in a neutral state between comfortable and uncomfortable and is feeling neither comfortable nor uncomfortable. The normal face mark corresponds to the comfort level value between 0.5 and 1.5 and between −0.5 and −1.5. FIG. 13 illustrates the temperature distribution in the air-conditioned space 40 and the marks corresponding to the comfort levels of the individual users on a sunny day, such as "8/1" indicated in FIG. 12, for example. In FIG. 13, a sunny mark and an indication of incident sunlight from a window 45 are additionally displayed outside the window 45. FIG. 14 illustrates the temperature distribution in the air-conditioned space 40 and the marks corresponding to the comfort levels of the individual users on a rainy day, such as "8/2" illustrated in FIG. 12, for example. The correspondence between the marks corresponding to the comfort level values of the users and the comfort level values is as described for FIG. 13. In FIG. 14, a rain mark is displayed outside the window 45. Based on a difference between the temperature distribution and the user comfort level distribution on the sunny day illustrated in FIG. 13 and the temperature distribution and the user comfort level distribution on the rainy day illustrated in FIG. 14, the air-conditioning manager can change adjustments of the air-conditioning equipment differently for the sunny day and for the rainy day.

Note that in FIGS. 13 and 14, a distribution of average temperatures and a distribution of average comfort levels on a certain day may be displayed.

Figure 15:
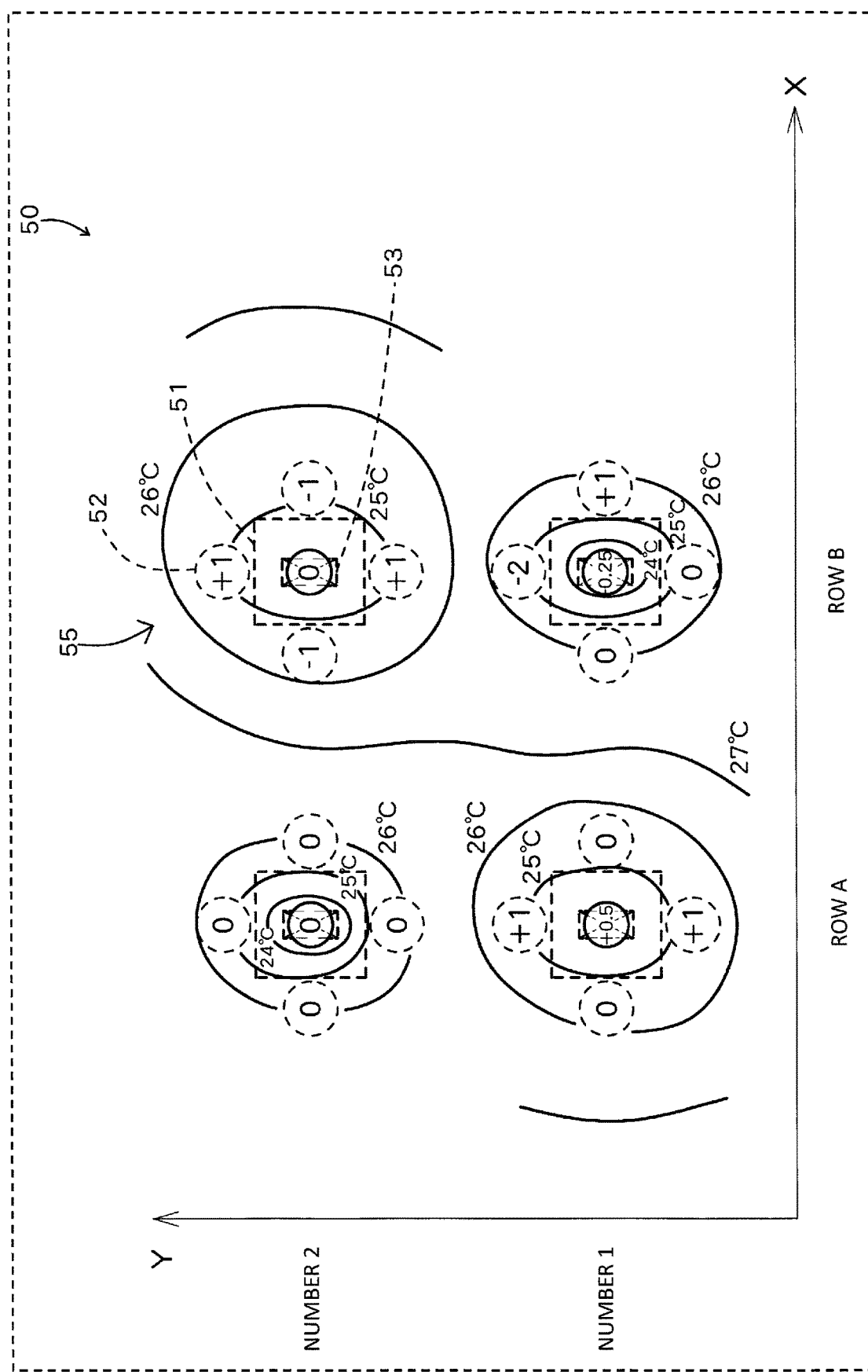
FIG. 15 is an example of display by the comfort level display apparatus illustrated in FIG. 10 (an example of display of area average values of temperatures and comfort levels in an air-conditioned space)

FIG. 15 is an example of display by the comfort level display apparatus 200 of Embodiment 2. In FIG. 15, there are placed four table sets 55 each composed of four chairs 52 and one table 51. In FIG. 15, a vent 53 of air-conditioning equipment is placed above each table 51. In FIG. 15, a temperature distribution in such an air-conditioned space 50, comfort levels of users, and average comfort levels are displayed. The table sets 55 are arranged in two rows of row A and row B each having two places of number 1 and number 2. In FIG. 15, a number at the center of each chair 52 indicates the comfort level value of the user in the position of each chair 52. A number at the center of each table 51 indicates the average value of the comfort level values of four users at each table 51, as a representative comfort level value of each table set 55. The display of FIG. 15 is effective in such a case where the air-conditioning manager adjusts the air-conditioning equipment so that the representative comfort value of each table set 55 becomes a neutral zero, for example.

As described above, the comfort level display apparatuses 200 and 250 display the temporal average values which are comfort-level-value basic statistics and the temporal average values which are environmental-data-value basic statistics, superimposed over each other. Therefore, the air-conditioning manager can perceive the trend in the relationship between the comfort levels and the environmental data, and can easily determine the necessity of replacement, additional installation and so on of the air-conditioning equipment. The comfort level display apparatuses 200 and 250 display the spatial average values of the comfort level values and the spatial average values of the environmental data values, superimposed over each other. Therefore, the air-conditioning manager can perceive the trend in the spatial relationship between the comfort levels and the environmental data, and can easily determine the necessity of replacement of the air-conditioning equipment, additional installation of building facilities such as a partition and so on in a particular area in the air-conditioned spaces 40 and 50.

The comfort level display apparatuses 200 and 250 can calculate the median values, maximum values, minimum values, or mode values, in place of the average values, and display the calculated values. This facilitates management of the air-conditioning equipment by the air-conditioning manager and use of the air-conditioning equipment by users.

Embodiment 4

Figure 16:
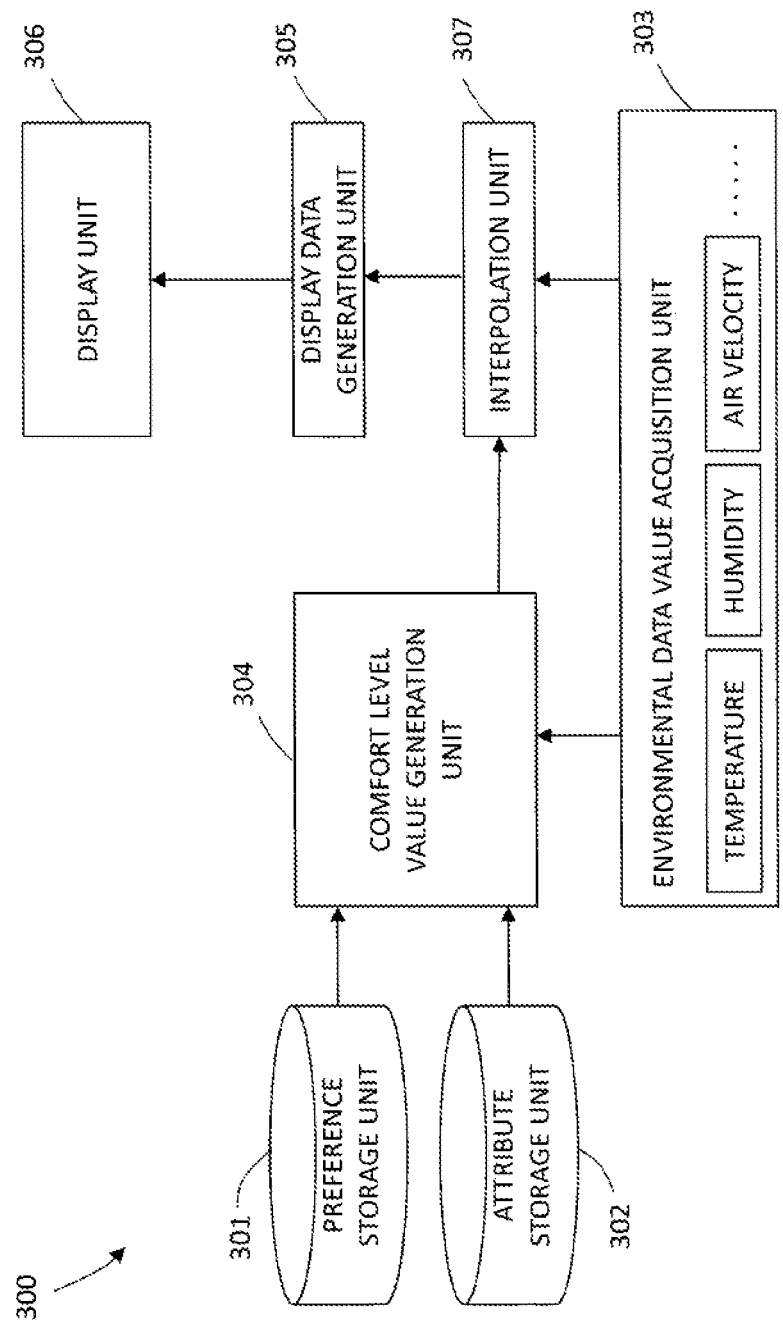
FIG. 16 is a functional block diagram illustrating a configuration of a comfort level display apparatus in Embodiment 4.

Next, a comfort level display apparatus 300 of Embodiment 4 will be described with reference to FIGS. 16 and 17. As illustrated in FIG. 16, the comfort level display apparatus 300 of Embodiment 4 is such that an interpolation unit 307 is added to the comfort level display apparatus 100 described with reference to FIG. 1. A preference storage unit 301, an attribute storage unit 302, an environmental data value acquisition unit 303, a comfort level value generation unit 304, and a display unit 306 that constitute the comfort level display apparatus 300 are the same as the preference storage unit 101, the attribute storage unit 102, the environmental data value acquisition unit 103, the comfort level value generation unit 104, and the display unit 106 of the comfort level display apparatus 100 described with reference to FIG. 1, and thus description will be omitted.

Figure 17:
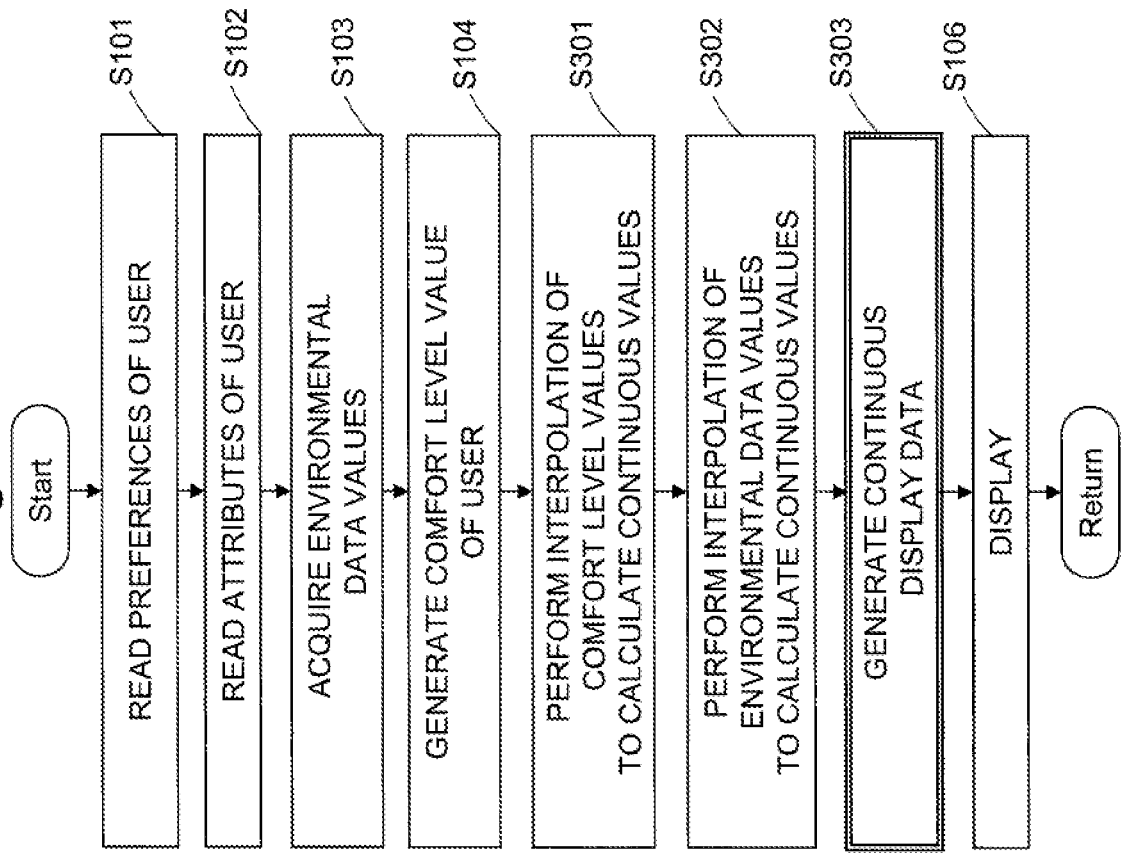
FIG. 17 is a flowchart illustrating operation of the comfort level display apparatus illustrated in FIG. 16.

As indicated in step S301 of FIG. 17, the interpolation unit 307 illustrated in FIG. 16 performs interpolation of user comfort level values of discrete values generated by the comfort level value generation unit 304, so as to calculate continuous values in terms of time or space. Then, as indicated in step S302 of FIG. 17, the interpolation unit 307 performs interpolation of environmental data values of the air-conditioned space 40 of discrete values acquired by the environmental data value acquisition unit 303, so as to calculate continuous values in terms of time or space. As indicated in step S303 of FIG. 17, a display data generation unit 305 generates continuous display data by synthesizing the continuous values of the user comfort level values in terms of either time or space and the continuous values of the environmental data values of the air-conditioned space 40 in terms of either time or space.

The comfort level display apparatus 300 performs interpolation of temperatures and the comfort level values of individual users, which are discrete values in terms of time, so as to display them as smooth curved lines, like the solid line T, the dotted line a, the dash-dot-dot-dash line b, and the dash-dot-dash line c illustrated in FIG. 6.

The comfort level display apparatus 300 of this embodiment performs interpolation to obtain a continuous line from discrete data, thereby making display easy to see and allowing the air-conditioning manager to perceive the relationship between the comfort levels and the environmental data more easily.

Embodiment 5

Next, a comfort level display apparatus 400 of Embodiment 5 will be described with reference to FIGS. 18 to 20.

Figure 18:
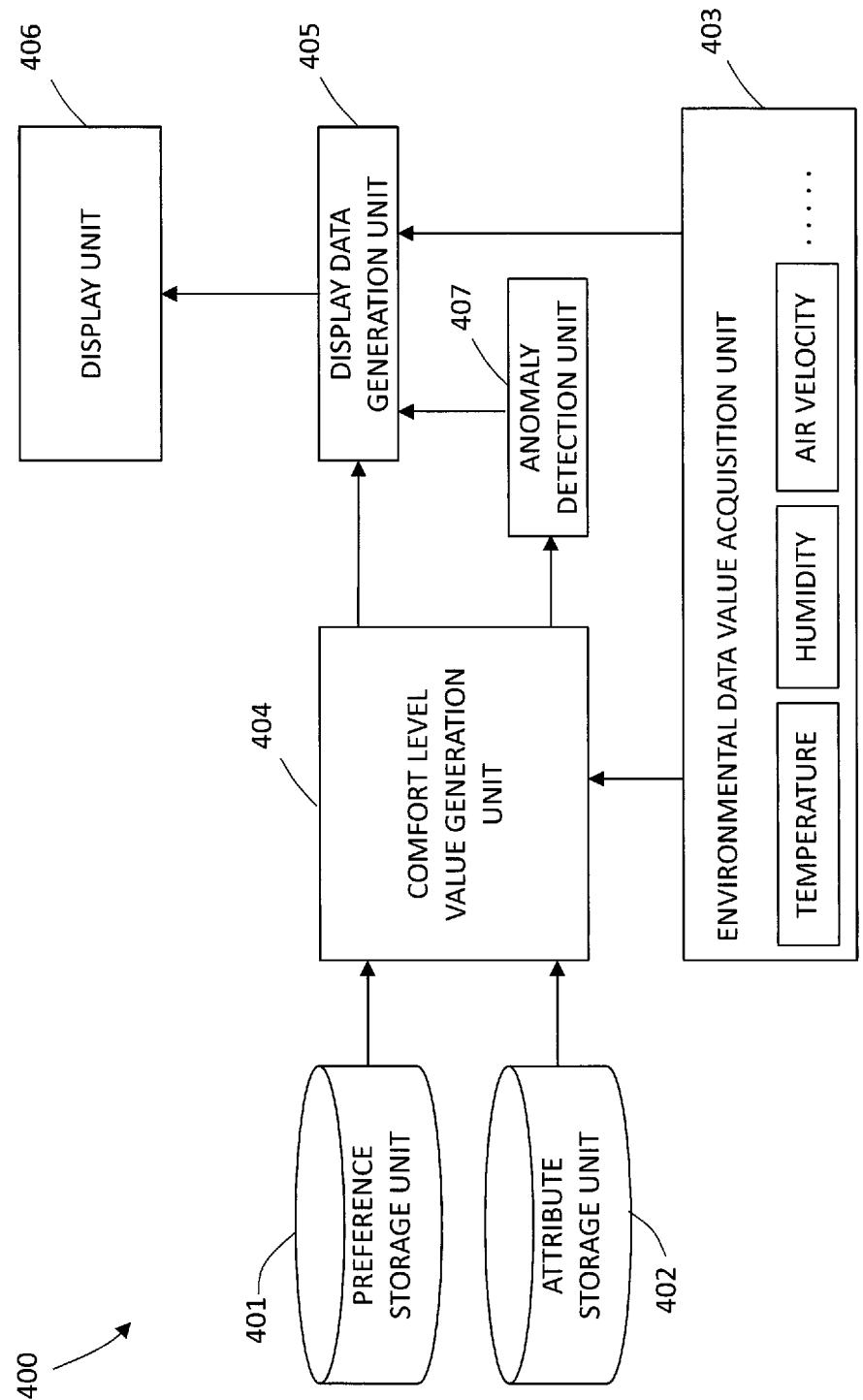
FIG. 18 is a functional block diagram illustrating a configuration of a comfort level display apparatus in Embodiment 5.

As illustrated in FIG. 18, the comfort level display apparatus 400 of Embodiment 5 is such that an anomaly detection unit 407 is added to the comfort level display apparatus 100 illustrated in FIG. 1. A preference storage unit 401, an attribute storage unit 402, an environmental data value acquisition unit 403, a comfort level value generation unit 404, and a display unit 406 that constitute the comfort level display apparatus 400 are the same as the preference storage unit 101, the attribute storage unit 102, the environmental data value acquisition unit 103, the comfort level value generation unit 104, and the display unit 106 of the comfort level display apparatus 100 described with reference to FIG. 1, and thus description will be omitted. In FIGS. 19 and 20 illustrating operation of the comfort level display apparatus 400, steps that are the same as those in the operation of the comfort level display apparatus 100 described with reference to FIG. 5 will be denoted by the same reference signs as those in FIG. 5, and description of those steps will be omitted.

The anomaly detection unit 407 illustrated in FIG. 18 detects an anomaly and outputs anomaly data when the comfort level value of a user is not within a comfort limit range. The comfort limit range is a limit range for feeling warm or cool. The comfort limit range is −2.0<comfort level value <2.0. The anomaly detection unit 407 may determine that the comfort level value of a user is not within the comfort limit range when the comfort level value is lower than −2.0 or exceeds 2.0. Falling outside the comfort limit range is equivalent to a situation where approximately 70% or more of people feel uncomfortable. When the comfort limit range is set as a situation where approximately 50% or more of people feel uncomfortable, the comfort limit range may be set to −1.5<comfort level value <1.5, for example.

Figure 19:
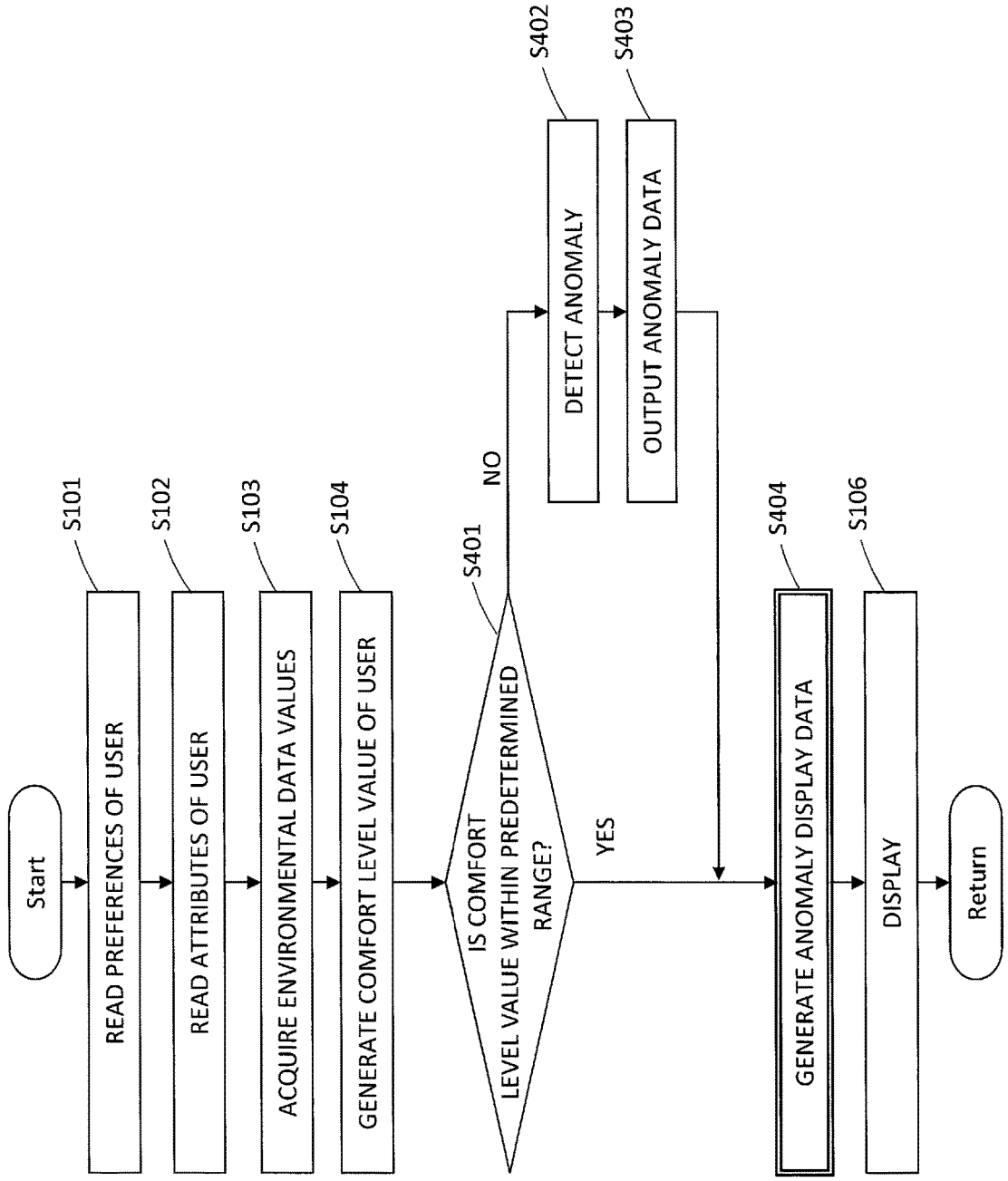
FIG. 19 is a flowchart illustrating operation of the comfort level display apparatus illustrated in FIG. 18.

As indicated in step S401 of FIG. 19, when the comfort level value generated by the comfort level value generation unit 404 is not within the comfort limit range described above, the anomaly detection unit 407 determines that the comfort level value generated by the comfort level value generation unit 404 as an anomalous value. Then, the anomaly detection unit 407 proceeds to step S402 of FIG. 19 to detect an anomaly. Furthermore, as indicated in step S403 of FIG. 19, the anomaly detection unit 407 outputs anomaly data. Then, as indicated in step S404 of FIG. 19, a display data generation unit 405 generates anomaly display data by synthesizing the anomaly data output by the anomaly detection unit 407, the comfort level value of the user generated by the comfort level value generation unit 404, and the environmental data value of the air-conditioned space 40. Then, as indicated in step S106 of FIG. 19, the display unit 406 displays the anomaly display data.

FIG. 12 illustrates an example of display by the comfort level display apparatus 400. As described above, FIG. 12 is an example of display by the comfort level display apparatus 250 of Embodiment 3. The portion of a triangle mark in which an exclamation mark ! is displayed (attention mark) in FIG. 12 is an example of display by the comfort level display apparatus 400. In this case, the attention mark displayed on the display unit 406 is equivalent to the anomaly data output by the anomaly detection unit 407.

Figure 20:
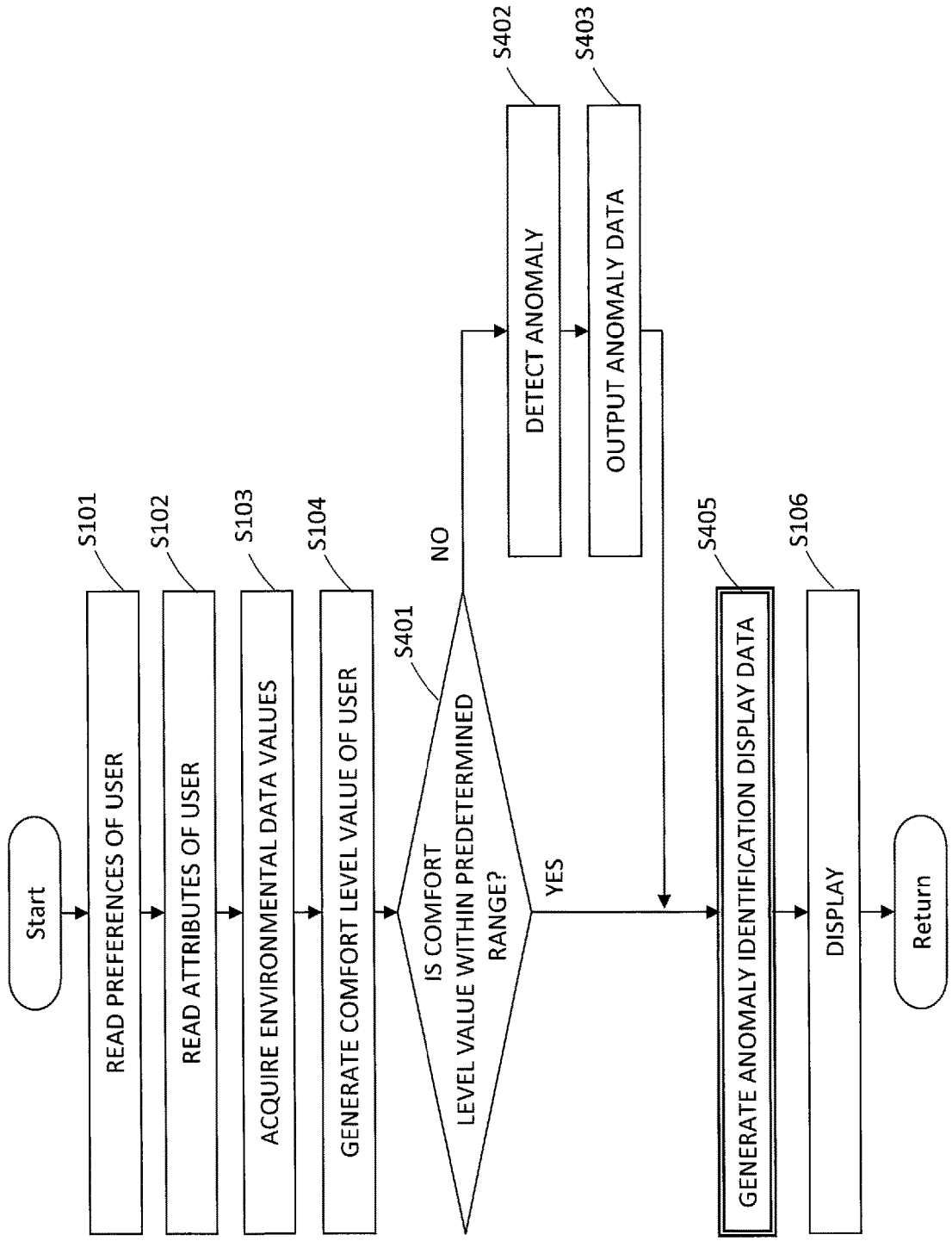
FIG. 20 is a flowchart illustrating different operation of the comfort level display apparatus illustrated in FIG. 18.

As indicated in step S405 of FIG. 20, based on the anomaly data output by the anomaly detection unit 407, the display data generation unit 405 may create anomaly identification display data that allows a comfort level value outside the comfort limit range to be distinguished from other comfort level values, among the user comfort level values generated by the comfort level value generation unit 404. For example, the display data generation unit 405 may create anomaly identification display data that causes a plot point indicating the comfort level value concerned to be displayed as a blinking plot point, as illustrated in FIG. 12.

The display data generation unit 405 of the comfort level display apparatus 400 may thus generate anomaly identification display data that allows a user comfort level value in which an anomaly is detected by the anomaly detection unit 407 to be distinguished from other user comfort level values, by synthesizing the user comfort level values and the environmental data values of the air-conditioned space 40.

As described above, the comfort level display apparatus 400 displays an attention mark or displays a blinking plot point on the display unit 406 to indicate that the comfort level value is an anomalous value, thereby allowing the air-conditioning manager to promptly notice presence of an uncomfortable person and to promptly adjust the air-conditioning equipment.

Embodiment 6

Figure 21:
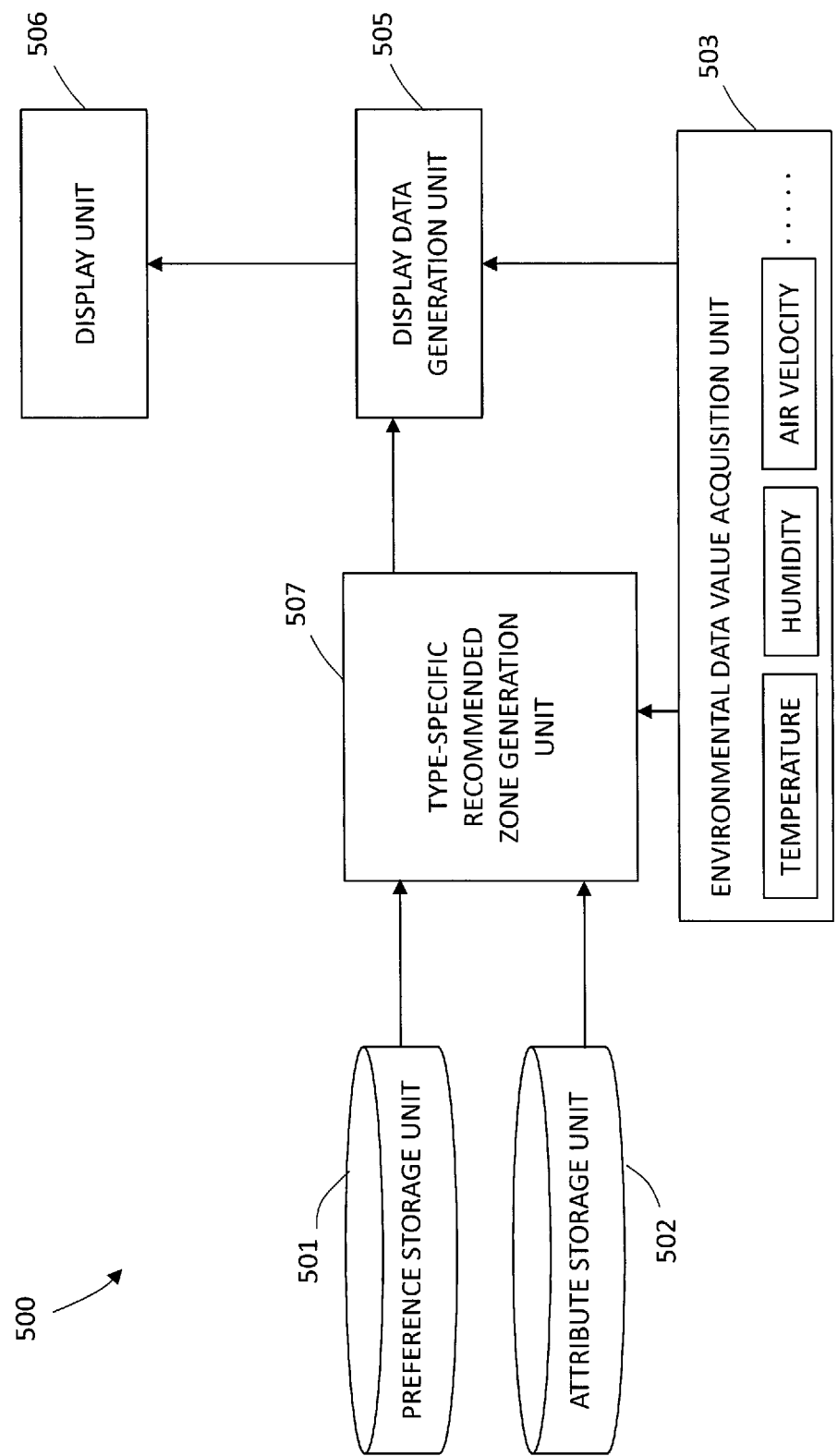
FIG. 21 is a functional block diagram illustrating a configuration of a comfort level display apparatus in Embodiment 6.

As illustrated in FIG. 21, a comfort level display apparatus 500 of Embodiment 6 has a type-specific recommended zone generation unit 507, in place of the comfort level value generation unit 104 of the comfort level display apparatus 100 illustrated in FIG. 1. An environmental data value acquisition unit 503 and a display unit 506 that constitute the comfort level display apparatus 500 are the same as the environmental data value acquisition unit 103 and the display unit 106 of the comfort level display apparatus 100 described with reference to FIG. 1.

A preference storage unit 501 and an attribute storage unit 502 illustrated in FIG. 21 store the user preference database 901 illustrated in FIG. 3 and the user attribute database 902 illustrated in FIG. 4, respectively, as with the preference storage unit 101 and the attribute storage unit 102 illustrated in FIG. 1. Furthermore, the preference storage unit 501 stores preferences of type-specific reference users regarding the air-conditioned environment in the user preference database 901. The attribute storage unit 502 stores attributes of the type-specific reference users in the user attribute database 902.

A type-specific reference user is a standard person of each user type expressed as "sensitive to heat", "sensitive to cold" or the like, and is an imaginary person. For example, the type-specific reference user of the "sensitive-to-heat" type is such a user whose attributes such as age, height, weight, and body fat percentage are the average values or median values of that company and whose registered preferences include "sensitive to heat". The type-specific reference user of the "sensitive-to-cold" type is such a user whose attributes such as age, height, weight, and body fat percentage are the average values or median values of that company and whose registered preferences include "sensitive to cold".

The type-specific recommended zone generation unit 507 generates a comfort level value of a type-specific reference user for each zone in the air-conditioned space 40. The type-specific recommended zone generation unit 507 designates a zone in which the comfort level value of the type-specific reference user is within a predetermined range as a type-specific recommended zone. The predetermined range is, for example, such a range of comfort level values in which approximately 90% or more of people feel comfortable. The predetermined range may be the range of −0.5<comfort level value <0.5.

A display data generation unit 505 generates type-specific recommended zone display data by synthesizing type-specific recommended zones and environmental data values of the air-conditioned space 40, and outputs the generated type-specific recommended zone display data to the display unit 506.

Operation of the comfort level display apparatus 500 will now be described with reference to FIG. 22. First, as indicated in step S501 of FIG. 22, the type-specific recommended zone generation unit 507 sets a zone in the air-conditioned space 40 for which comfort level values are calculated. For example, the type-specific recommended zone generation unit 507 may divide the air-conditioned space 40 as represented by XY illustrated in FIG. 7 into grid-like zones, and set a zone obtained by division as the zone for which comfort level values are calculated. Alternatively, for example, the type-specific recommended zone generation unit 507 may set zones for which comfort level values are calculated on a per-seat-position basis such that each zone is centered on the position of each chair 42. Alternatively, for example, the type-specific recommended zone generation unit 507 may set zones for which comfort level values are calculated such that a zone around the seat position A-1 is set as a zone 1 and a zone around the seat position A-2 is set as a zone 2.

Figure 22:
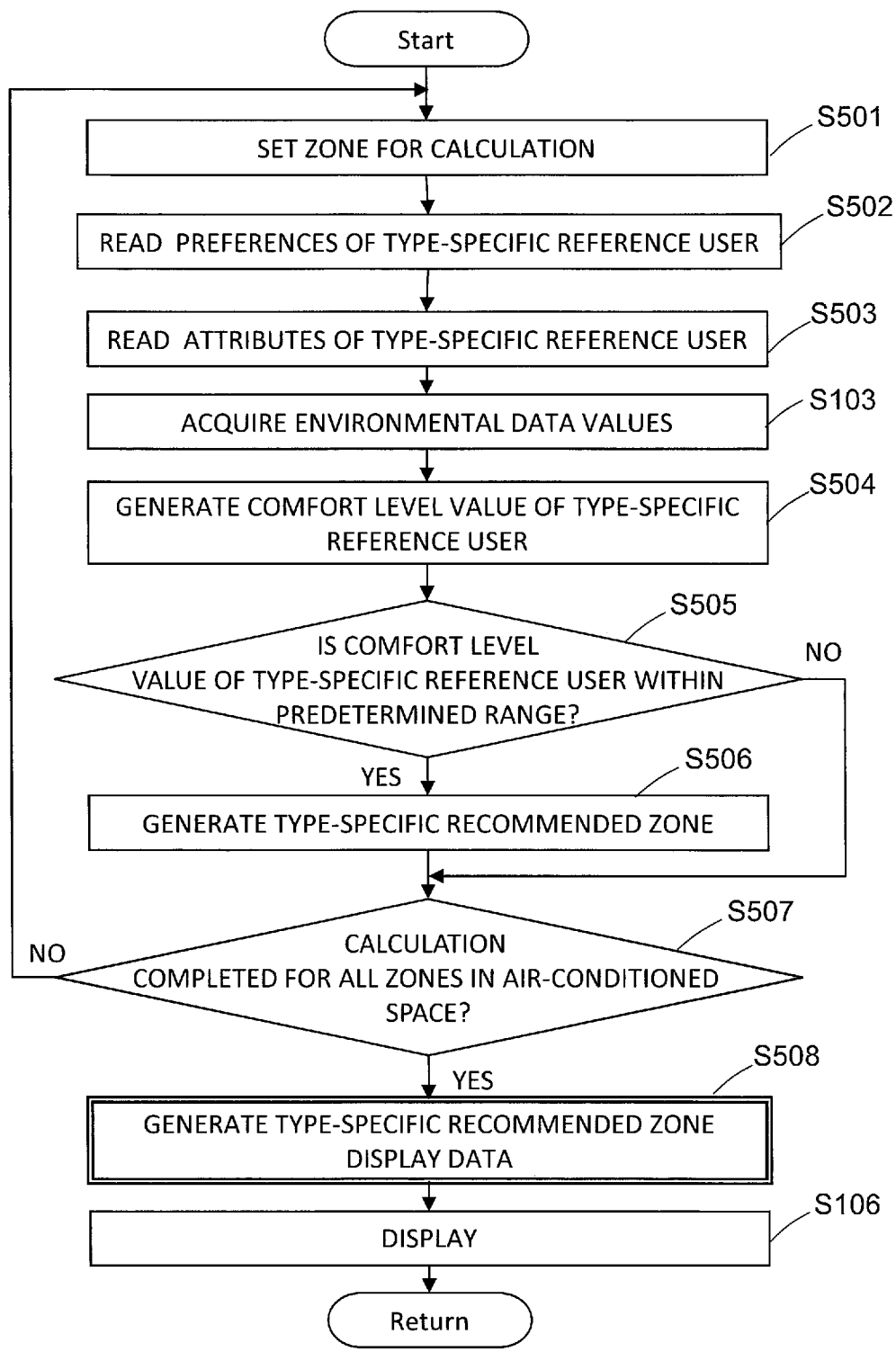
FIG. 22 is a flowchart illustrating operation of the comfort level display apparatus illustrated in FIG. 21.

Next, as indicated in step S502 of FIG. 22, the type-specific recommended zone generation unit 507 reads preferences of a type-specific reference user from the preference storage unit 501. For example, for the type-specific reference user of the "sensitive-to-heat" type, the type-specific recommended zone generation unit 507 reads the preferences of a user specified as "sensitive to heat" from the user preference database 901. Then, as indicated in step S503 of FIG. 22, the type-specific recommended zone generation unit 507 reads attributes of the type-specific reference user from the attribute storage unit 502. For example, for the type-specific reference user of the "sensitive-to-heat" type, the type-specific recommended zone generation unit 507 reads data such as the average weight and body fat percentage of that company from the user attribute database 902.

Next, as indicated in step S103 of FIG. 22, the type-specific recommended zone generation unit 507 acquires environmental data values, such as temperature, humidity, air velocity, and radiation temperature, of the set zone in the air-conditioned space 40 from the environmental data value acquisition unit 503.

Next, the type-specific recommended zone generation unit 507 proceeds to step S504 of FIG. 22 to generate a comfort level value of the type-specific reference user in the set zone. Specifically, the type-specific recommended zone generation unit 507 calculates PMV of a standard person in the set zone by the formula (2), using four physical values of temperature, humidity, air velocity, and radiation temperature of the set zone acquired from the environmental data value acquisition unit 503 in step S103 of FIG. 22 and a pre-set clothing amount and activity amount of the standard person.

Furthermore, the type-specific recommended zone generation unit 507 generates a comfort level value of the type-specific reference user by the formulas (1), (3), and (4), using the preferences and attributes of the type-specific reference user read from the preference storage unit 501 and the attribute storage unit 502.

Then, the type-specific recommended zone generation unit 507 proceeds to step S505 indicated in FIG. 22 to determine whether the generated comfort level value of the type-specific reference user is within the predetermined range. Then, if the comfort level value of the type-specific reference user is within the predetermined range, the type-specific recommended zone generation unit 507 determines YES in step S505 of FIG. 22 and proceeds to step S506 of FIG. 22. Then, the type-specific recommended zone generation unit 507 includes the zone set for calculation in type-specific recommended zones and proceeds to step S507 of FIG. 22.

On the other hand, if the type-specific recommended zone generation unit 507 determines NO in step S505 of FIG. 22, the type-specific recommended zone generation unit 507 does not include the zone set for calculation in type-specific recommended zones, and proceeds to step S507 of FIG. 22.

In step S507 of FIG. 22, the type-specific recommended zone generation unit 507 determines whether calculation is completed for all zones in the air-conditioned space 40. If calculation is not completed for all the zones, the type-specific recommended zone generation unit 507 returns to step S501 of FIG. 22, and executes steps S501 to S506 repeatedly.

Then, after generating a comfort level value of the type-specific reference user and determining whether or not each zone can be included in the type-specific recommended zones for all the zones in the air-conditioned space 40, the type-specific recommended zone generation unit 507 proceeds to step S508 of FIG. 22.

In step S508 of FIG. 22, the display data generation unit 505 generates type-specific recommended zone display data by synthesizing the type-specific recommended zones and the environmental data values of the air-conditioned space 40, and outputs the generated type-specific recommended zone display data to the display unit 506. The display unit 506 displays the type-specific recommended zone display data.

Figure 23:
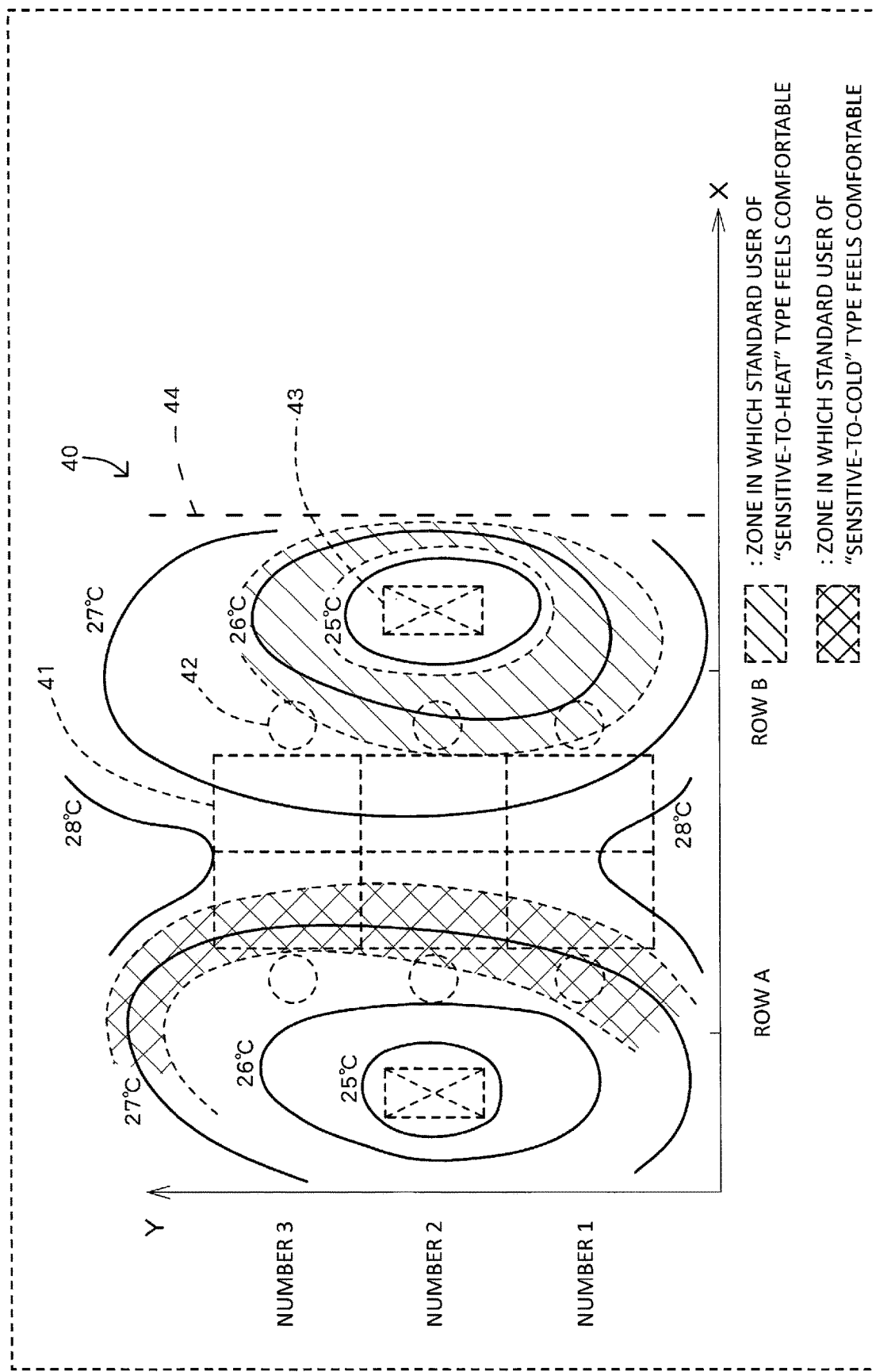
FIG. 23 is an example of display of type-specific recommended zones by the comfort level display apparatus illustrated in FIG. 21.

FIG. 23 is an example of display by the display unit 506 of the comfort level display apparatus 500. In FIG. 23, ranges in which type-specific reference users feel comfortable and a temperature distribution in the air-conditioned space 40 are displayed superimposed over each other. The diagonally-hatched zone illustrated in FIG. 23 corresponds to the zone in which the temperature is 25.5° C. to 26.5° C., and indicates the zone in which the type-specific reference user of the "sensitive-to-heat" type feels comfortable. The cross-hatched zone illustrated in FIG. 23 corresponds to the zone in which the temperature is 26.5° C. to 27.5° C., and indicates the zone in which the type-specific reference user of the "sensitive-to-cold" type feels comfortable.

The comfort level display apparatus 500 thus displays the recommended zone for each type, such as the sensitive-to-heat type and the sensitive-to-cold type, so that users looking at the display can be prompted to move to their preferred places. For example, in a case where the users may sit in any place, as in a free-address office, if the individual users sit at their preferred places, the overall comfort level and productivity can be improved.

Embodiment 7

Next, a comfort level display apparatus 550 of Embodiment 7 will be described with reference to FIG. 24. Portions that are the same as those of the comfort level display apparatus 500 described with reference to FIG. 21 will be denoted by the same reference signs, and description will be omitted.

Figure 24:
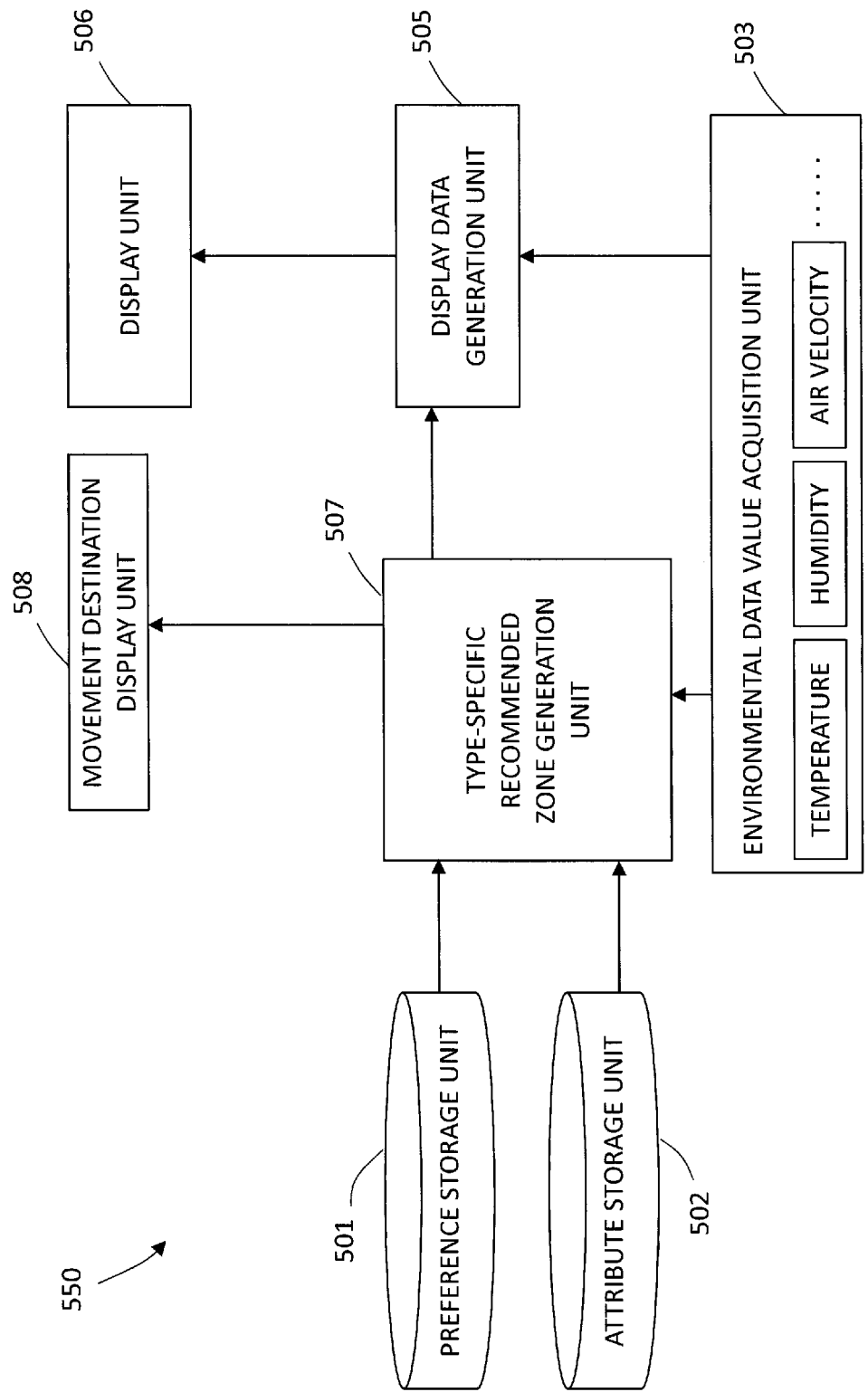
FIG. 24 is a functional block diagram illustrating a configuration of a comfort level display apparatus in Embodiment 7.

As illustrated in FIG. 24, the comfort level display apparatus 550 is such that a movement destination display unit 508 is added to the comfort level display apparatus 500 described with reference to FIG. 21. The movement destination display unit 508 can display type-specific recommended zones by projection mapping or augmented reality. This allows the comfort level display apparatus 550 to recommend movement to users more effectively.

Embodiment 8

Figure 25:
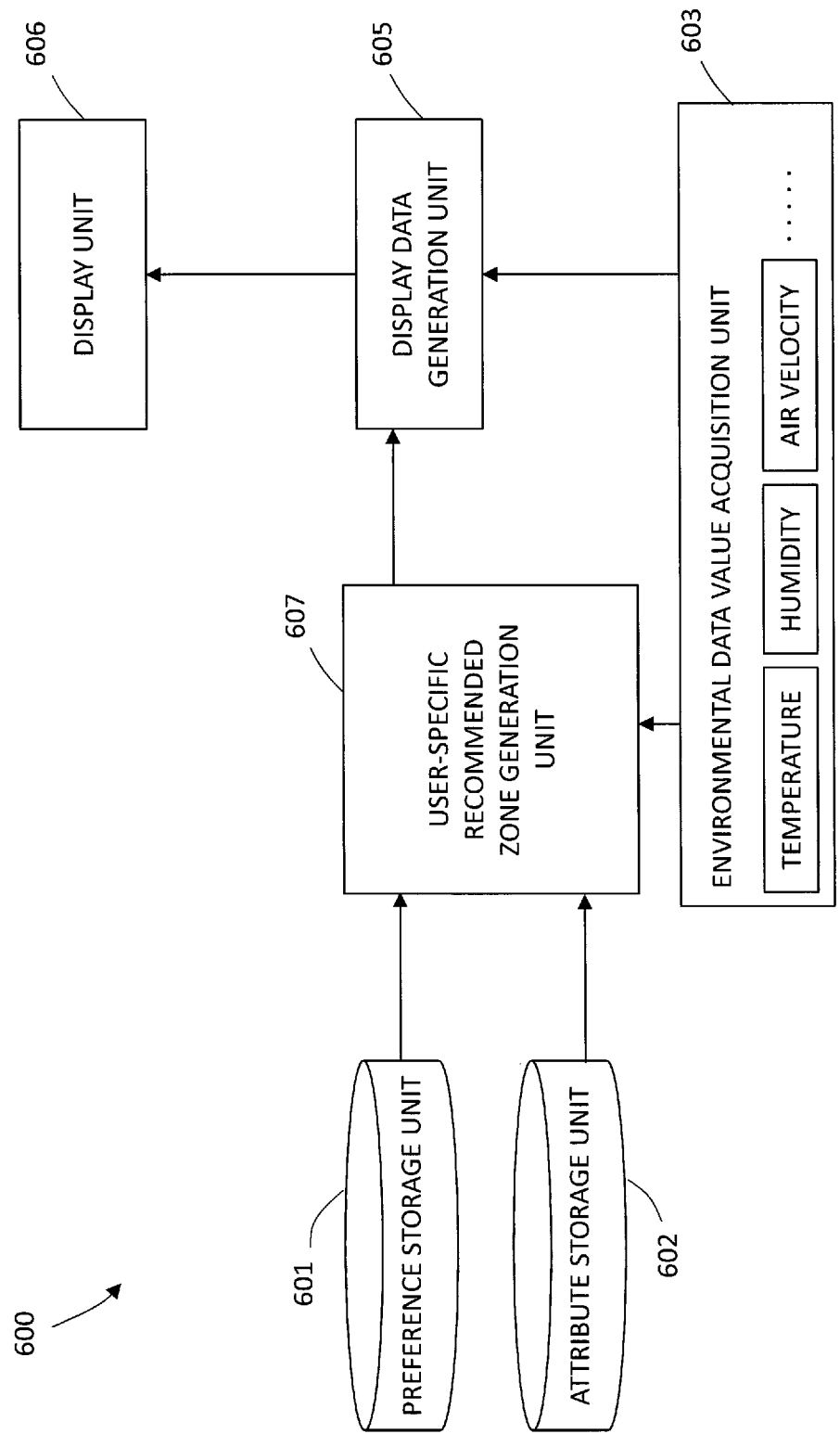
FIG. 25 is a functional block diagram illustrating a configuration of a comfort level display apparatus in Embodiment 8.

Next, a comfort level display apparatus 600 of Embodiment 8 will be described with reference to FIG. 25. The comfort level display apparatus 600 illustrated in FIG. 25 has a user-specific recommended zone generation unit 607, in place of the comfort level value generation unit 104 of the comfort level display apparatus 100 illustrated in FIG. 1. A preference storage unit 601, an attribute storage unit 602, an environmental data value acquisition unit 603, and a display unit 606 that constitute the comfort level display apparatus 600 are substantially the same as the preference storage unit 101, the attribute storage unit 102, the environmental data value acquisition unit 103, and the display unit 106 of the comfort level display apparatus 100 described with reference to FIG. 1.

Operation of the comfort level display apparatus 600 will be described with reference to FIG. 26. As indicated in step S601 of FIG. 26, the user-specific recommended zone generation unit 607 sets a zone in the air-conditioned space 40 for which a comfort level value is calculated, as with the comfort level display apparatus 500 described above.

Figure 26:
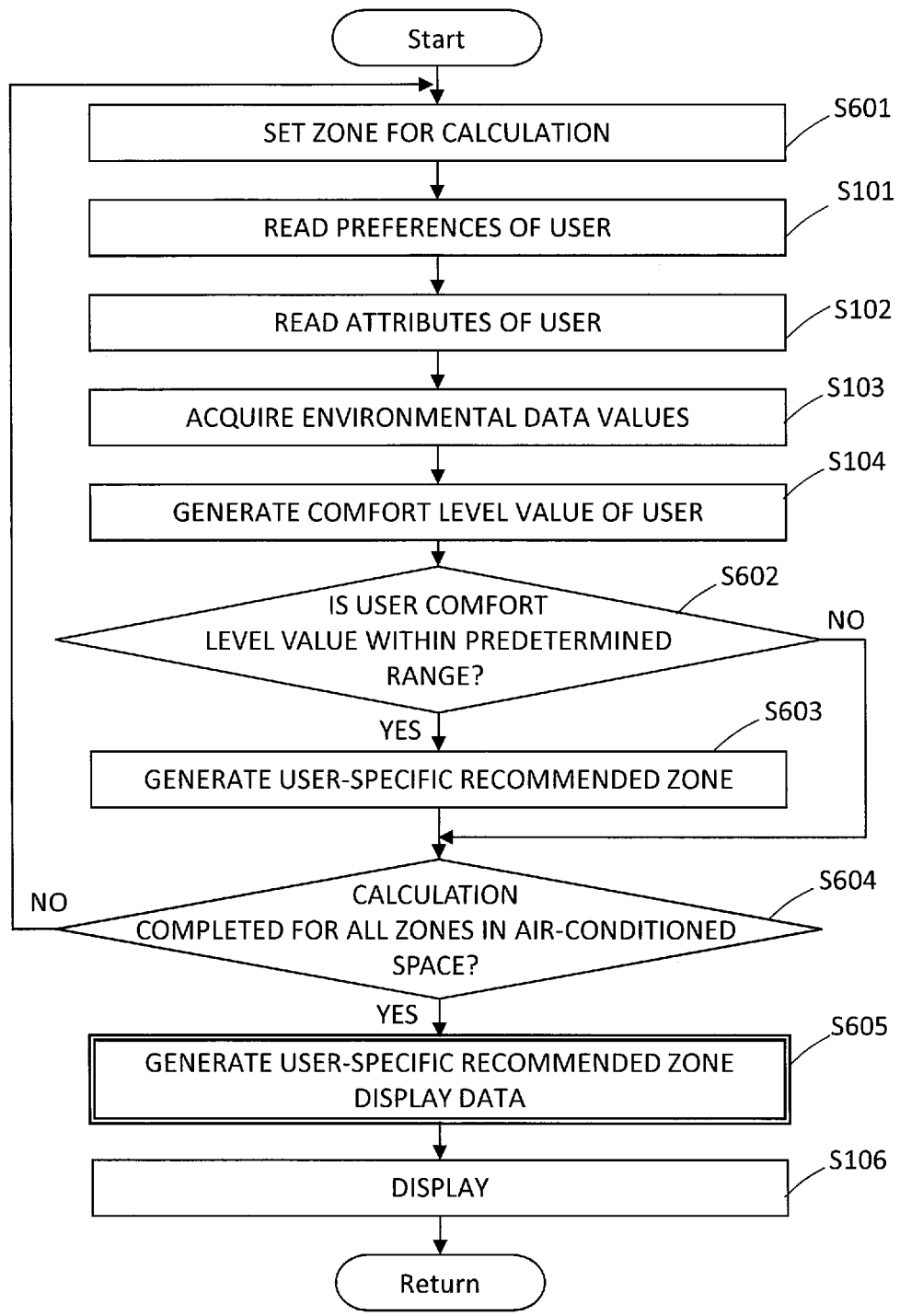
FIG. 26 is a flowchart illustrating operation of the comfort level display apparatus illustrated in FIG. 25.

Next, as indicated in steps S101 and S102 of FIG. 26, the user-specific recommended zone generation unit 607 reads preferences and attributes of a specific user from the preference storage unit 601 and the attribute storage unit 602.

Next, as indicated in step S103 of FIG. 26, the user-specific recommended zone generation unit 607 acquires environmental data values, such as temperature, humidity, air velocity, and radiation temperature, of the set zone in the air-conditioned space 40 from the environmental data value acquisition unit 603.

Next, the user-specific recommended zone generation unit 607 proceeds to step S104 of FIG. 26 to generate a comfort level value of the specific user in the set zone. Specifically, the user-specific recommended zone generation unit 607 calculates PMV of the specific user in the set zone by the formula (2), using the four physical values of temperature, humidity, air velocity, and radiation temperature of the set zone acquired from the environmental data value acquisition unit 503 in step S103 of FIG. 26 and a standard clothing amount and activity amount during office work. Note that the user-specific recommended zone generation unit 607 may use, as the clothing amount, a value estimated from a difference in temperature between the temperature of skin and the temperature of clothing of the specific user measured by a thermographic camera. The user-specific recommended zone generation unit 607 may use, as the activity amount, a value obtained by analyzing an image of a monitoring camera or the like.

Furthermore, the user-specific recommended zone generation unit 607 generates a comfort level value of the specific user by the formulas (1), (3), and (4), using the preferences and attributes of the specific user read from the preference storage unit 501 and the attribute storage unit 502.

Then, the user-specific recommended zone generation unit 607 proceeds to step S602 illustrated in FIG. 26 to determine whether the generated comfort level value of the specific user is within the predetermined range. Then, if the comfort level value of the specific user is within the predetermined range, the user-specific recommended zone generation unit 607 determines YES in step S602 of FIG. 26, and proceeds to step S603 of FIG. 26. Then, the user-specific recommended zone generation unit 607 includes the zone set for calculation in user-specific recommended zones, and proceeds to step S604 of FIG. 26.

On the other hand, if the user-specific recommended zone generation unit 607 determines NO in step S602 of FIG. 26, the user-specific recommended zone generation unit 607 does not include the zone set for calculation in user-specific recommended zones, and proceeds to step S604 to FIG. 26.

In step S604 of FIG. 26, the user-specific recommended zone generation unit 607 determines whether calculation is completed for all zones in the air-conditioned space 40. If calculation is not completed for all the zones, the user-specific recommended zone generation unit 607 returns to step S601 of FIG. 26 and executes steps S601 to S603 repeatedly.

Then, after generating a comfort level value of the specific user and determining whether or not each zone can be included in the user-specific recommended zones for all the zones in the air-conditioned space 40, the user-specific recommended zone generation unit 607 proceeds to step S605 of FIG. 26.

In step S605 of FIG. 26, a display data generation unit 605 generates user-specific recommended zone display data by synthesizing the user-specific recommended zones and the environmental data values of the air-conditioned space 40, and outputs the generated user-specific recommended zone display data to the display unit 606. The display unit 606 displays the user-specific recommended zone display data.

FIG. 23 described above is also an example of display by the display unit 606 of the comfort level display apparatus 600. In the display by the comfort level display apparatus 600, the diagonally-hatched zone illustrated in FIG. 23 indicates the zone in which a specific user C who is "sensitive to heat" feels comfortable. The cross-hatched zone illustrated in FIG. 23 indicates the zone in which a specific user B who is "sensitive to cold" feels comfortable.

The comfort level display apparatus 600 thus automatically recommends the specific user to move to a specific place in the air-conditioned space 40, taking into account the preferences and attributes of the specific user. Therefore, the user can easily move to a comfortable position without checking display on the display 27 or the like.

Embodiment 9

Next, a comfort level display apparatus 650 of Embodiment 9 will be described with reference to FIG. 27. Portions that are the same as those of the comfort level display apparatus 600 described with reference to FIG. 25 are denoted by the same reference signs, and description will be omitted.

Figure 27:
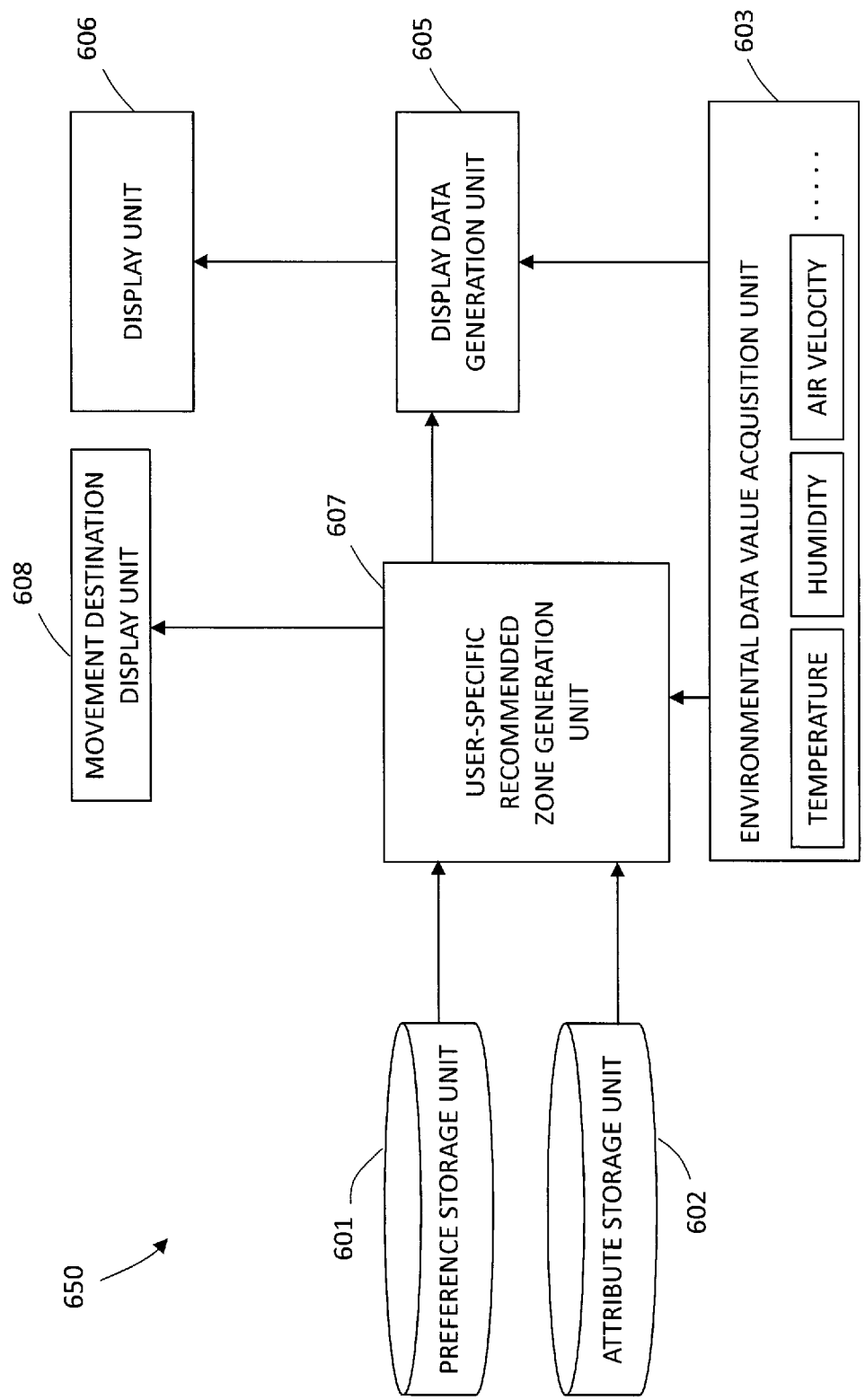
FIG. 27 is a functional block diagram illustrating a configuration of a comfort level display apparatus in Embodiment 9.

As illustrated in FIG. 27, the comfort level display apparatus 650 is such that the movement destination display unit 608 is added to the comfort level display apparatus 600 described with reference to FIG. 25. The movement destination display unit 608 can display user-specific recommended zones by projection mapping or augmented reality. This allows the comfort level display apparatus 650 to recommend movement to users more effectively.

Embodiment 10

Figure 28:
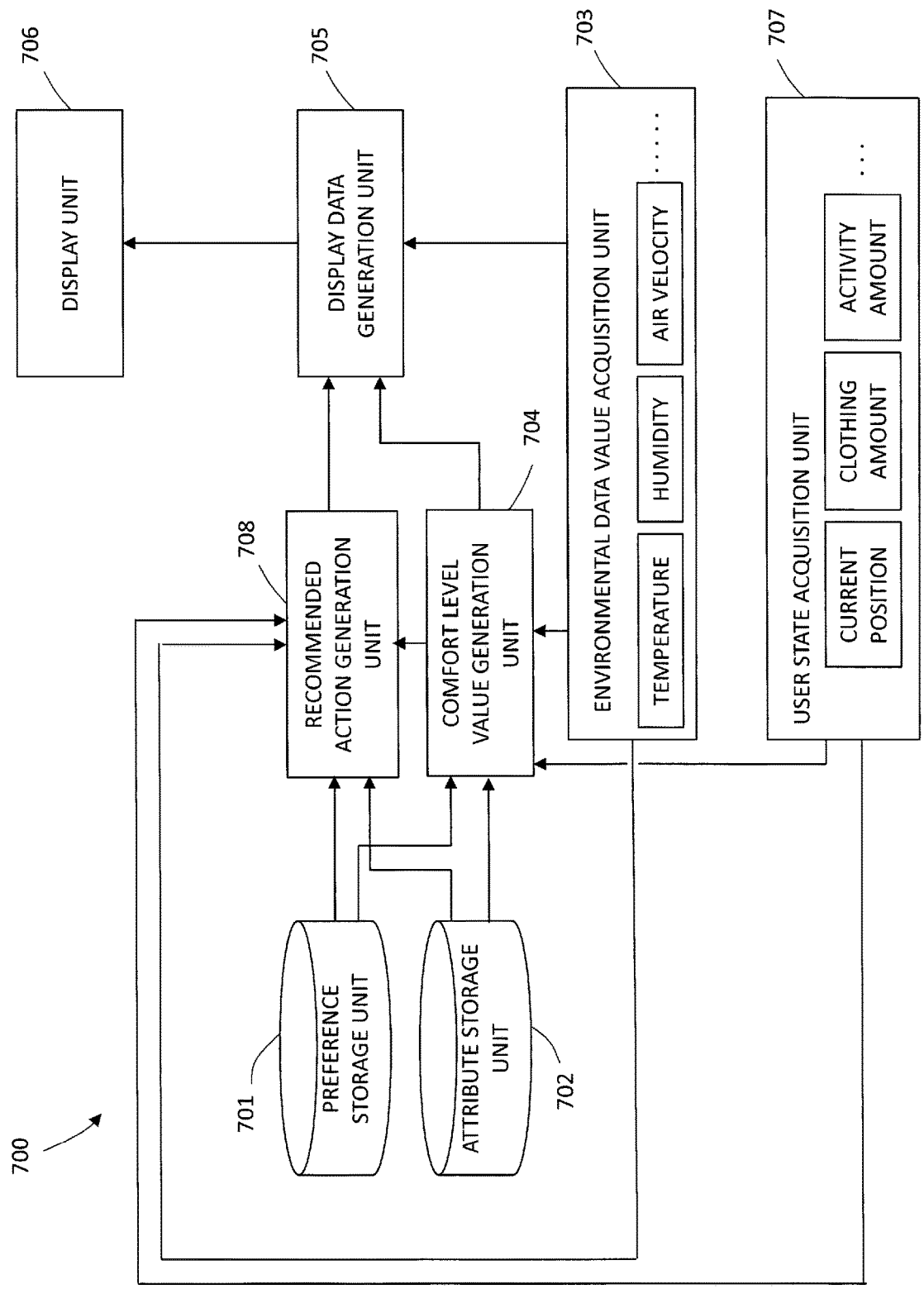
FIG. 28 is a functional block diagram illustrating a configuration of a comfort level display apparatus in Embodiment 10.

Next, a comfort level display apparatus 700 of Embodiment 10 will be described with reference to FIGS. 28 to 30. As illustrated in FIG. 28, the comfort level display apparatus 700 is such that a user state acquisition unit 707 and a recommended action generation unit 708 are added to the comfort level display apparatus 100 described with reference to FIG. 1. A preference storage unit 701, an attribute storage unit 702, an environmental data value acquisition unit 703, and a display unit 706 that constitute the comfort level display apparatus 700 are the same as the preference storage unit 101, the attribute storage unit 102, the environmental data value acquisition unit 103, and the display unit 106 of the comfort level display apparatus 100 described with reference to FIG. 1.

The user state acquisition unit 707 acquires current quantities of state, such as a current clothing amount and activity amount, of a specific user and a current position of the specific user. The user state acquisition unit 707 may acquire, as the clothing amount, a value obtained from a difference in temperature between the temperature of skin and the temperature of clothing measured by a thermographic camera, for example. The user state acquisition unit 707 may acquire, as the activity amount and the current position, values obtained by analyzing an image of a monitoring camera.

A comfort level value generation unit 704 generates a current comfort level value indicating the current comfort of the user, based on preferences of the user stored in the preference storage unit 701, attributes of the user stored in the attribute storage unit 702, environmental data values of the air-conditioned space 40 acquired by the environmental data value acquisition unit 703, and the current quantities of state of the user and the current position of the user acquired by the user state acquisition unit 707. Then, the comfort level value generation unit 704 outputs the generated current comfort level value to a display data generation unit 705 and the recommended action generation unit 708.

If the current comfort level value input from the comfort level value generation unit 704 is not within a predetermined range, the recommended action generation unit 708 determines a changed quantity of state of the user that enables the comfort level value of the user to fall within the predetermined range. Specifically, the recommended action generation unit 708 determines the changed quantity of state of the user that enables the comfort level value of the user to fall within the predetermined range by repeating operation of changing a quantity of state of the user from the current quantity of state, and generating a comfort level value of the user based on the preferences of the user, the attributes of the user, the environmental data values of the air-conditioned space 40, and the current position of the user, until the comfort level value of the user falls within the predetermined range. Then, the recommended action generation unit 708 generates a recommended action for the user based on a difference between the current quantity of state and the changed quantity of state of the user.

The display data generation unit 705 generates recommended action display data by synthesizing the current comfort level value of the user generated by the comfort level value generation unit 704, the environmental data values of the air-conditioned space 40 acquired by the environmental data value acquisition unit 703, and the recommended action generated by the recommended action generation unit 708. Then, the display data generation unit 705 outputs the generated recommended action display data to the display unit 706.

Operation of the comfort level display apparatus 700 will be described below with reference to FIG. 29. As indicated in steps S101 to S103 of FIG. 29, the comfort level value generation unit 704 reads preferences and attributes of a user from the preference storage unit 701 and the attribute storage unit 702, and acquires environmental data values, such as temperature, humidity, and air velocity, of the air-conditioned space 40 from the environmental data value acquisition unit 703. As indicated in steps S701 and S702 of FIG. 29, the comfort level value generation unit 704 acquires current quantities of state, such as a current clothing amount and activity amount, of the user from the user state acquisition unit 707.

Figure 29:
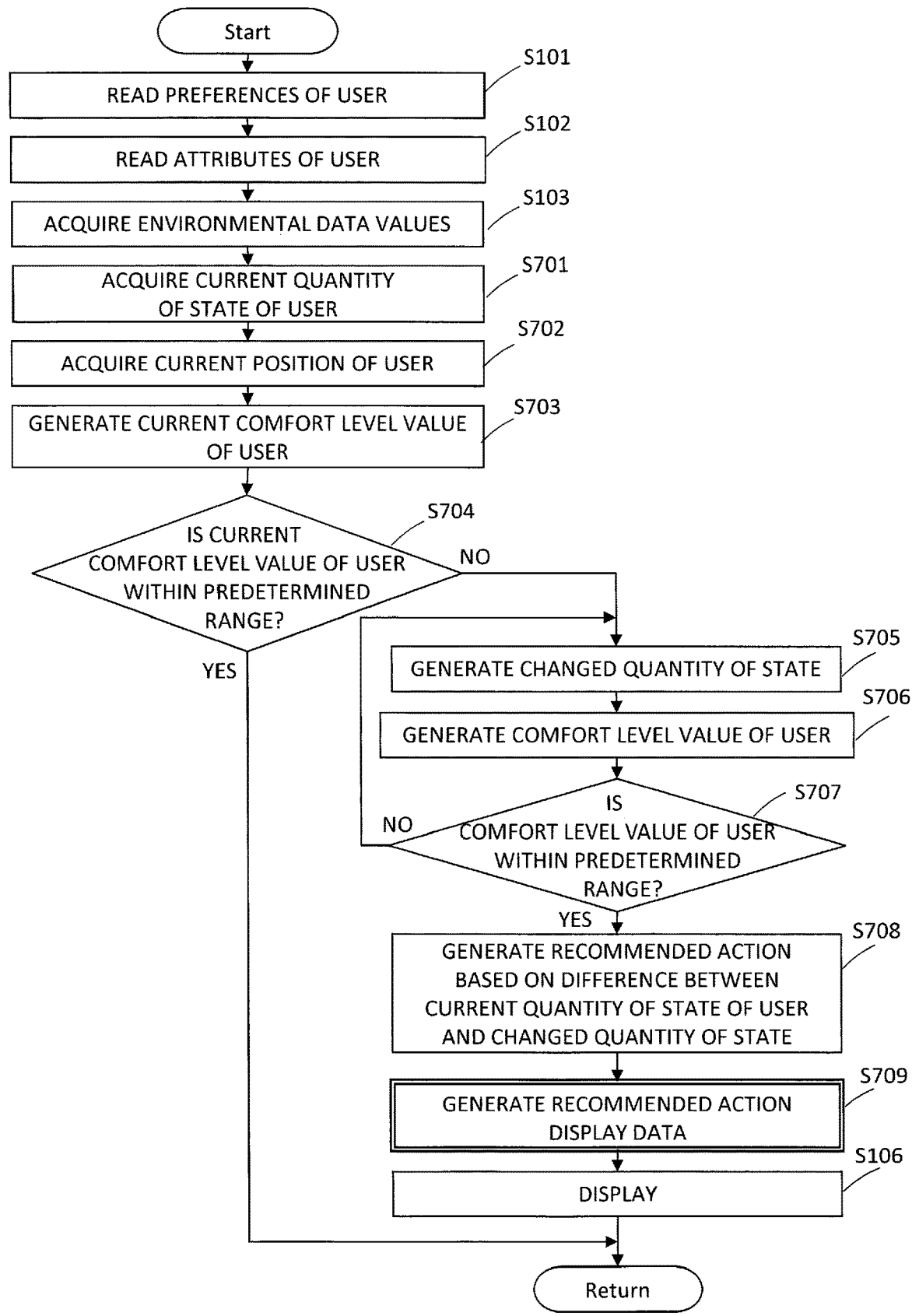
FIG. 29 is a flowchart illustrating operation of the comfort level display apparatus illustrated in FIG. 28.
Figure 30:
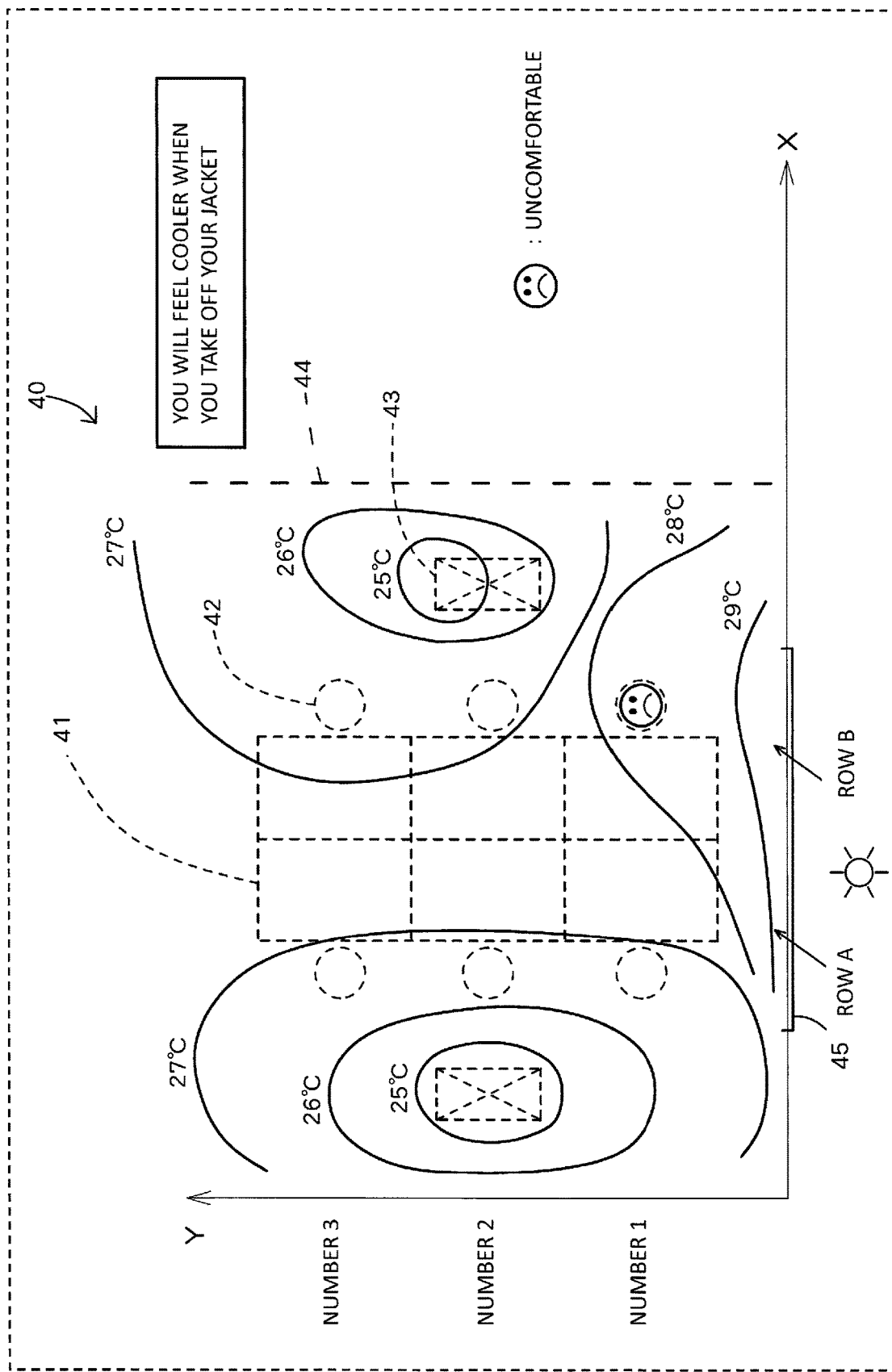
FIG. 30 is an example of display by the comfort level display apparatus illustrated in FIG. 28 (an example of display of a temperature distribution in an air-conditioned space, a current comfort level value at a current position, and a recommended action)

As indicated in step S703 of FIG. 29, the comfort level value generation unit 704 generates a current comfort level of the user. Specifically, the comfort level value generation unit 704 calculates the current PMV of the user by the formula (2), using the four physical values of temperature, humidity, air velocity, and radiation temperature of the air-conditioned space 40 acquired from the environmental data value acquisition unit 703 in step S103 of FIG. 29 and the current clothing amount and activity amount of the user acquired in step S701 of FIG. 29.

Furthermore, in steps S101 and S102 of FIG. 29, the comfort level value generation unit 704 generates a current comfort level value of the user by the formulas (1), (3), and (4), using the preferences and attributes of the user read from the preference storage unit 701 and the attribute storage unit 702. Then, the comfort level value generation unit 704 outputs the generated current comfort level value of the user to the recommended action generation unit 708 and the display data generation unit 705.

As indicated in step S704 of FIG. 29, the recommended action generation unit 708 determines whether the current comfort level value of the user input from the comfort level value generation unit 704 is within a predetermined range. The predetermined range is, for example, such a range in which approximately 90% or more of people feel comfortable, and may be the range of –0.5<comfort level value <0.5.

If the recommended action generation unit 708 determines NO in step S704 of FIG. 29, the recommended action generation unit 708 proceeds to step S705 of FIG. 29 to change the quantity of state of the user from the current quantity of state. For example, if the clothing amount of the user is greater than a standard clothing amount, the recommended action generation unit 708 reduces the clothing amount. On the other hand, if the clothing amount is less than the standard clothing amount, the recommended action generation unit 708 increases the clothing amount. Then, in step S706 of FIG. 29, the recommended action generation unit 708 reads the preferences and attributes of the user from the preference storage unit 701 and the attribute storage unit 702, acquires the environmental data values, such as temperature, humidity, and air velocity, of the air-conditioned space 40 from the environmental data value acquisition unit 703, generates a comfort level value of the user using a changed quantity of state which is the quantity of state of the user that has been changed, and proceeds to step S707 of FIG. 29.

In step S707 of FIG. 29, the recommended action generation unit 708 determines whether the comfort level value of the user generated in step S706 is within the predetermined range. If the recommended action generation unit 708 determines NO in step S707 of FIG. 29, the recommended action generation unit 708 returns to step S705 of FIG. 29 to change the quantity of state of the user, and generates a comfort level value of the user in step S706. The recommended action generation unit 708 thus changes the quantity of state of the user and generates a comfort level value of the user repeatedly until the comfort level value of the user falls within the predetermined range. Then, if the recommended action generation unit 708 determines YES in step S707 of FIG. 29, the recommended action generation unit 708 proceeds to step S708 of FIG. 29 to fix the changed quantity of state of the user. Then, in step S709 of FIG. 29, the recommended action generation unit 708 generates a recommended action based on a difference between the current quantity of state of the user acquired in step S701 and the fixed changed quantity of state of the user.

An example of generation of a recommended action will be presented below. For example, it is assumed that the current comfort level value of the user is +2.0 and the user is feeling warm, and the comfort level value falls with the predetermined range when the clothing amount is reduced from the current quantity of state. In this case, it is supposed that the comfortable state would be achieved by reducing the clothing amount by the user's action such as taking off a jacket. Therefore, the recommended action generation unit 708 generates a recommended action: "You will feel cooler when you take off your jacket."

It is assumed that the current comfort level value of the user is −2.0 and the user is feeling cool, and the comfort level value falls within the predetermined range when the activity amount is increased from the current quantity of state. In this case, it is supposed that the user is feeling cool as a result of remaining seated for a while, so that the comfortable state would be achieved by increasing the activity amount. Therefore, the recommended action generation unit 708 generates a recommended action: "Try standing up and exercising. You will feel warmer."

As indicated in step S709 of FIG. 29, the display data generation unit 705 generates recommended action display data by synthesizing the environmental data values, such as temperature and humidity, acquired from the environmental data value acquisition unit 703, the current comfort level value of the user input from the comfort level value generation unit 704, and the recommended action input from the recommended action generation unit 708. Then, the display data generation unit 705 outputs the generated recommended action display data to the display unit 706. As indicated in step S106 of FIG. 29, the display unit 706 displays the recommended action display data.

An example of the recommended action display data displayed by the display unit 706 will be described with reference to FIG. 30. As illustrated in FIG. 30, in the recommended action display data, the mark corresponding to the current comfort level value of the user is superimposed over the temperature distribution in the air-conditioned space 40, similarly to FIG. 7. Furthermore, in the recommended action display data, text of the recommended action to the user is superimposed. As illustrated in FIG. 30, the user is sitting in the seat position B-1 and the temperature around the seat position is approximately 28.5° C. The current comfort level value of the user is +2.0 and the user is feeling warm (the mark is one with both corners of the mouth down indicating discomfort). Also note that the user is wearing a jacket. Then, the recommendation text that reads "You will feel cooler when you take off your jacket" is displayed at an upper right portion as the recommended text to recommend the user to take off the jacket.

The comfort level display apparatus 700 thus recommends an action that will improve comfort of the user based on the current position and current quantity of state of the user, so that the comfort level and productivity of the user can be improved.

Embodiment 11

Figure 31:
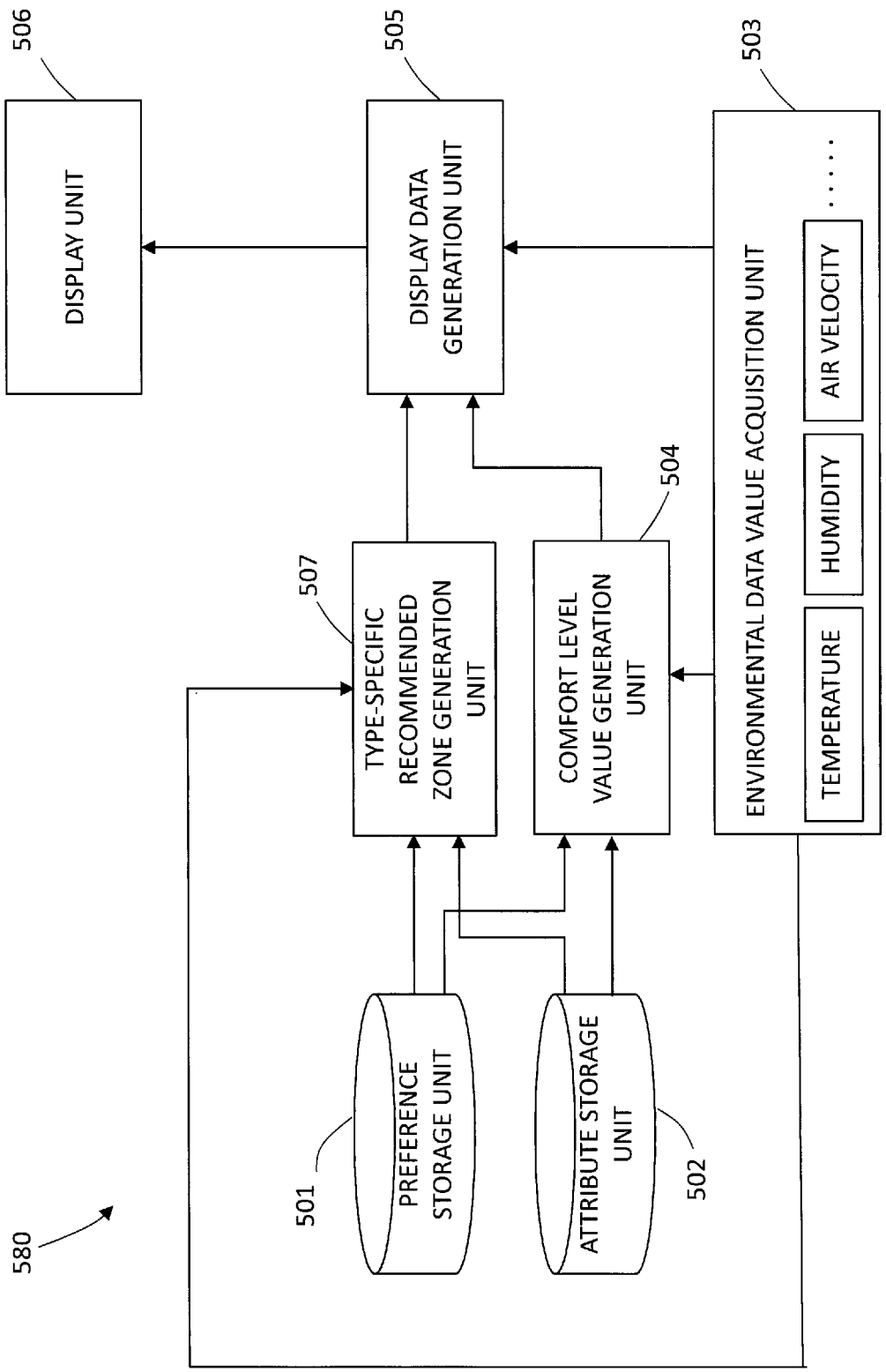
FIG. 31 is a functional block diagram illustrating a configuration of a comfort level display apparatus in Embodiment 11.

A comfort level display apparatus 580 of Embodiment 11 will be described with reference to FIG. 31. As illustrated in FIG. 31, the comfort level display apparatus 580 is such that a comfort level value generation unit 504 which is substantially the same as the comfort level value generation unit 104 of the comfort level display apparatus 100 described with reference to FIG. 1 is added to the comfort level display apparatus 500 described with reference to FIG. 21. Operation of the type-specific recommended zone generation unit 507 is substantially the same as the operation of the comfort level display apparatus 500 described with reference to FIG. 23.

The display data generation unit 505 of the comfort level display apparatus 580 generates type-specific recommended zone display data by synthesizing comfort level values of users generated by the comfort level value generation unit 504, type-specific recommended zones generated by the type-specific recommended zone generation unit 507, and environmental data values of the air-conditioned space 40 acquired by the environmental data value acquisition unit 503. Then, the display data generation unit 505 outputs the generated type-specific recommended zone display data to the display unit 506.

Figure 32:
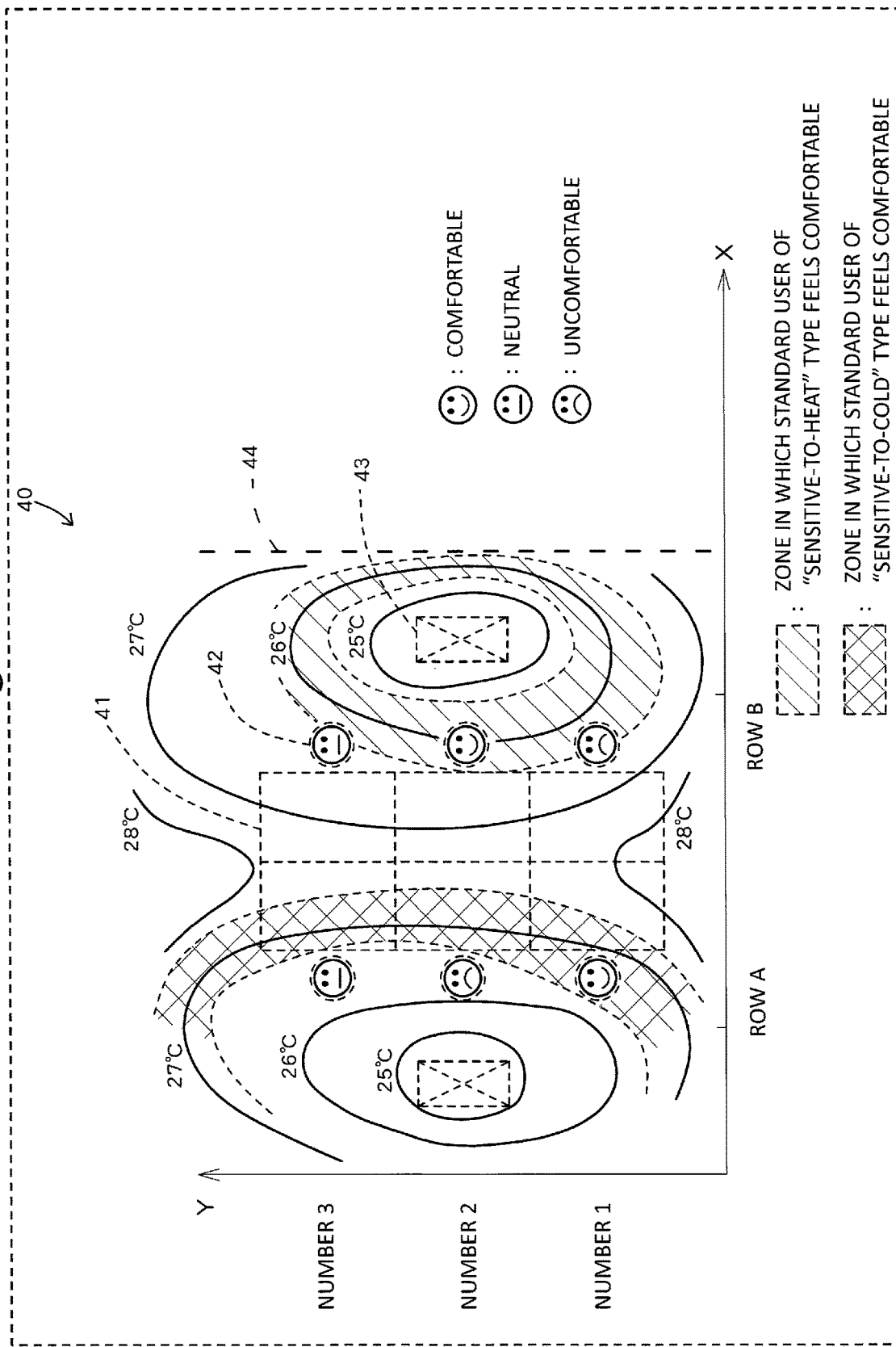
FIG. 32 is an example of display of type-specific recommended zones by the comfort level display apparatus illustrated in FIG. 31 (an example of display of a temperature distribution in an air-conditioned space, a distribution of comfort levels, and type-specific recommended zones)

FIG. 32 illustrates an example of display by the display unit 506 of the comfort level display apparatus 580. In FIG. 32, ranges in which type-specific reference users feel comfortable, a temperature distribution in the air-conditioned space 40, and marks corresponding to the comfort level values of individual users are superimposed over one another. The diagonally-hatched zone illustrated in FIG. 32 corresponds to the zone in which the temperature is 25.5° C. to 26.5° C. and indicates the zone in which the type-specific reference user of the "sensitive-to-heat" type feels comfortable. The cross-hatched zone illustrated in FIG. 32 corresponds to the zone in which the temperature is 26.5° C. to 27.5° C. and indicates the zone in which the type-specific reference user of the "sensitive-to-cold" type feels comfortable.

The comfort level display apparatus 580 achieves substantially the same effects as those of the comfort level display apparatus 500.

Embodiment 12

Figure 33:
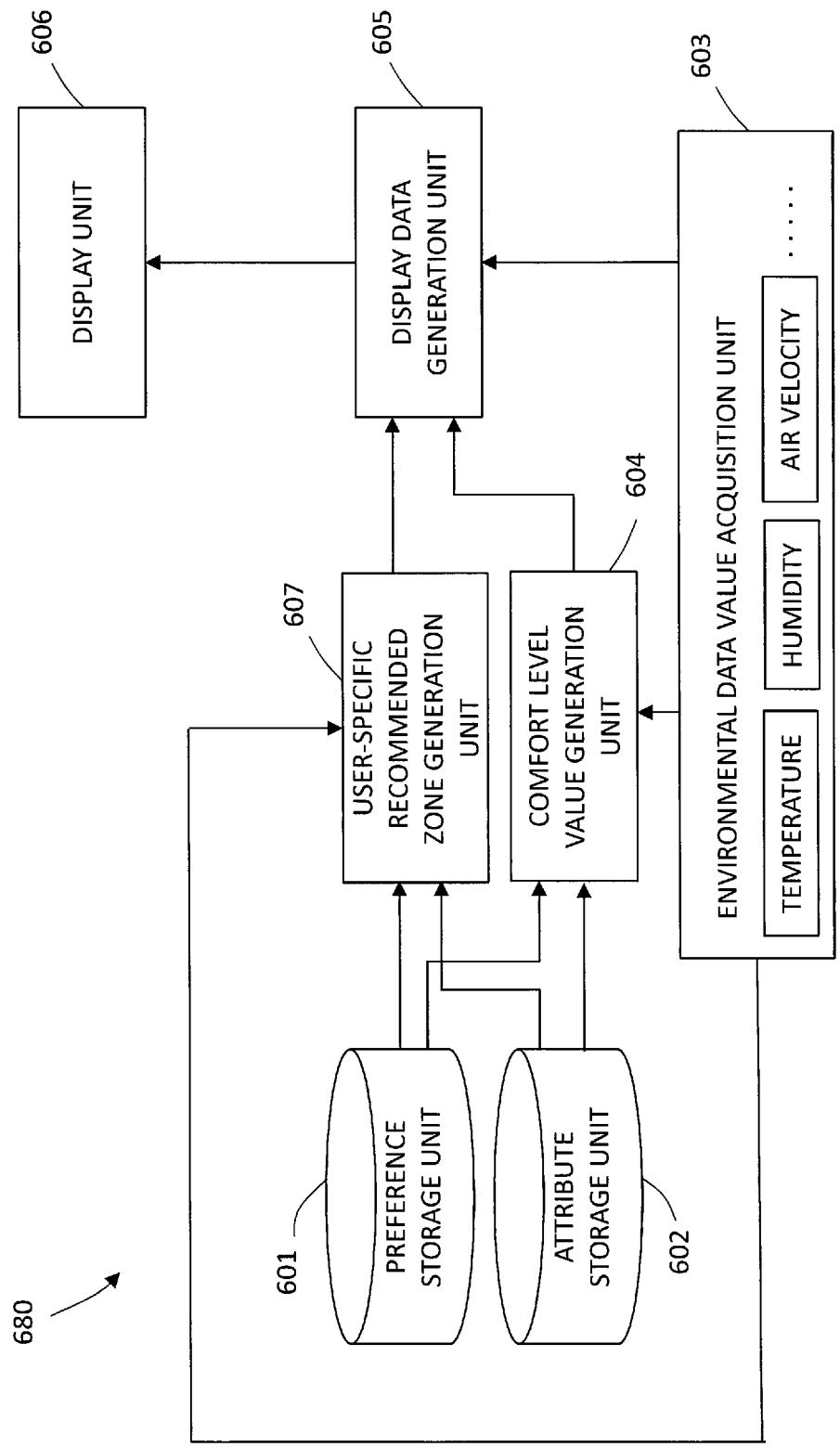
FIG. 33 is a functional block diagram illustrating a configuration of a comfort level display apparatus in Embodiment 12.

A comfort level display apparatus 680 of Embodiment 12 will be described with reference to FIG. 33. As illustrated in FIG. 33, the comfort level display apparatus 680 is such that a comfort level value generation unit 604 which is substantially the same as the comfort level value generation unit 104 of the comfort level display apparatus 100 described with reference to FIG. 1 is added to the comfort level display apparatus 600 described with reference to FIG. 25. Operation of the user-specific recommended zone generation unit 607 is the same as the operation of the comfort level display apparatus 600 described with reference to FIG. 26.

The display data generation unit 605 of the comfort level display apparatus 680 generates user-specific recommended zone display data by synthesizing comfort level values of users generated by the comfort level value generation unit 604, user-specific recommended zones generated by the user-specific recommended zone generation unit 607, and environmental data values of the air-conditioned space 40 acquired by the environmental data value acquisition unit 603. Then, the display data generation unit 605 outputs the generated user-specific recommended zone display data to the display unit 606.

The display unit 606 of the comfort level display apparatus 680 displays the user-specific recommended zone display data as illustrated in FIG. 32, similarly to the display unit 506 of the comfort level display apparatus 580. However, in the comfort level display apparatus 680, the diagonally-hatched zone illustrated in FIG. 32 indicates the zone in which a specific user C who is "sensitive to heat" feels comfortable. The cross-hatched zone illustrated in FIG. 32 indicates the zone in which a specific user B who is "sensitive to cold" feels comfortable.

The comfort level display apparatus 680 achieves substantially the same effects as those of the comfort level display apparatus 600.

Embodiment 13

Figure 34:
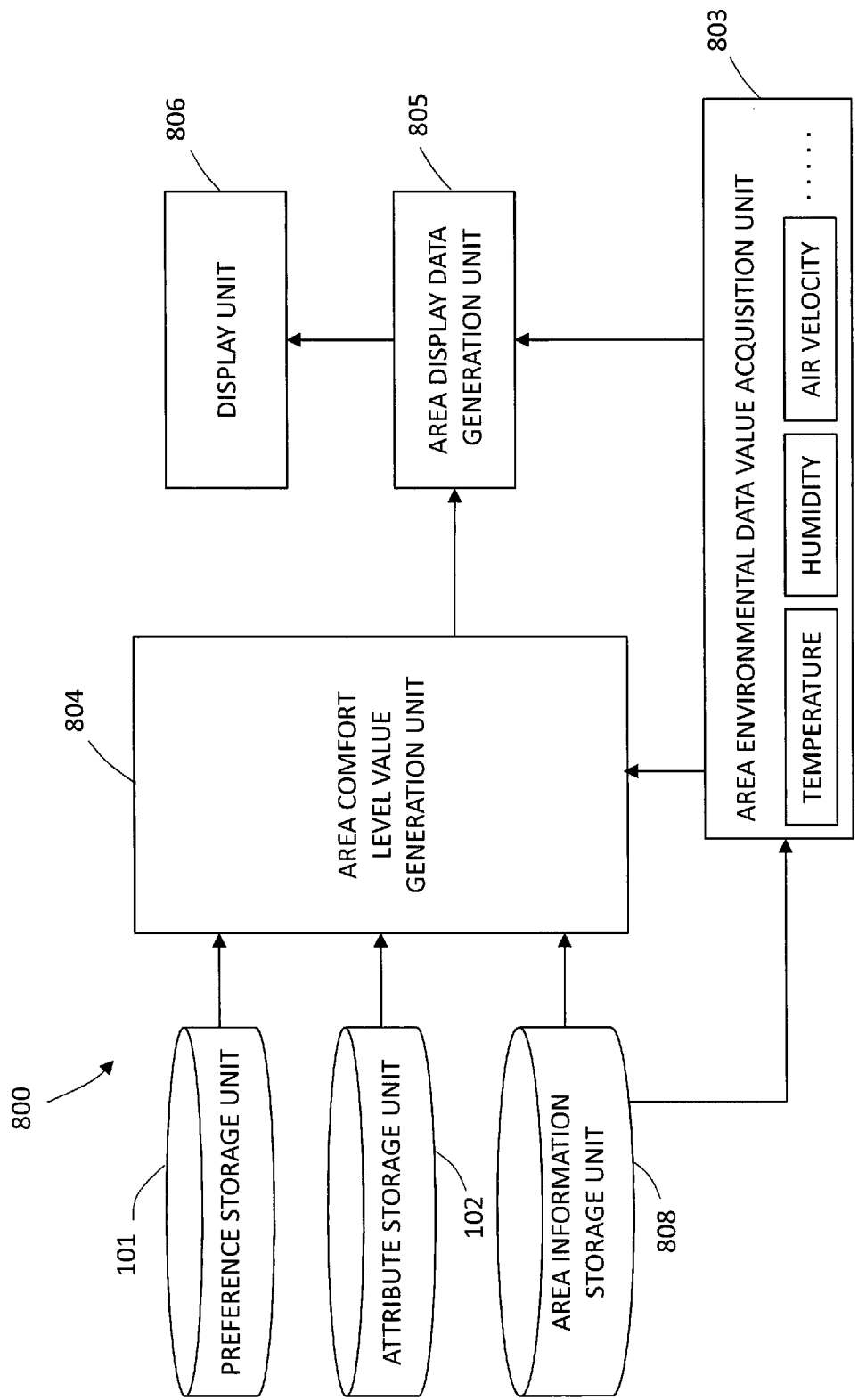
FIG. 34 is a functional block diagram illustrating a configuration of a comfort level display apparatus in Embodiment 13.

A comfort level display apparatus 800 of Embodiment 13 will be described with reference to FIG. 34. As illustrated in FIG. 34, the comfort level display apparatus 800 is such that an area information storage unit 808 is added to the comfort level display apparatus 100 described with reference to FIG. 1. The comfort level display apparatus 800 has an area comfort level value generation unit 804, an area environmental data value acquisition unit 803, an area display data generation unit 805, and a display unit 806, in place of the comfort level value generation unit 104, the environmental data value acquisition unit 103, and the display data generation unit 105.

Figure 36:
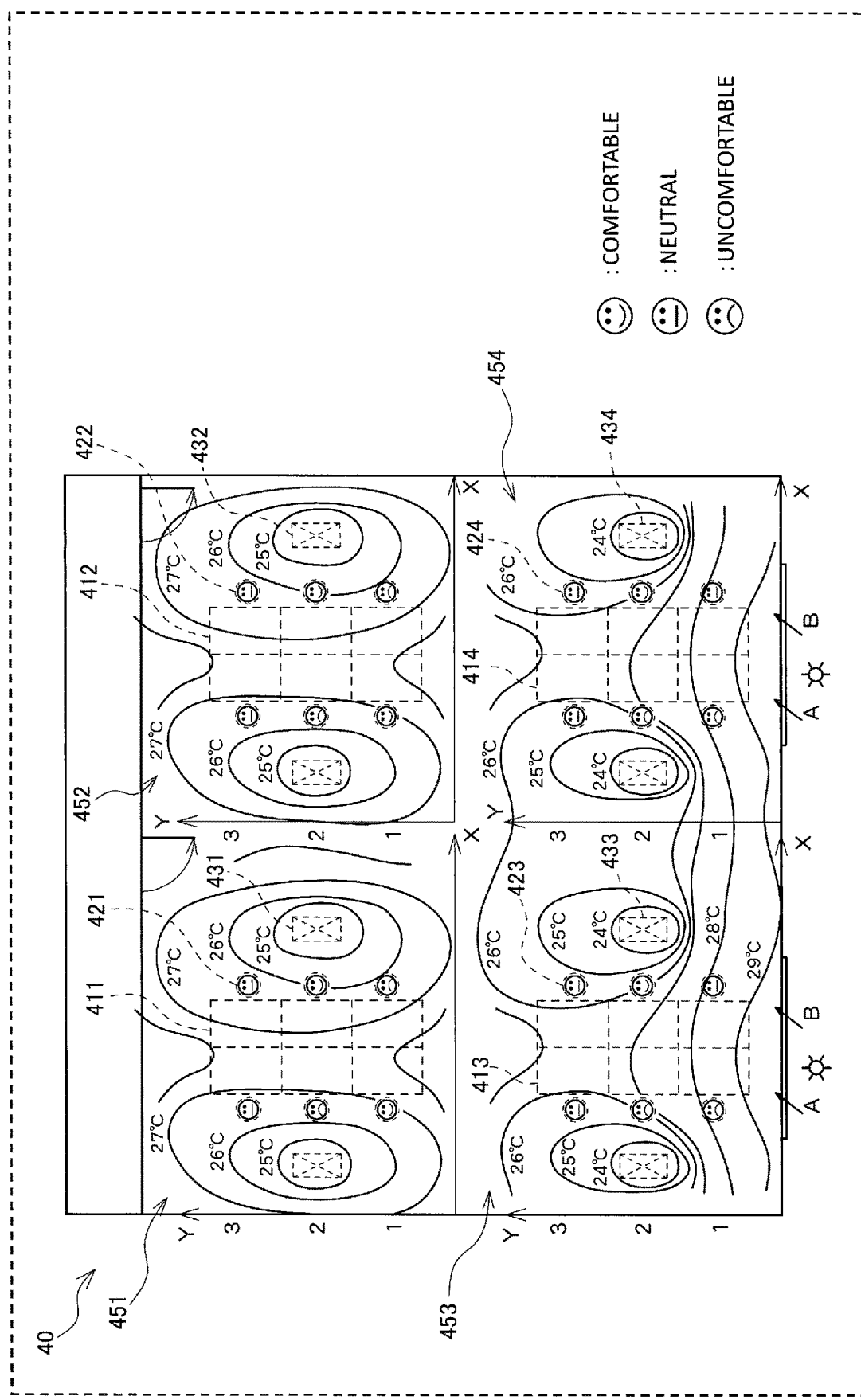
FIG. 36 is an example of display by the comfort level display apparatus illustrated in FIG. 34, where temperatures and comfort levels in an air-conditioned space are displayed on a per-area basis.

The comfort level display apparatus 800 displays an area comfort level value and an area environmental data value for each of a plurality of areas 451 to 454 in an air-conditioned space 40, as illustrated in FIG. 36, for example. As illustrated in FIG. 36, the air-conditioned space 40 is, for example, one floor in a building, and each of the areas 451 to 454 is a part of the floor. In the areas 451 to 454, office desks 411 to 414 and chairs 421 to 424 are placed on the floor and vents 431 to 434 of air-conditioning equipment are placed on the ceiling.

The area information storage unit 808 stores configuration information of each of the areas 451 to 454. The configuration information of each of the areas 451 to 454 includes information on the layout and shape of each of the areas 451 to 454, such as the position and size of each area. The configuration information of each of the areas 451 to 454 also includes information on the layout of the air-conditioning equipment, indoor unit, temperature sensor, humidity sensor, anemometer and the like placed in each of the areas 451 to 454. The configuration information of each of the areas 451 to 454 further includes the layout of the desks in each of the areas 451 to 454 and information for identifying users sitting at the desks, for example, information such as names and employee numbers.

Figure 35:
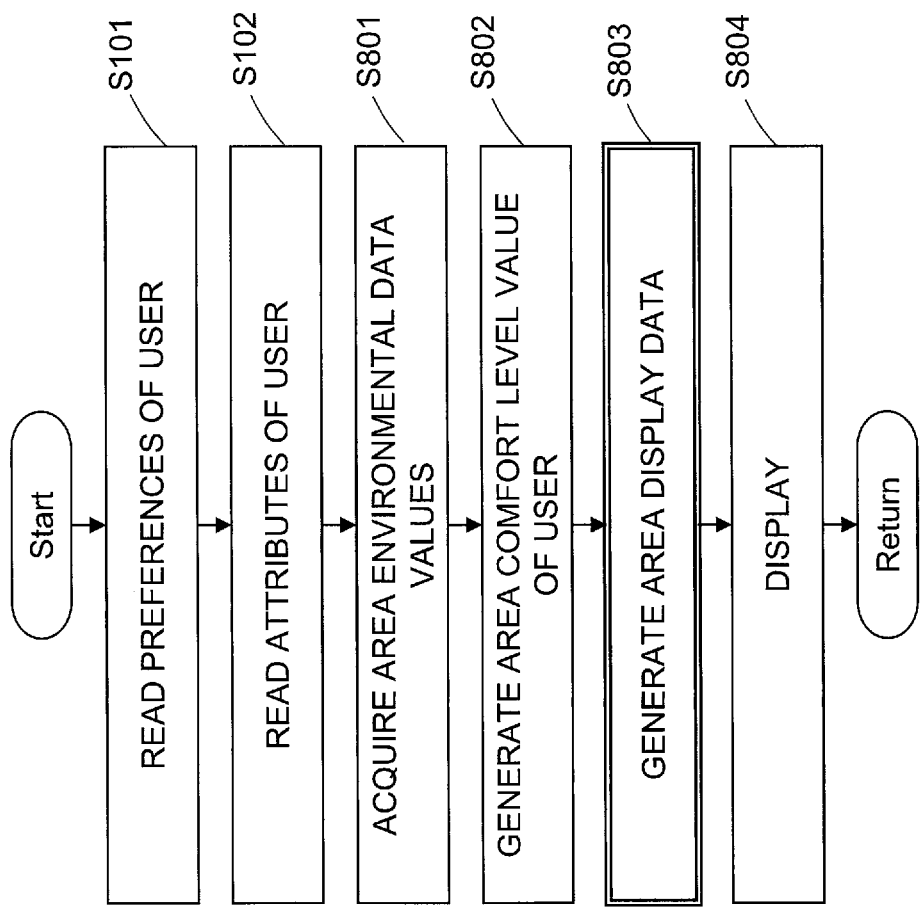
FIG. 35 is a flowchart illustrating operation of the comfort level display apparatus illustrated in FIG. 34.

In step S801 of FIG. 35, the area environmental data value acquisition unit 803 refers to the configuration information of the areas 451 to 454 stored in the area information storage unit 808, and acquires area environmental data values representing the conditions of the areas 451 to 454 for each area.

In step S802 of FIG. 35, the area comfort level value generation unit 804 generates area comfort level values indicating comfort of users in the areas 451 to 454, based on preferences of the users read from the preference storage unit 101 in step S101 of FIG. 35, attributes of the users read from the attribute storage unit 102 in step S102 of FIG. 35, and the area environmental data values acquired by the area environmental data value acquisition unit 803. A method for generating area comfort levels is substantially the same as the generation method in the comfort level display apparatus 100 described above.

In step S803 of FIG. 35, the area display data generation unit 805 generates area display data by synthesizing the area comfort level values of the users generated by the area comfort level value generation unit 804 and the area environmental data values acquired by the area environmental data value acquisition unit 803. In step S804 of FIG. 35, the display unit 806 displays one or a plurality of pieces of the area display data.

FIG. 36 illustrates an example of display by the display unit 806. FIG. 36 illustrates an example where over a temperature distribution at a certain time in each of the areas 451 to 454 in the air-conditioned space 40 as represented on the XY plane, marks indicating the comfort levels at that time of users sitting in individual seat positions in each of the areas 451 to 454 are superimposed. The data of FIG. 36 is displayed on the display unit 806. In FIG. 36, a facial mark indicating the comfort level of a corresponding user is displayed at the center of each of the chairs 421 to 424. With such display, it is possible to easily recognize the temperature distribution in each of the areas 451 to 454 in the air-conditioned space 40 and sensation experienced by each user in each of the areas 451 to 454 at a certain time.

Based on the display illustrated in FIG. 36, the air-conditioning manager can easily determine appropriate adjustment of the setting temperature for each of the areas 451 to 454 in the air-conditioned space 40.

Figure 37:
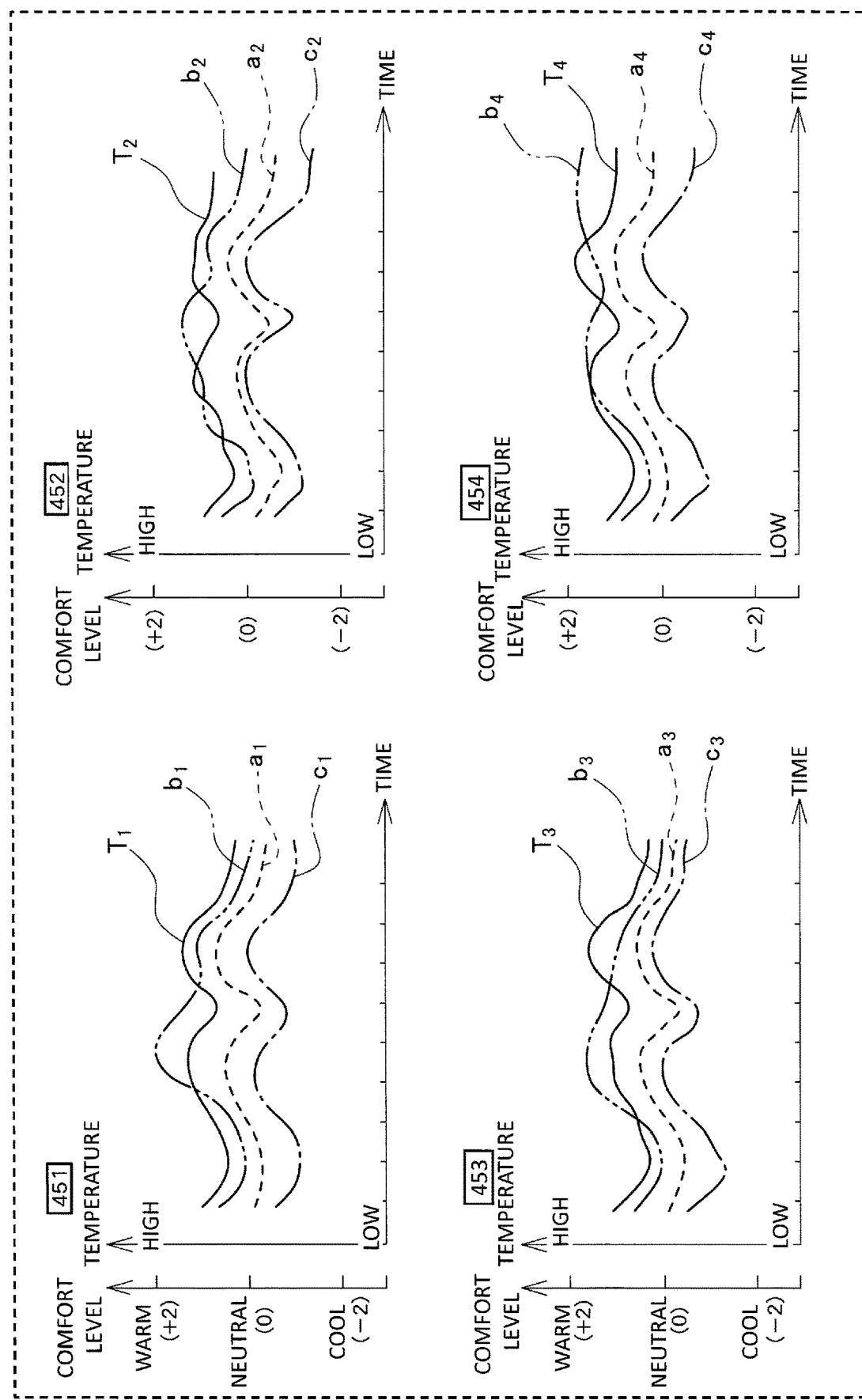
FIG. 37 is an example of display by the comfort level display apparatus illustrated in FIG. 34, where changes over time in temperature and comfort levels are displayed on a per-area basis.

FIG. 37 illustrates another example of display by the display unit 806. FIG. 37 illustrates changes in temperature and changes over time in the comfort levels of users at a specific position in each of the areas 451 to 454 in the air-conditioned space 40 illustrated in FIG. 36. In the areas 451 to 454, the office desks 411 to 414 and the chairs 421 to 424 are arranged, respectively, in two rows of row A and row B each having three places from number 1 to number 3, as illustrated in FIG. 36. FIG. 37 illustrates solid lines T1 to T4 that indicate changes over time in temperature at the seat position of row A-number 1 in the areas 451 to 454, respectively, in the air-conditioned space 40 illustrated in FIG. 36. FIG. 37 also illustrates dotted lines a1 to a4 that indicate comfort levels of standard users A1 to A4, dash-dot-dot-dash lines b1 to b4 that indicate comfort levels of users B1 to B4 who are sensitive to cold, and dash-dot-dash lines c1 to c4 that indicate comfort levels of users C1 to C4 who are sensitive to heat.

From the display of FIG. 37, the air-conditioning manager can perceive the correlation between the changes in the comfort level values of the users A1 to A4, B1 to B4, and C1 to C4 and the temperature for each of the areas 451 to 454, and can adjust the setting temperature of the air-conditioning equipment in each of the areas 451 to 454.

As described above, the comfort level display apparatus 800 of this embodiment generates area display data by synthesizing the area comfort level values of the users and the area environmental data values for each of the areas 451 to 454, and displays the generated area display data. Therefore, the air-conditioning manager can perceive the trend in the relationship between the comfort levels and the environmental data for each of the areas 451 to 454, and easily determine the necessity of replacement, additional installation and the like of the air-conditioning equipment for each area.

Embodiment 14

Figure 38:
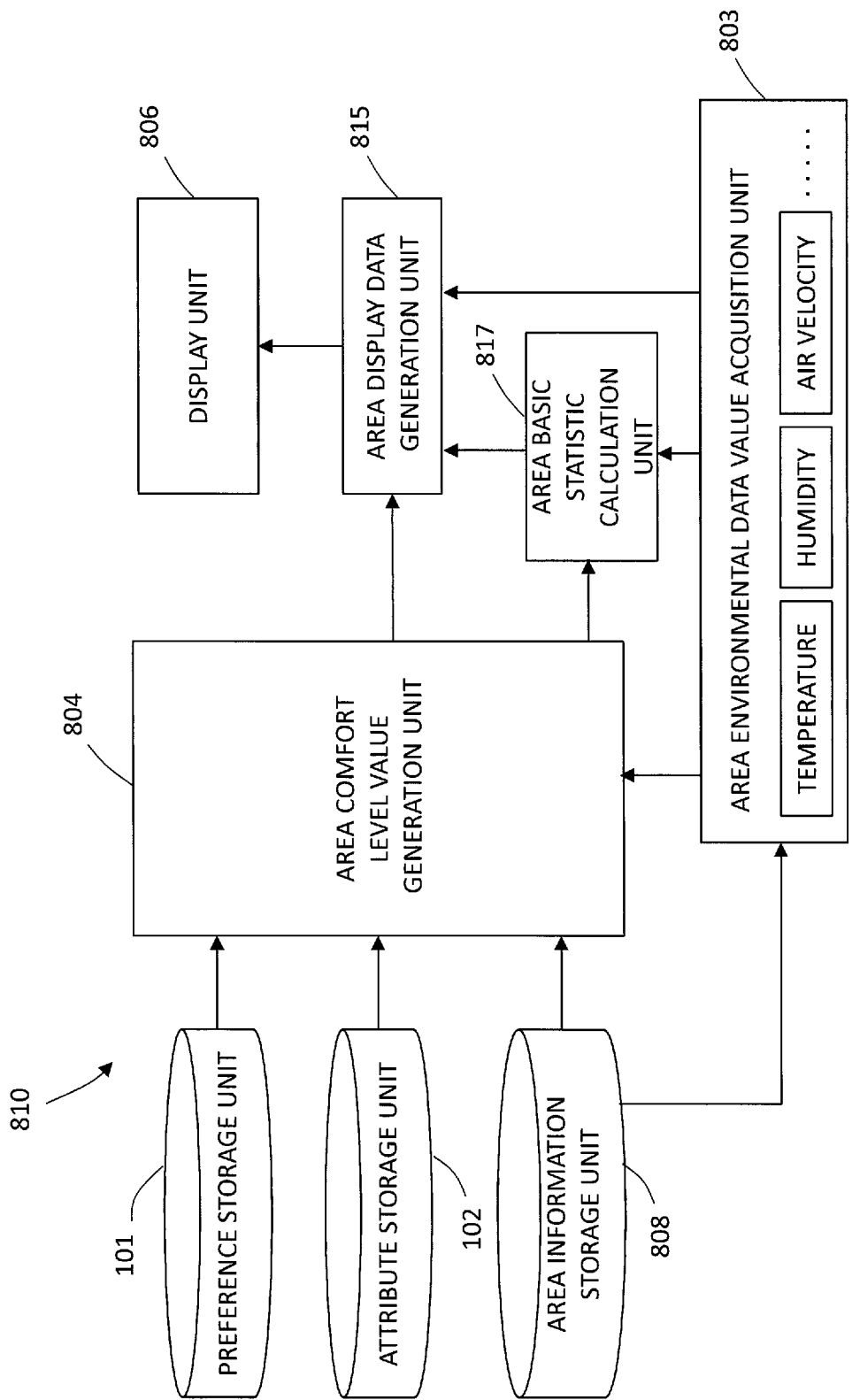
FIG. 38 is a functional block diagram illustrating a configuration of a comfort level display apparatus in Embodiment 14.

As illustrated in FIG. 38, a comfort level display apparatus 810 of Embodiment 14 is such that an area basic statistic calculation unit 817 is added to the comfort level display apparatus 800 described with reference to FIG. 34. The preference storage unit 101, the attribute storage unit 102, the area environmental data value acquisition unit 803, the area comfort level value generation unit 804, and the display unit 806 that constitute the comfort level display apparatus 810 are substantially the same as those of the comfort level display apparatus 800 described with reference to FIG. 34, and thus description will be omitted.

The area basic statistic calculation unit 817 calculates area comfort-level-value basic statistics and area environmental-data-value basic statistics. The area comfort-level-value basic statistics are basic statistics that are representative of area comfort level values of users generated by the area comfort level value generation unit 804, and include groups (1) to (5) below.

(1) Temporal average values or spatial average values of area comfort level values of users (2) Temporal median values or spatial median values of area comfort level values of users (3) Temporal maximum values or spatial maximum values of area comfort level values of users (4) Temporal minimum values or spatial minimum values of area comfort level values of users (5) Temporal mode values or spatial mode values of area comfort level values of users The area environmental-data-value basic statistics are basic statistics that are representative of area environmental data of each of the areas 451 to 454 in the air-conditioned space 40 acquired by the area environmental data value acquisition unit 803, and include groups (6) to (10) below.

(6) Temporal average values or spatial average values of area environmental data values (7) Temporal median values or spatial median values of area environmental data values (8) Temporal maximum values or spatial maximum values of area environmental data values (9) Temporal minimum values or spatial minimum values of area environmental data values

(10) Temporal mode values or spatial mode values of area environmental data values The temporal average value is the average value in each of the areas 451 to 454 in a predetermined period such as one day, one week, or one month, for example. The spatial average value is the average value of comfort levels of users in each of the areas 451 to 454 in the air-conditioned space 40, or the average value of environmental data values in each of the areas 451 to 454. That is, the spatial average value is the average value in each of the areas 451 to 454.

Similarly, the temporal median value and the spatial median value are the median values in each of the areas 451 to 454. The temporal maximum value and the spatial maximum value are the maximum values in each of the areas 451 to 454. The temporal minimum value and the spatial minimum value are the minimum values in each of the areas 451 to 454. The temporal mode value and the spatial mode value are the mode values in each of the areas 451 to 454.

An area display data generation unit 815 generates display integrated data by synthesizing the area comfort level values of users generated by the area comfort level value generation unit 804, the area environmental data values of each of the areas 451 to 454 in the air-conditioned space 40 acquired by the area environmental data value acquisition unit 803, and one or a plurality of the area comfort-level-value basic statistics representative of the area comfort level values of the users and the area environmental-data-value basic statistics representative of the area environmental data values of each of the areas 451 to 454 in the air-conditioned space 40 calculated by the area basic statistic calculation unit 817. Then, the area display data generation unit 815 outputs the generated display integrated data to the display unit 806. In more detail, the area display data generation unit 815 generates display integrated data by synthesizing one or a plurality of values of the temporal average value, spatial average value, temporal median value, spatial median value, temporal maximum value, spatial maximum value, temporal minimum value, spatial minimum value, temporal mode value, and spatial mode value of the area comfort level values of the users and the temporal average value, spatial average value, temporal median value, spatial median value, temporal maximum value, spatial maximum value, temporal minimum value, spatial minimum value, temporal mode value, and spatial mode value of the area environmental data values of each of the areas 451 to 454 calculated by the area basic statistic calculation unit 817 with the area comfort level values and the area environmental data values. Then, the area display data generation unit 815 outputs the generated display integrated data to the display unit 806.

Operation of the comfort level display apparatus 810 will now be described with reference to FIG. 39. An example will be described below where the area basic statistic calculation unit 817 calculates the temporal average value or spatial average value of the area comfort level values generated by the area comfort level value generation unit 804, and the temporal average value or spatial average value of the area environmental data values acquired by the area environmental data value acquisition unit 803. Steps that are the same as those in the operation of the comfort level display apparatus 800 described with reference to FIG. 35 will be denoted by the same reference signs as those in FIG. 35, and description will be omitted.

Figure 39:
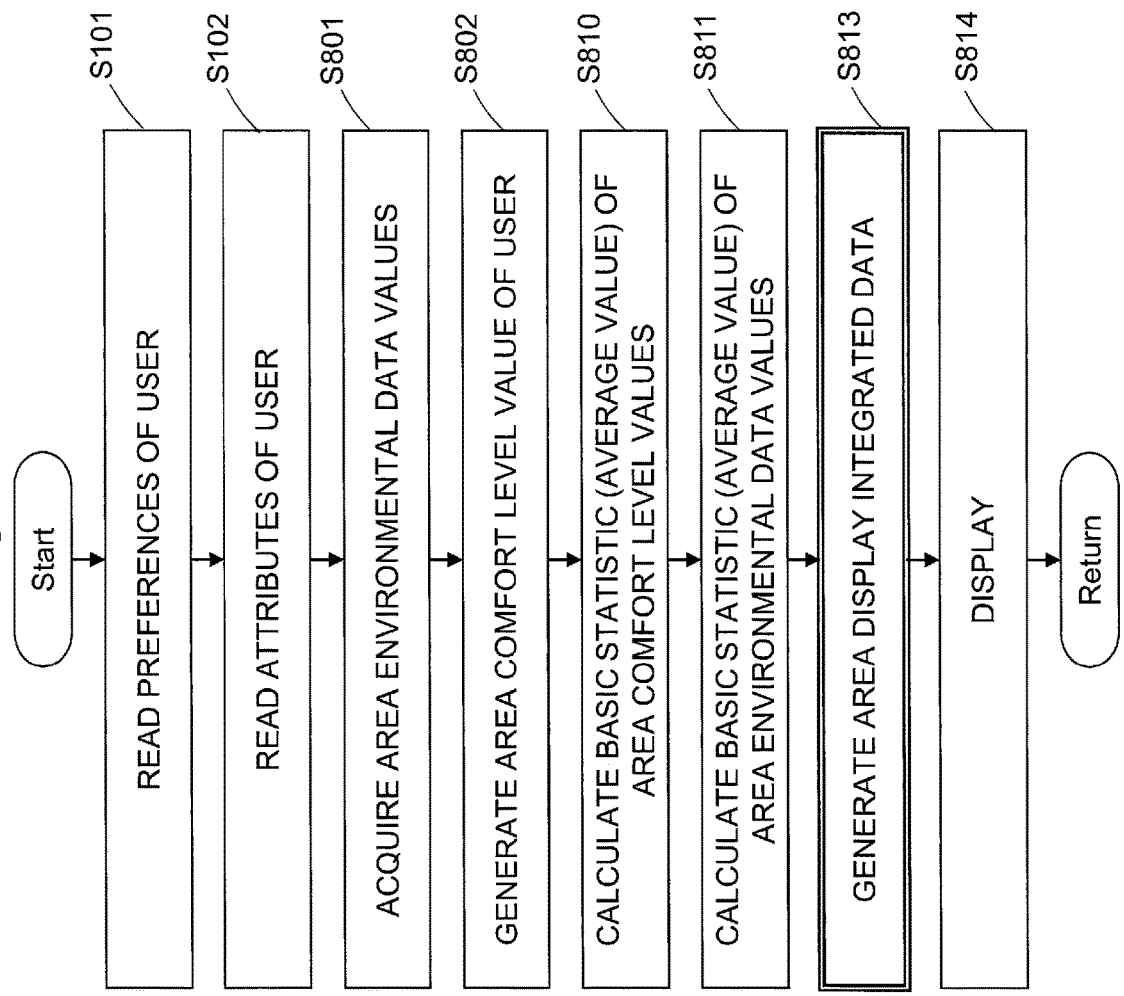
FIG. 39 is a flowchart illustrating operation of the comfort level display apparatus illustrated in FIG. 38.

As indicated in step S810 of FIG. 39, the area basic statistic calculation unit 817 calculates the temporal average value or spatial average value of the comfort level values which belongs to the group (1) of the area comfort-level-value basic statistics. In step S811 of FIG. 39, the area basic statistic calculation unit 817 calculates the temporal average value or spatial average value of the area environmental data values of each of the areas 451 to 454 which belongs to the group (6) of the area environmental-data-value basic statistics.

As indicated in step S813 of FIG. 39, the area display data generation unit 815, generates area display integrated data by synthesizing the area comfort level values of the users generated by the area comfort level value generation unit 804, the area environmental data values of each of the areas 451 to 454 acquired by the area environmental data value acquisition unit 803, and one or a plurality of values of the temporal average value or spatial average value of the area comfort level values of the users and the temporal average value or spatial average value of the area environmental data values of each of the areas 451 to 454 calculated by the area basic statistic calculation unit 817. The area display data generation unit 815 outputs the generated area display integrated data to the display unit 806. Then, as indicated in step S814 of FIG. 39, the display unit 806 displays the area display integrated data generated by the area display data generation unit 815.

Figure 40:
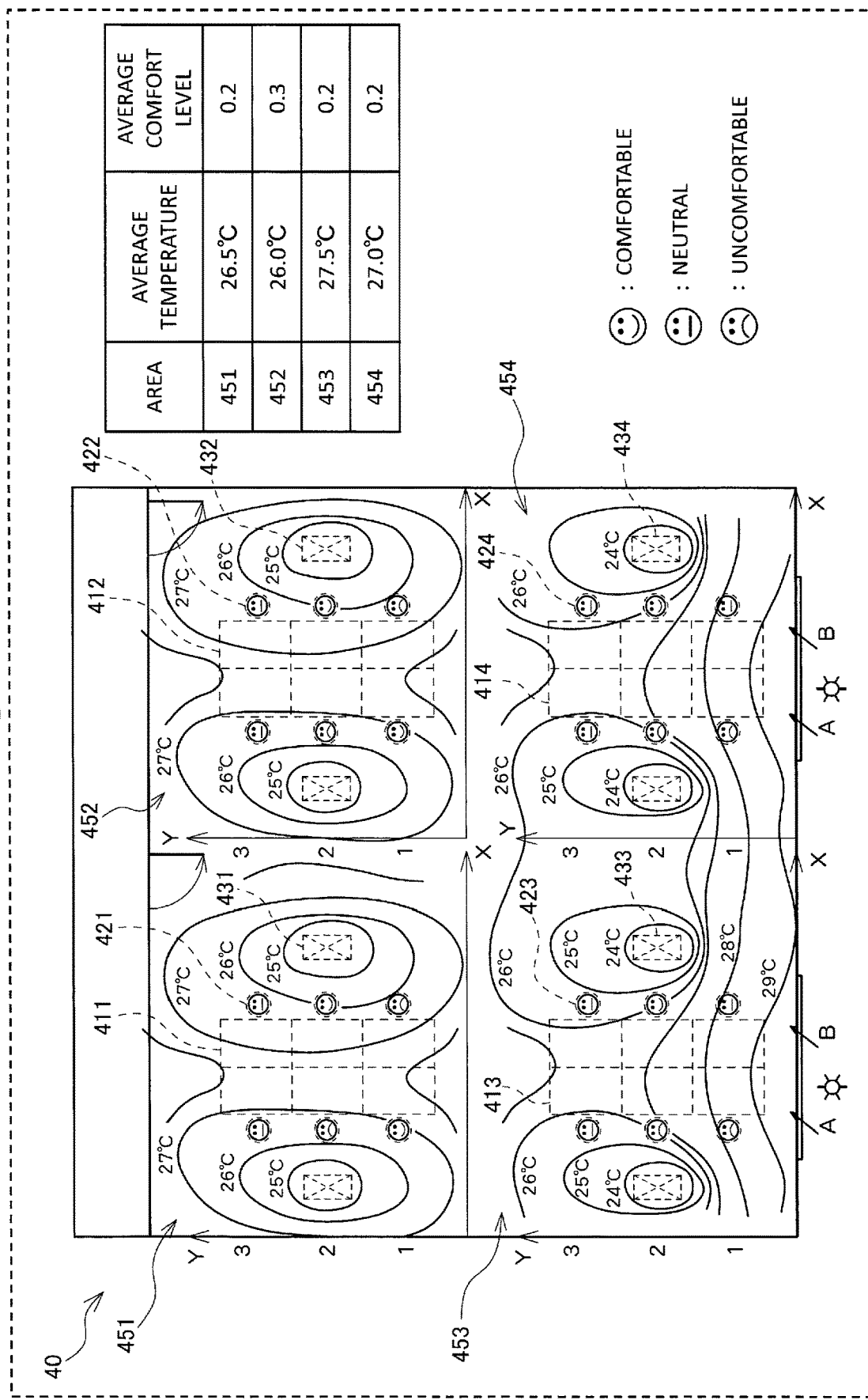
FIG. 40 is an example of display by the comfort level display apparatus illustrated in FIG. 38, where temperatures and comfort levels in an air-conditioned space are displayed on a per-area basis.

FIG. 40 illustrates an example of display by the display unit 806. In FIG. 40, a table of the average temperatures and the average comfort levels in the areas 451 to 454 is added to the display by the comfort level display apparatus 800 described above with reference to FIG. 36.

The case in which the area basic statistic calculation unit 817 calculates the average values has been described above. When the median values are calculated and area display integrated data based on the median values is displayed, in step 810 of FIG. 39 the area basic statistic calculation unit 817 calculates the temporal median value or spatial median value of the comfort level values which belongs to the group (2) of the area comfort-level-value basic statistics. In step S811 of FIG. 39, the area basic statistic calculation unit 817 calculates the temporal median value or spatial median value of the area environmental data values of each of the areas 451 to 454 which belongs to the group (7) of the area environmental-data-value basic statistics. Similarly, when the maximum values, minimum values, or mode values are calculated and area display integrated data based on the maximum values, minimum values, or mode values is displayed, the area basic statistic calculation unit 817 calculates the maximum value, minimum value, or mode value of the comfort level values which belongs to the group (3), (4), or (5) of the comfort-level-value basic statistics. In step S811 of FIG. 39, the area basic statistic calculation unit 817 calculates the maximum value, minimum value, or mode value of the area environmental data values which belongs to the group (8), (9), or (10) of the area environmental-data-value basic statistics. The rest of the operation is substantially the same as in the case of calculating the average values described above.

The display unit 806 may display different types of area basic statistics of the area comfort level values and the area environmental data values in combination. For example, the area basic statistic calculation unit 817 may calculate the temporal average value or spatial average value of the area comfort level values and the temporal median value or spatial median value of the area environmental data values of each of the areas 451 to 454 in the air-conditioned space 40. Then, the area display data generation unit 815 may display these values on the display unit 806.

Embodiment 15

Figure 41:
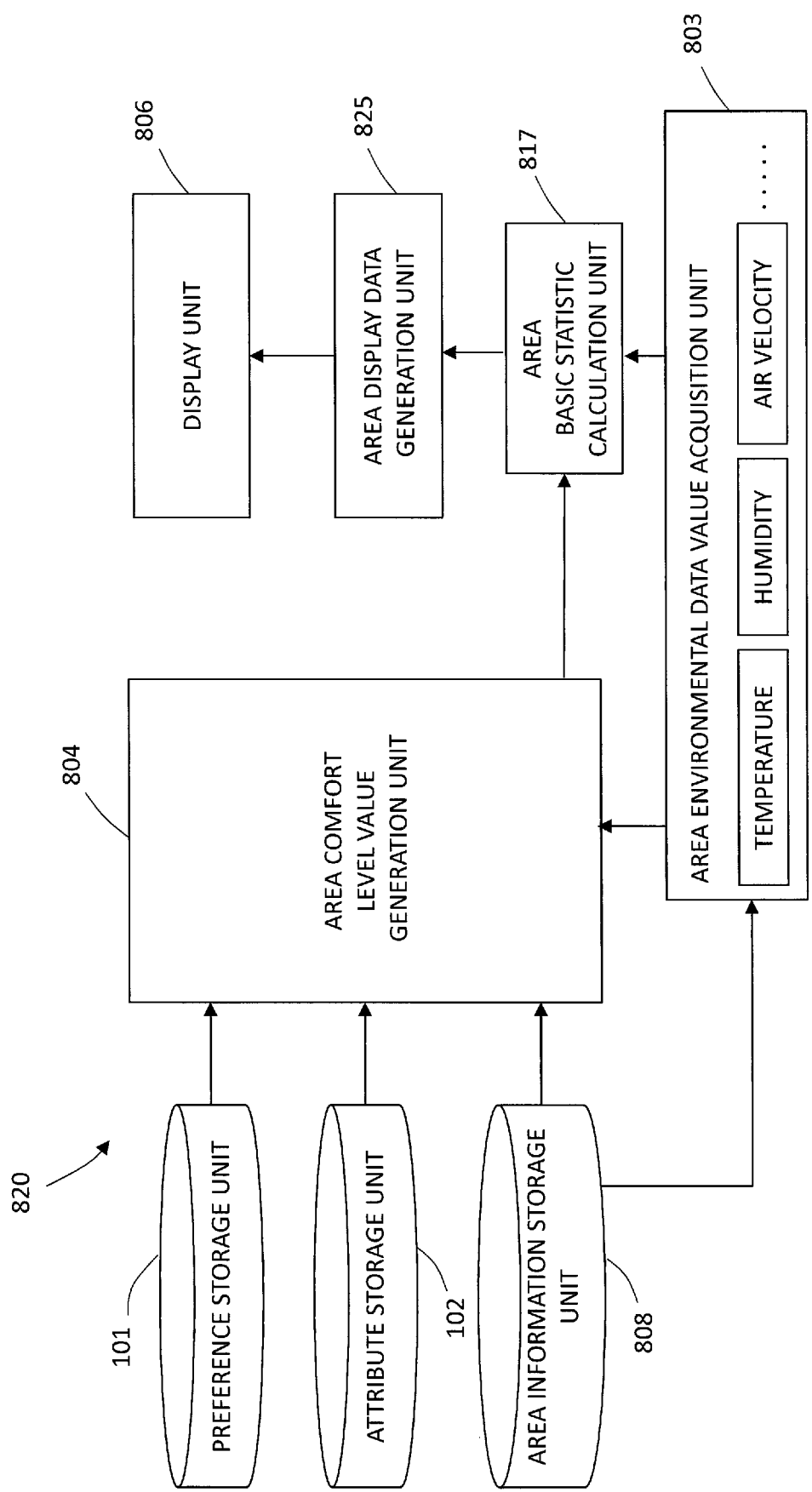
FIG. 41 is a functional block diagram illustrating a configuration of a comfort level display apparatus in Embodiment 15.

As illustrated in FIG. 41, an area display data generation unit 825 of a comfort level display apparatus 820 of Embodiment 15 generates area statistic display data by synthesizing one of area comfort-level-value basic statistics and one of area environmental-data-value basic statistics. Then, the display unit 806 displays one or a plurality of pieces of the area statistic display data. The area display data generation unit 825 does not perform synthesis with area comfort level values of users generated by the area comfort level value generation unit 804 and area environmental data values acquired by the area environmental data value acquisition unit 803. Therefore, the comfort level display apparatus 820 displays only the area comfort-level-value basic statistics of the area comfort levels and the area environmental-data-value basic statistics of the area environmental data on the display unit 806.

An example will be described below where the area basic statistic calculation unit 817 calculates the temporal average value or spatial average value of the area comfort level values generated by the area comfort level value generation unit 804, and the temporal average value or spatial average value of the area environmental data values acquired by the area environmental data value acquisition unit 803.

Portions that are the same as those of the comfort level display apparatus 810 will be denoted by the same reference signs, and description will be omitted. In FIG. 41, operation that is the same as the operation of the comfort level display apparatus 810 described with reference to FIG. 39 will be denoted by the same step numbers, and description will be omitted.

Figure 42:
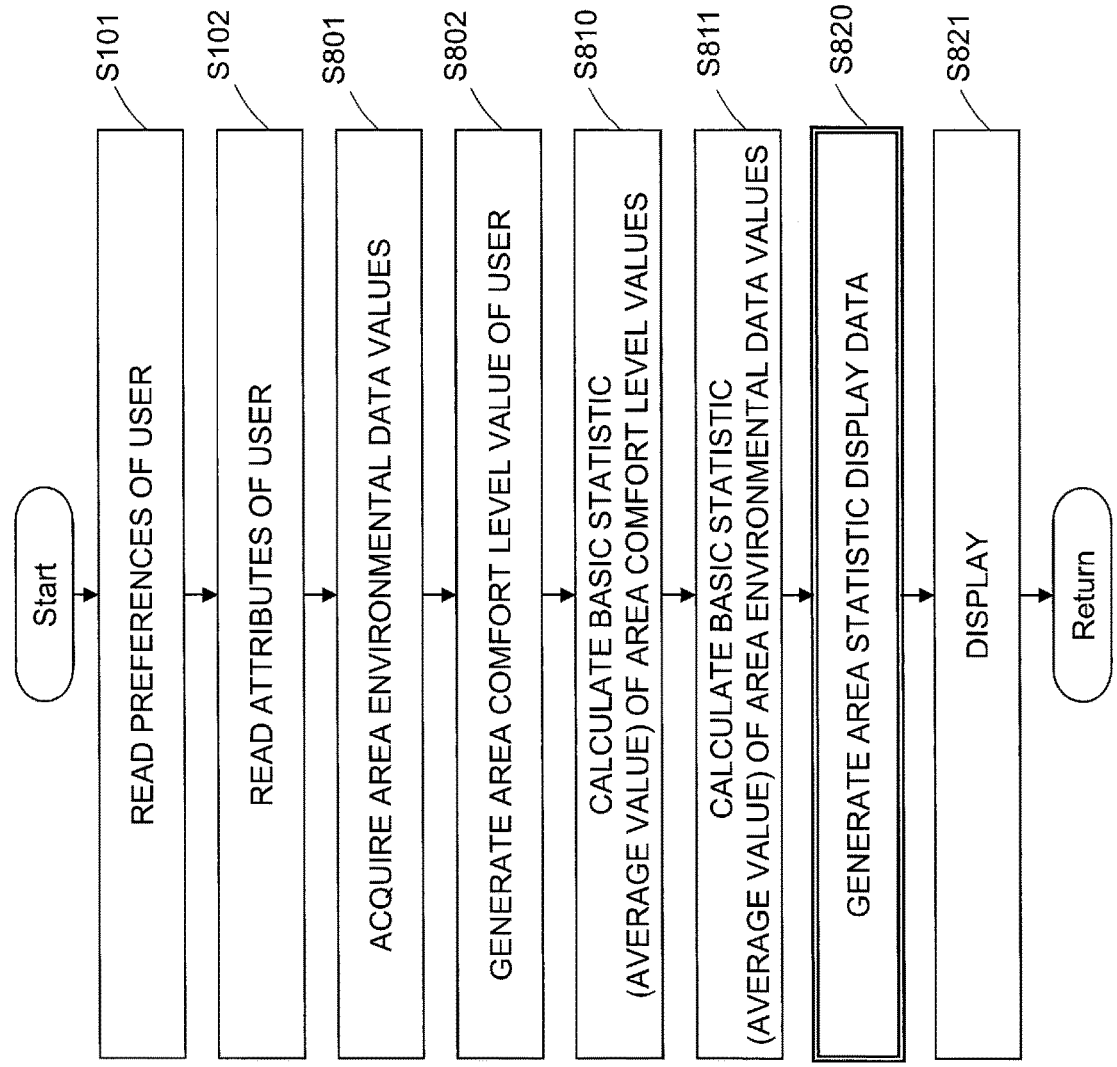
FIG. 42 is a flowchart illustrating operation of the comfort level display apparatus illustrated in FIG. 41.

As illustrated in FIG. 42, the comfort level display apparatus 820 generates area statistic display data in step S820 of FIG. 42, and the display unit 806 displays the area statistic display data.

Figure 43:
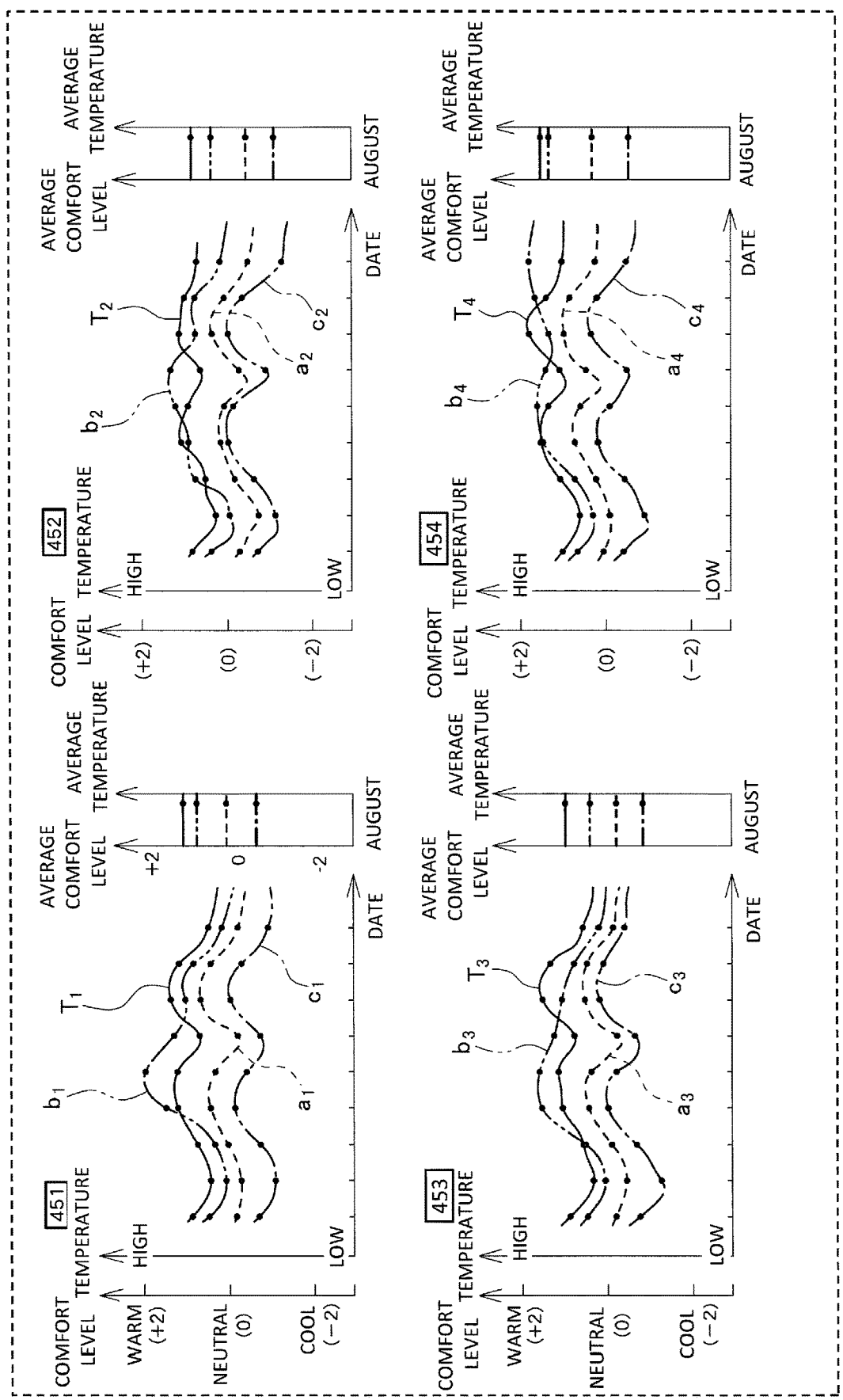
FIG. 43 is an example of display by the comfort level display apparatus illustrated in FIG. 41, where changes in daily average temperatures and average comfort levels on individual dates and monthly average comfort levels are displayed on a per-area basis.

FIG. 43 is an example of display by the comfort level display apparatus 820 of Embodiment 15. Similarly to FIG. 37, FIG. 43 illustrates changes in temperature and changes in comfort levels of users at a specific position in each of the areas 451 and 454 in the air-conditioned space 40 illustrated in FIG. 36. In FIG. 37, the horizontal axis indicates time. In FIG. 43, the horizontal axis indicates dates, and plot points indicate the daily average values of area comfort levels and the daily average temperature values. Therefore, FIG. 43 illustrates an example of display where statistic display data is output to the display unit 806 such that the statistic display data is obtained by synthesizing the daily average values of the comfort level values of users and the daily average values of temperatures, which are area environmental data values, in each of the areas 451 and 454 calculated by the area basic statistic calculation unit 817. In right-side portions in FIG. 43, the monthly average temperature and the monthly average comfort level values of the users A, B, and C at the seat position A-1 in each of the areas 451 to 454 are displayed.

The display unit 806 thus displays the area comfort-level-value basic statistics and the area environmental-data-value basic statistics, thereby allowing the air-conditioning manager to perceive the trend in the relationship between the comfort levels and the environmental data for each of the areas 451 to 454. Therefore, the air-conditioning manager can easily determine the necessity of replacement, additional installation and the like of the air-conditioning equipment for each of the areas 451 to 454. By using, as the area comfort-level-value basic statistics and the area environmental-data-value basic statistics, the average values, median values, maximum values, minimum values, and mode values which are indices representative of data groups of comfort level values and environmental data values, the data groups can be comprehensively perceived.

Embodiment 16

Figure 44:
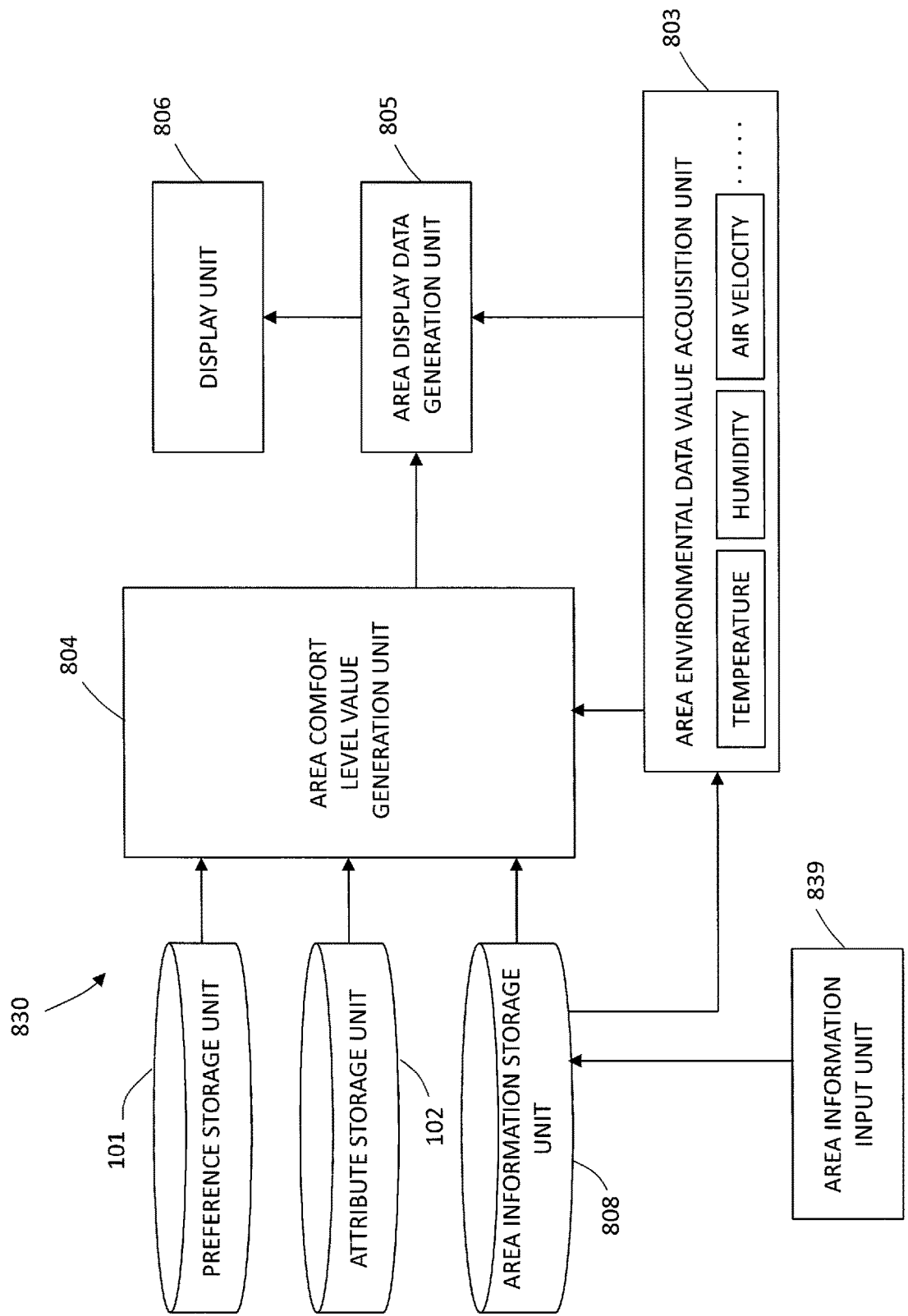
FIG. 44 is a functional block diagram illustrating a configuration of a comfort level display apparatus in Embodiment 16.

As illustrated in FIG. 44, a comfort level display apparatus 830 of Embodiment 16 is such that an area information input unit 839 is added to the comfort level display apparatus 800 described with reference to FIG. 34.

As described above, the area information storage unit 808 stores information on the layout and shape of each of the areas 451 to 454. The area information storage unit 808 also stores information on the layout of the air-conditioning equipment, indoor unit, temperature sensor, humidity sensor, anemometer and the like placed in each of the areas 451 to 454. The area information storage unit 808 further stores information on the layout of the desks in each of the areas 451 to 454 and information for identifying users sitting at these desks, for example, information such as names and employee numbers. It is often the case that these pieces of information are changed frequently. By providing the area information input unit 839 as in the comfort level display apparatus 830, even when these pieces of information are changed, the information in the area information storage unit 808 can be updated as necessary, so that appropriate comfort levels can always be displayed.

Embodiment 17

Figure 45:
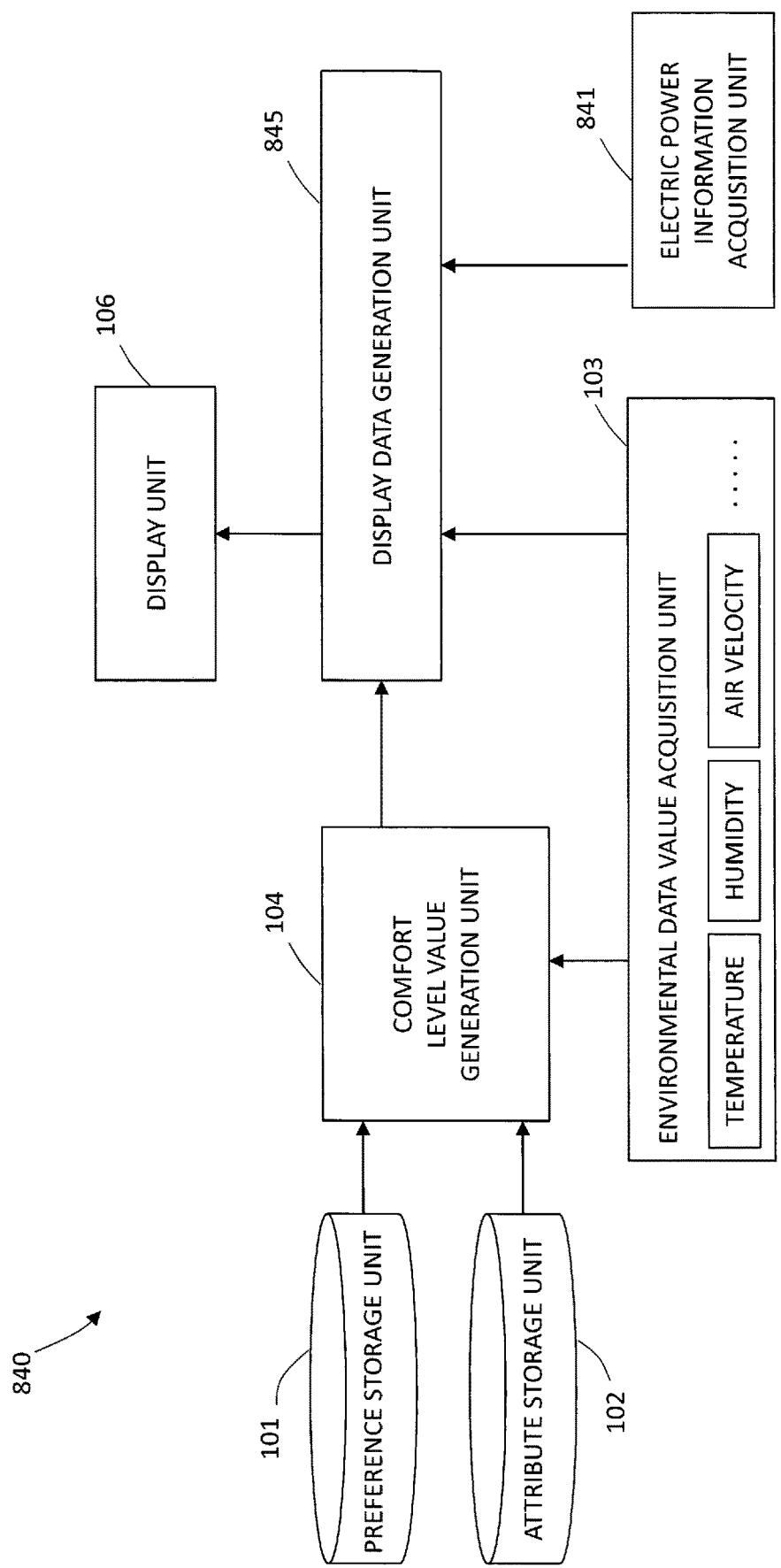
FIG. 45 is a functional block diagram illustrating a configuration of a comfort level display apparatus in Embodiment 17.

A comfort level display apparatus 840 illustrated in FIG. 45 is such that an electric power information acquisition unit 841 is added to the comfort level display apparatus 100 described with reference to FIG. 1.

Figure 46:
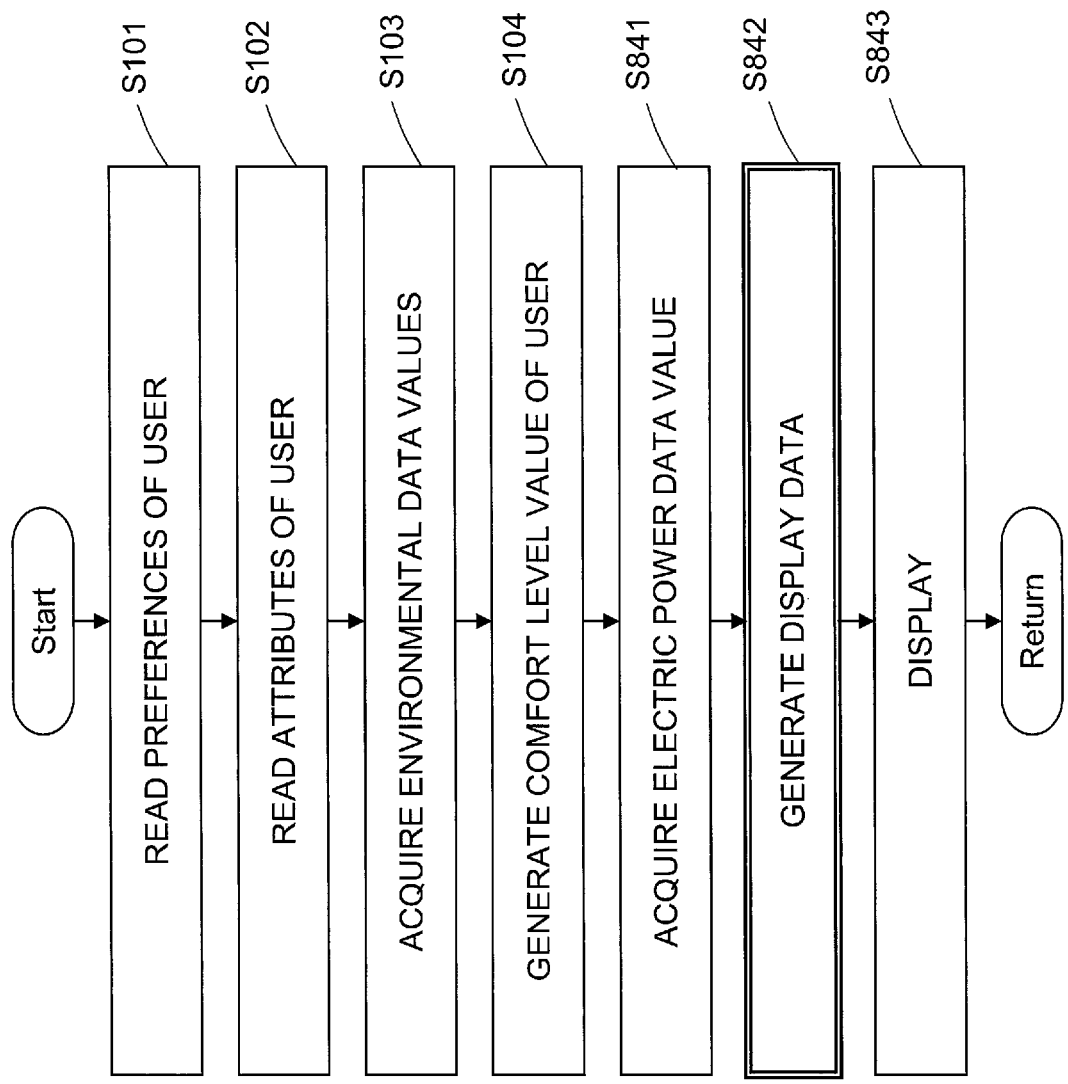
FIG. 46 is a flowchart illustrating operation of the comfort level display apparatus illustrated in FIG. 45.

In the comfort level display apparatus 840, in step S841 of FIG. 46 the electric power information acquisition unit 841 acquires data values of electric power used for the air-conditioning equipment or air-conditioning devices, such as a ventilator, a humidifier, and a dehumidifier, that are used for air conditioning in the air-conditioned space 40, and electric power used for other devices such as lighting. Then, in step S842 of FIG. 46, a display data generation unit 845 generates display data by synthesizing comfort level values of users generated by the comfort level value generation unit 104, environmental data values of the air-conditioned space 40 acquired by the environmental data value acquisition unit 103, and the data values of electric power acquired by the electric power information acquisition unit 841. The generated display data is displayed by the display unit 106.

The comfort level display apparatus 840 allows the air-conditioning manager to perceive the relationship among electric power consumption, the comfort levels, and the environmental data values.

Embodiment 18

Figure 47:
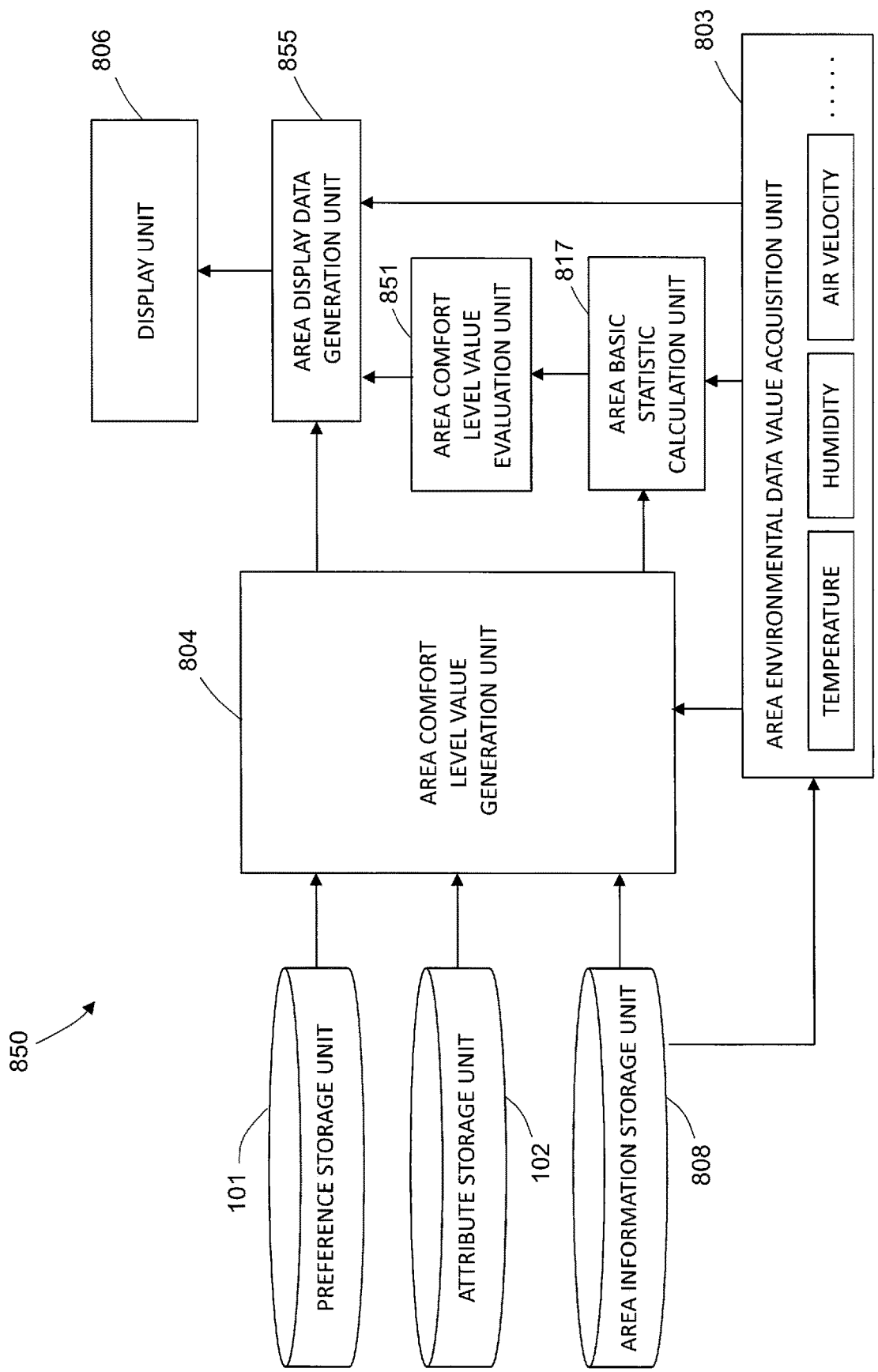
FIG. 47 is a functional block diagram illustrating a configuration of a comfort level display apparatus in Embodiment 18.

As illustrated in FIG. 47, a comfort level display apparatus 850 of Embodiment 18 is such that an area comfort level evaluation unit 851 is added to the comfort level display apparatus 810 described with reference to FIG. 38.

Figure 48:
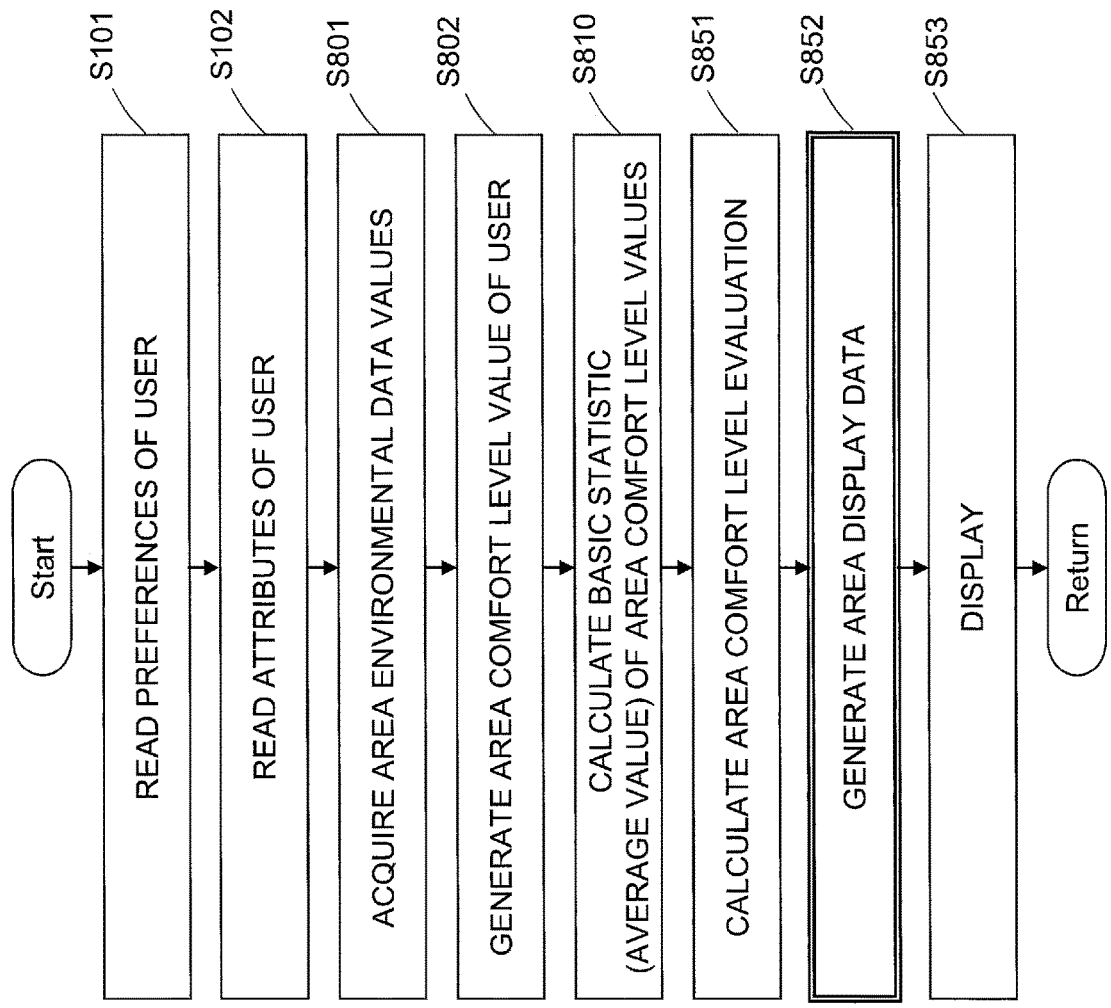
FIG. 48 is a flowchart illustrating operation of the comfort level display apparatus illustrated in FIG. 47.

In step S851 of FIG. 48, the area comfort level evaluation unit 851 compares, for evaluation, an area comfort-level-value basic statistic calculated by the area basic statistic calculation unit 817 with a predetermined threshold value, and outputs an area comfort level evaluation. In step S852 of FIG. 48, an area display data generation unit 855 generates area display data by synthesizing area comfort level values of users generated by the area comfort level value generation unit 804, area environmental data values acquired by the area environmental data value acquisition unit 803, and the area comfort level evaluation output by the area comfort level evaluation unit 851.

This allows the comfort level display apparatus 850 to easily display an area with low comfort distinguishably among the areas 451 to 454. The comfort level display apparatus 850 may use area comfort level evaluations to display an area with low comfort among the areas 451 to 454, so that the area with low comfort can be distinguishably displayed more easily.

Embodiment 19

Figure 49:
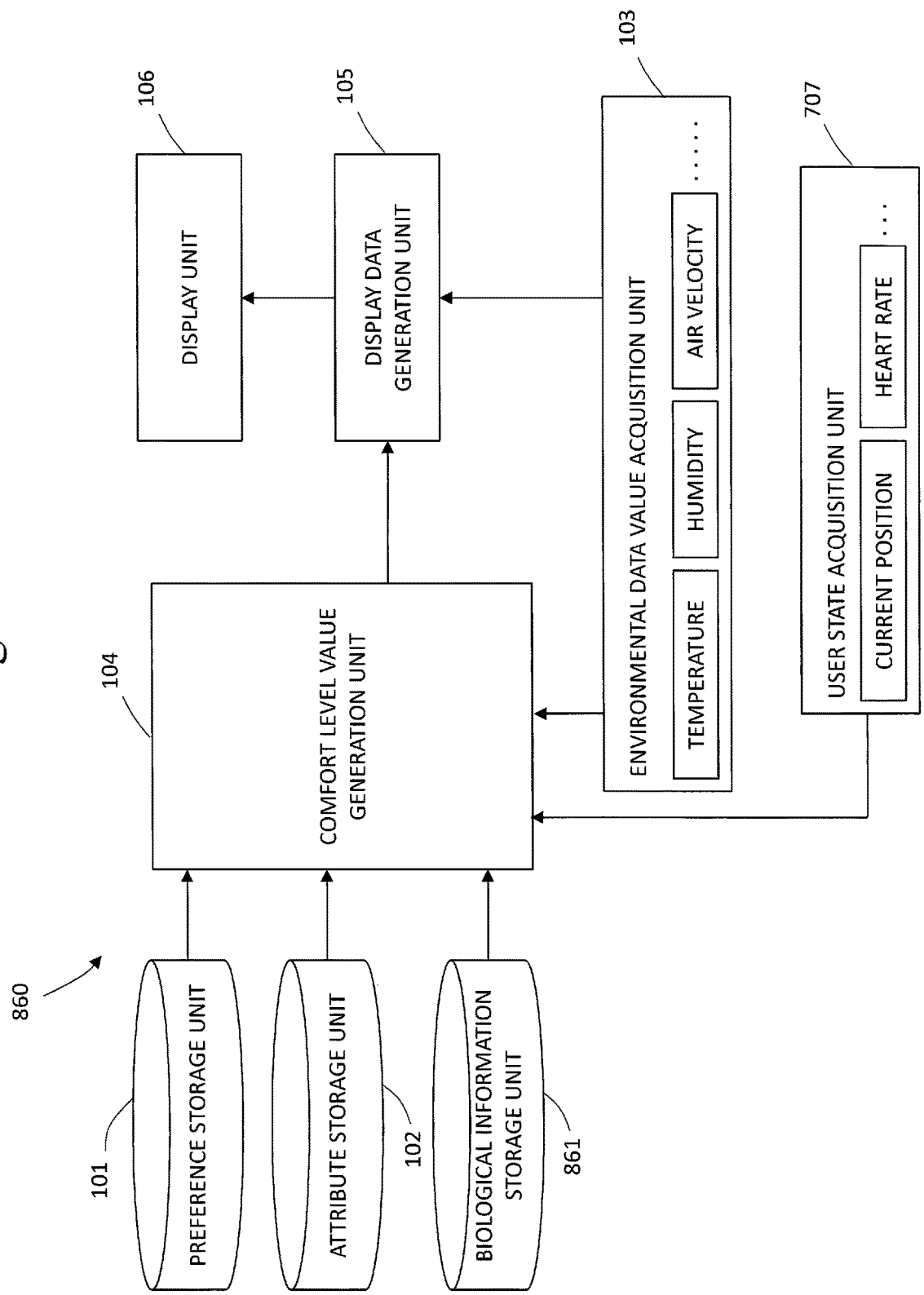
FIG. 49 is a functional block diagram illustrating a configuration of a comfort level display apparatus in Embodiment 19.

As illustrated in FIG. 49, a comfort level display apparatus 860 of Embodiment 19 is such that a biological information storage unit 861 and a user state acquisition unit 707 is added to the comfort level display apparatus 100 illustrated in FIG. 1.

The biological information storage unit 861 stores biological information of users, such as heart rates, for example. The user state acquisition unit 707 acquires biological information such as a current heart rate of a user and a current positon of the user. In step S861 of FIG. 50, the user state acquisition unit 707 acquires biological information such as a current heart rate of a user and a current position of the user.

In step S862 of FIG. 50, the comfort level value generation unit 104 generates a comfort level value indicating comfort of the user in the air-conditioned space 40, based on preferences of the user read in step S101 of FIG. 50, attributes of the user read in step S102 of FIG. 50, and environmental data values of the air-conditioned space 40 acquired by the environmental data value acquisition unit 103 in step S103 of FIG. 50, and also based on the biological information such as the current heart rate of the user and the current position of the user acquired by the user state acquisition unit 707 in step S861 of FIG. 50 and the biological information of the user stored in the biological information storage unit 861.

For example, immediately after the user has stopped walking or the like, the comfort level value generation unit 104 generates a comfort level value of the user, using a reference temperature in the air-conditioned space 40 that is lower than one normally used. This makes it possible to display comfort accurately even when the user is in a state different from the regular state, such as after walking.

As described above, the comfort level display apparatuses of the above embodiments facilitate perception of the relationship between the comfort levels and the environmental data, and enable appropriate management of the air-conditioning equipment.

Note that the present invention is not limited to the embodiments described above, and encompasses all changes and modifications that do not depart from the technical scope and substance of the present invention as defined by the claims.

REFERENCE SIGNS LIST

10: general-purpose computer; 21: CPU; 22: ROM; 23: RAM; 24: HDD; 25: mouse; 26: keyboard; 27: display;

28: input/output controller; 29: network controller; 30: data bus; 40, 50: air-conditioned space; 41, 411 to 414: office desk; 42, 52, 421 to 424: chair; 43, 53, 431 to 434: vent of air-conditioning equipment; 44: partition; 45: window; 51: table; 55: table set; 100, 200, 250, 300, 400, 500, 550, 580, 600, 650, 680, 700, 800, 810, 820, 830, 840, 850, 860: comfort level display apparatus; 101, 201, 251, 301, 401, 501, 601, 701: preference storage unit; 102, 202, 252, 302, 402, 502, 602, 702: attribute storage unit; 103, 203, 253, 303, 403, 503, 603, 703: environmental data value acquisition unit; 104, 204, 254, 304, 404, 504, 604, 704: comfort level value generation unit; 105, 205, 255, 305, 405, 505, 605, 705, 845: display data generation unit; 106, 206, 256, 306, 406, 506, 606, 706: display unit; 207, 257: basic statistic calculation unit; 307: interpolation unit; 407: anomaly detection unit; 451 to 454: area; 507: type-specific recommended zone generation unit; 508, 608: movement destination display unit; 607: user-specific recommended zone generation unit; 707: user state acquisition unit; 708: recommended action generation unit; 804: area comfort level value generation unit; 805, 815, 825: area display data generation unit; 806: display unit; 808: area information storage unit; 817: area basic statistic calculation unit; 839: area information input unit; 841: electric power information acquisition unit; 851: area comfort level evaluation unit; 861: biological information storage unit; 901: user preference database; 902: user attribute database

The invention claimed is:

1. A comfort level display apparatus for correlation changes in comfort level values for a plurality of users of an air-conditioning system, the comfort level display apparatus comprising:
a memory to store a preference of a user regarding an air-conditioned environment, and store an attribute of the user; and
processing circuitry to:
acquire an environmental data value representing a condition in an air-conditioned space,
generate a plurality of comfort level values, each comfort level value indicating comfort of a respective user of the plurality of users in the air-conditioned space, based on the preference of the respective user stored in the memory, the attribute of the respective user stored in the memory, and the acquired environmental data value of the air conditioned space,
generate display data by synthesizing the generated comfort level value of the plurality of users and the acquired environmental data value of the air-conditioned space, and
display the generated display data such that a manager of the air-conditioning system can visualize the correlation between changes in the comfort level values of the plurality of users and a temperature in the air-conditioned space.

2. The comfort level display apparatus according to claim 1, wherein the processing circuitry calculates a comfort-level-value basic statistic that is representative of generated comfort level values of the respective user, and an environmental-data-value basic statistic that is representative of acquired environmental data values of the air conditioned space,
generates display integrated data by synthesizing a comfort level value of the respective user, an environmental data value of the air-conditioned space, and one or a plurality of statistics of the comfort-level-value basic statistic and the environmental-data-value basic statistic, and
displays the display integrated data.

3. The comfort level display apparatus according to claim 2, wherein the calculated comfort-level-value basic statistic includes one of groups (1) to (5) described below:
(1) a temporal average value or a spatial average value of the comfort level values of the respective user,
(2) a temporal median value or a spatial median value of the comfort level values of the respective user,
(3) a temporal maximum value or a spatial maximum value of the comfort level values of the respective user,
(4) a temporal minimum value or a spatial minimum value of the comfort level values of the respective user, and
(5) a temporal mode value or a spatial mode value of the comfort level values of the respective user; and
wherein the calculated environmental-data-value basic statistic includes one of groups (6) to (10) described below:
(6) a temporal average value or a spatial average value of the environmental data values of the air-conditioned space,
(7) a temporal median value or a spatial median value of the environmental data values of the air-conditioned space,
(8) a temporal maximum value or a spatial maximum value of the environmental data values of the air-conditioned space,
(9) a temporal minimum value or a spatial minimum value of the environmental data values of the air-conditioned space, and
(10) a temporal mode value or a spatial mode value of the environmental data values of the air-conditioned space.

4. The comfort level display apparatus according to claim 3, wherein the processing circuitry generates the display integrated data by synthesizing a comfort level value of each respective user, an environmental data value of the air-conditioned space, and one or a plurality of statistics of the comfort-level-value basic statistic of one of the groups (1) to (5) and the environmental-data-value basic statistic of one of the groups (6) to (10).

5. The comfort level display apparatus according to claim 1, wherein the processing circuitry calculates a comfort-level-value basic statistic that is representative of generated comfort level values of the respective user, and an environmental-data-value basic statistic that is representative of acquired environmental data values of the air-conditioned space,
generates statistic display data by synthesizing one statistic of the comfort-level-value basic statistic and one statistic of the environmental-data-value basic statistic, and
displays the statistic display data.

6. The comfort level display apparatus according to claim 5, wherein the calculated comfort-level-value basic statistic includes one of groups (1) to (5) described below:
(1) a temporal average value or a spatial average value of the comfort level values of the respective user,
(2) a temporal median value or a spatial median value of the comfort level values of the respective user,
(3) a temporal maximum value or a spatial maximum value of the comfort level values of the respective user,
(4) a temporal minimum value or a spatial minimum value of the comfort level values of the respective user, and
(5) a temporal mode value or a spatial mode value of the comfort level values of the user; and wherein the calculated environmental-data-value basic statistic includes one of groups (6) to (10) described below:

(6) a temporal average value or a spatial average value of the environmental data values of the air-conditioned space, (7) a temporal median value or a spatial median value of the environmental data values of the air-conditioned space, (8) a temporal maximum value or a spatial maximum value of the environmental data values of the air-conditioned space, (9) a temporal minimum value or a spatial minimum value of the environmental data values of the air-conditioned space, and

(10) a temporal mode value or a spatial mode value of the environmental data values of the air-conditioned space.

7. The comfort level display apparatus according to claim 6, wherein the processing circuitry generates the statistic display data by synthesizing one of two values included in the comfort-level-value basic statistic of one of the groups (1) to (5) and one of two values included in the environmental-data-value basic statistic of one of the groups (6) to (10) synthesizing one of two values.

8. The comfort level display apparatus according to claim 1, wherein the air-conditioned space is composed of a plurality of areas, wherein the memory stores configuration information of each area in the air-conditioned space, and wherein the processing circuitry refers to the configuration information of each area stored in the memory, and acquires an area environmental data value representing a condition of the air-conditioned space in each area, for each area, generates an area comfort level value indicating comfort of the respective users in one of the areas, based on the preference of the respective user stored in the memory, the attribute of the respective user stored in the memory, and the acquired area environmental data value, generates area display data by synthesizing the generated area comfort level value of the respective user and the acquired area environmental data value, and displays one or a plurality of pieces of the area display data.

9. The comfort level display apparatus according to claim 8, wherein the processing circuitry calculates an area comfort-level-value basic statistic that is representative of generated area comfort level values of the respective user, and an area environmental-data-value basic statistic that is representative of acquired area environmental data values of the air-conditioned space, generates area display integrated data by synthesizing an area comfort level value of the respective user, an area environmental data value, and one or a plurality of statistics of the area comfort-level-value basic statistic and the area environmental-data-value basic statistic, and displays one or a plurality of pieces of the area display integrated data.

10. The comfort level display apparatus according to claim 9, wherein the calculated area comfort-level-value basic statistic includes one of groups (1) to (5) described below:

(1) a temporal average value or a spatial average value of the area comfort level values of the respective user, (2) a temporal median value or a spatial median value of the area comfort level values of the respective user, (3) a temporal maximum value or a spatial maximum value of the area comfort level values of the respective user, (4) a temporal minimum value or a spatial minimum value of the area comfort level values of the respective user, and (5) a temporal mode value or a spatial mode value of the area comfort level values of the respective user; and wherein the calculated area environmental-data-value basic statistic includes one of groups (6) to (10) described below:

(6) a temporal average value or a spatial average value of the area environmental data values, (7) a temporal median value or a spatial median value of the area environmental data values, (8) a temporal maximum value or a spatial maximum value of the area environmental data values, (9) a temporal minimum value or a spatial minimum value of the area environmental data values, and

(10) a temporal mode value or a spatial mode value of the area environmental data values.

11. The comfort level display apparatus according to claim 10, wherein the processing circuitry generates the area display integrated data by synthesizing an area comfort level value of the respective user, an area environmental data value, and one or a plurality of statistics of the area comfort-level-value basic statistic of one of the groups (1) to (5) and the area environmental-data-value basic statistic of one of the groups (6) to (10).

12. The comfort level display apparatus according to claim 8, wherein the processing circuitry calculates an area comfort-level-value basic statistic that is representative of generated area comfort level values of the respective user, and an area environmental-data-value basic statistic that is representative of acquired area environmental data values of the air-conditioned space, generates area statistic display data by synthesizing one statistic of the area comfort level-value basic statistic and one statistic of the area environmental-data-value basic statistic, and displays one or a plurality of pieces of the area statistic display data.

13. The comfort level display apparatus according to claim 12, wherein the calculated area comfort-level-value basic statistic includes one of groups (1) to (5) described below:

(1) a temporal average value or a spatial average value of the area comfort level values of the respective user, (2) a temporal median value or a spatial median value of the area comfort level values of the respective user, (3) a temporal maximum value or a spatial maximum value of the area comfort level values of the respective user, (4) a temporal minimum value or a spatial minimum value of the area comfort level values of the respective user, and (5) a temporal mode value or a spatial mode value of the area comfort level values of the respective user; and wherein the calculated area environmental-data-value basic statistic includes one of groups (6) to (10) described below:

(6) a temporal average value or a spatial average value of the area environmental data values, (7) a temporal median value or a spatial median value of the area environmental data values, (8) a temporal maximum value or a spatial maximum value of the area environmental data values, (9) a temporal minimum value or a spatial minimum value of the area environmental data values, and

(10) a temporal mode value or a spatial mode value of the area environmental data values.

14. The comfort level display apparatus according to claim 13, wherein the processing circuitry generates the area statistic display data by synthesizing one of two values included in the area comfort-level-value basic statistic of one of the groups (1) to (5) and one of two values included in the area environmental-data-value basic statistic of one of the groups (6) to (10).

15. The comfort level display apparatus according to claim 8, wherein the processing circuitry inputs the configuration information of the area of the air conditioned space to the memory.

16. The comfort level display apparatus according to claim 8, wherein the processing circuitry calculates an area comfort-level-value basic statistic that is representative of generated area comfort level values of the respective user,
compares, for evaluation, the calculated area comfort-level-value basic statistic with a predetermined threshold value, and outputs an area comfort level evaluation, and
generates the area display data by synthesizing a generated area comfort level value of the respective user, an acquired area environmental data value, and the output area comfort level evaluation.

17. The comfort level display apparatus according to claim 1, wherein the processing circuitry acquires a data value of electric power used for a device in the air-conditioned space, and
generates the display data by synthesizing the generated comfort level value of the I respective user, the acquired environmental data value of the air-conditioned space, and the acquired data value of electric power.

18. The comfort level display apparatus according to claim 1, wherein the memory stores biological information of the respective user, and wherein the processing circuitry acquires a current quantity of state of the respective user and a current position of the respective user, and
generates a comfort level value indicating comfort of the user in the air conditioned space, based on the preference of the respective user stored in the memory, the attribute of the respective user stored in the memory, the acquired environmental data value of the air-conditioned space, the biological information of the respective user stored in the memory, and the current quantity of state of the respective user and the current position of the respective user that are acquired.

19. The comfort level display apparatus according to claim 1, wherein the processing circuitry performs interpolation of generated comfort level values of the respective user of discrete values, so as to calculate continuous values in terms of time or space, and performs interpolation of acquired environmental data values of the air-conditioned space of discrete values, so as to calculate continuous values in terms of time or space,
generates continuous display data by synthesizing the continuous values, in terms of one of time and space, of the comfort level values of the respective user, and the continuous values, in terms of one of time and space, of the environmental data values of the air-conditioned space, and displays the continuous display data.

20. The comfort level display apparatus according to claim 1, wherein the processing circuitry detects an anomaly and outputs anomaly data when the comfort level value of the respective user is not within a comfort limit range,
generates anomaly display data by synthesizing the output anomaly data, the comfort level value of the respective user, and the environmental data value of the air-conditioned space, and
displays the anomaly display data.

21. The comfort level display apparatus according to claim 1, wherein the processing circuitry detects an anomaly and outputs anomaly data when the comfort level value of the respective user is not within a comfort limit range,
generates anomaly identification display data by synthesizing the comfort level value of the user and the environmental data value of the air-conditioned space, the anomaly identification display data allowing the comfort level value of the respective user in which an anomaly is detected to be distinguished from other user comfort level values, and
displays the anomaly identification display data.

22. The comfort level display apparatus according to claim 1, wherein the memory stores a preference of a type-specific reference user regarding an air-conditioned environment, and stores an attribute of the type-specific reference user, and wherein for each zone in the air-conditioned space, the processing circuitry generates a comfort level value of the type-specific reference user, based on the preference of the type-specific reference user stored in the memory, the attribute of the type specific reference user stored in the memory, and the acquired environmental data value of the air-conditioned space, and designates a zone in which the comfort level value of the type-specific reference user is within a predetermined range as a type-specific recommended zone,
generates type-specific recommended zone display data by synthesizing the generated comfort level value of the user, the type-specific recommended zone, and the environmental data value of the air-conditioned space, and
displays the type-specific recommended zone display data.

23. The comfort level display apparatus according to claim 1, wherein for each zone in the air-conditioned space, the processing circuitry generates a comfort level value of the respective user, based on the preference of the respective user stored in the memory, the attribute of the respective user stored in the memory, and the acquired environmental data value of the air-conditioned space, and designates a zone in I which the comfort level value of the respective user is within a predetermined range as a user specific recommended zone,
generates user-specific recommended zone display data by synthesizing the generated comfort level value of the respective user, the user-specific recommended zone, and the environmental data value of the air-conditioned space, and
displays the user-specific recommended zone display data.

24. The comfort level display apparatus according to claim 1, wherein the processing circuitry acquires a current quantity of state of the respective user and a current position of the respective user,
generates a current comfort level value indicating current comfort of the respective user, based on the preference of the respective user stored in the memory, the attribute of the respective user stored in the memory, the acquired environmental data value of the air conditioned space, and the current quantity of state of the respective user and the current position of the respective user that are acquired, and when the current comfort level value is not within a predetermined range, changes a quantity of state of the respective user from the current quantity of state, and repeatedly generates a comfort level value of the respective user, based on the preference of the respective user, the attribute of the respective user, the environmental data value of the air-conditioned space, and the current position of the respective user, until the comfort level value of the respective user falls within the predetermined range, so as to determine a changed quantity of state of the user that enables the comfort level value of the respective user to fall within the predetermined range, and generates a recommended action for the respective user based on a difference between the current quantity of state of the respective user and the changed quantity of state, generates recommended action display data by synthesizing the generated current comfort level value of the respective user, the environmental data value of the air-conditioned space, and the generated recommended action, and displays the recommended action display data.

\* \* \* \* \*